US007578928B2

(12) United States Patent
Lott et al.

(10) Patent No.: US 7,578,928 B2
(45) Date of Patent: Aug. 25, 2009

(54) HYDROPROCESSING METHOD AND SYSTEM FOR UPGRADING HEAVY OIL USING A COLLOIDAL OR MOLECULAR CATALYST

(75) Inventors: Roger K. Lott, Edmonton (CA); Lap-Keung Lee, West Windsor, NJ (US)

(73) Assignee: Headwaters Heavy Oil, LLC, South Jordan, UT (US)

( * ) Notice: Subject to any disclaimer, the term of this patent is extended or adjusted under 35 U.S.C. 154(b) by 480 days.

(21) Appl. No.: 11/117,262

(22) Filed: Apr. 28, 2005

(65) Prior Publication Data

US 2005/0241993 A1 Nov. 3, 2005

Related U.S. Application Data

(60) Provisional application No. 60/566,345, filed on Apr. 28, 2004.

(51) Int. Cl.
C10G 47/00 (2006.01)
B01J 8/00 (2006.01)
(52) U.S. Cl. ...................... 208/108; 422/187
(58) Field of Classification Search ......... 208/108–112; 422/129, 187, 211, 217
See application file for complete search history.

(56) References Cited

U.S. PATENT DOCUMENTS

| | | | |
|---|---|---|---|
| 2,850,552 A | 9/1958 | Ogle | 585/701 |
| 3,161,585 A | 12/1964 | Gleim et al. | |
| 3,254,017 A | 5/1966 | Arey, Jr. et al. | |
| 3,267,021 A | 8/1966 | Gould | |
| 3,349,713 A | 10/1967 | Fassbender | 418/1 |
| 3,622,497 A | 11/1971 | Gleim | |
| 3,694,352 A | 9/1972 | Gleim | |
| 3,870,623 A | 3/1975 | Johnson et al. | |
| 3,892,389 A | 7/1975 | Contastin | 366/138 |
| 3,915,842 A | 10/1975 | Gatsis | |
| 3,919,074 A | 11/1975 | Gatsis | |
| 3,992,285 A | 11/1976 | Hutchings | |
| 4,066,530 A | 1/1978 | Aldridge et al. | |
| 4,067,798 A | 1/1978 | Hauschildt et al. | |
| 4,067,799 A | 1/1978 | Bearden, Jr. et al. | |
| 4,068,830 A | 1/1978 | Gray | 366/175.2 |
| 4,077,867 A | 3/1978 | Aldridge et al. | 208/418 |
| 4,083,803 A | 4/1978 | Oswald et al. | |
| 4,125,455 A | 11/1978 | Herbstman | 208/108 |
| 4,134,825 A | 1/1979 | Bearden, Jr. et al. | |
| 4,148,750 A | 4/1979 | Pine | |
| 4,151,070 A | 4/1979 | Allan et al. | |
| 4,178,227 A | 12/1979 | Metrailer et al. | 208/50 |
| 4,192,735 A | 3/1980 | Aldridge et al. | |
| 4,196,072 A | 4/1980 | Aldridge et al. | |
| 4,226,742 A | 10/1980 | Bearden, Jr. et al. | 502/170 |
| 4,298,454 A | 11/1981 | Aldridge et al. | 208/420 |
| 4,313,818 A | 2/1982 | Aldridge et al. | |
| 4,338,183 A | 7/1982 | Gatsis | 208/421 |
| 4,352,729 A | 10/1982 | Jacquin et al. | 208/209 |
| 4,370,221 A | 1/1983 | Patmore et al. | |
| 4,389,301 A | 6/1983 | Dahlberg et al. | 208/59 |
| 4,411,768 A | 10/1983 | Unger et al. | |
| 4,420,008 A | 12/1983 | Shu | 137/4 |
| 4,422,927 A | 12/1983 | Kowalczyk et al. | |
| 4,422,960 A | 12/1983 | Shiroto et al. | |
| 4,430,207 A | 2/1984 | Kukes | 208/251 H |
| 4,452,265 A | 6/1984 | Lonnebring | 137/4 |
| 4,455,218 A | 6/1984 | Dymock et al. | |
| 4,467,049 A | 8/1984 | Yoshii et al. | |
| 4,485,004 A | 11/1984 | Fisher et al. | |
| 4,508,616 A | 4/1985 | Larrauri et al. | 208/111.1 |
| 4,513,098 A | 4/1985 | Tsao | |
| 4,551,230 A | 11/1985 | Kukes et al. | 208/89 |
| 4,557,823 A | 12/1985 | Kukes et al. | 208/216 R |
| 4,557,824 A | 12/1985 | Kukes et al. | 208/251 H |
| 4,561,964 A | 12/1985 | Singhal et al. | |

(Continued)

FOREIGN PATENT DOCUMENTS

CA 2579528 9/2007

(Continued)

OTHER PUBLICATIONS

Plain,C., et al., "Options for Resid Conversion" Axens IFP Group Technologies, pp. 1-10.

(Continued)

*Primary Examiner*—Glenn Caldarola
*Assistant Examiner*—Randy Boyer
(74) *Attorney, Agent, or Firm*—Workman Nydegger

(57) ABSTRACT

Methods and systems for hydroprocessing heavy oil feedstocks to form an upgraded material involve the use of a colloidal or molecular catalyst dispersed within a heavy oil feedstock, a hydrocracking reactor, and a hot separator. The colloidal or molecular catalyst promotes hydrocracking and other hydroprocessing reactions within the hydrocracking reactor. The catalyst is preferentially associated with asphaltenes within the heavy oil feedstock, which promotes upgrading reactions involving the asphaltenes rather than formation of coke precursors and sediment. The colloidal or molecular catalyst overcomes problems associated with porous supported catalysts in upgrading heavy oil feedstocks, particularly the inability of such catalysts to effectively process asphaltene molecules. The result is one or more of reduced equipment fouling, increased conversion level, and more efficient use of the supported catalyst if used in combination with the colloidal or molecular catalyst.

44 Claims, 26 Drawing Sheets

U.S. PATENT DOCUMENTS

| | | | | |
|---|---|---|---|---|
| 4,564,441 A | 1/1986 | Kukes et al. | | 208/108 |
| 4,567,156 A | 1/1986 | Bearden, Jr. et al. | | 502/173 |
| 4,568,657 A | 2/1986 | Sepulveda et al. | | 502/81 |
| 4,578,181 A | 3/1986 | Derouane et al. | | |
| 4,579,646 A | 4/1986 | Grosboll et al. | | 208/108 |
| 4,582,432 A | 4/1986 | Mehta | | 366/75 |
| 4,592,827 A | 6/1986 | Galiasso et al. | | |
| 4,606,809 A | 8/1986 | Garg | | |
| 4,608,152 A | 8/1986 | Howell et al. | | |
| 4,613,427 A | 9/1986 | Sepulveda et al. | | 208/111.15 |
| 4,626,340 A | 12/1986 | Galiasso et al. | | 208/89 |
| 4,674,885 A | 6/1987 | Erwin et al. | | 366/76.6 |
| 4,678,557 A | 7/1987 | Rodriguez et al. | | 208/112 |
| 4,695,369 A | 9/1987 | Garg et al. | | |
| 4,701,435 A | 10/1987 | Garcia et al. | | 502/525 |
| 4,710,486 A | 12/1987 | Lopez et al. | | |
| 4,713,167 A | 12/1987 | Reno et al. | | |
| 4,716,142 A | 12/1987 | Laine et al. | | |
| 4,724,069 A | 2/1988 | Aldag et al. | | 208/217 |
| 4,746,419 A | 5/1988 | Peck et al. | | 208/213 |
| 4,762,607 A | 8/1988 | Aldridge et al. | | |
| 4,762,812 A | 8/1988 | Lopez et al. | | |
| 4,764,266 A | 8/1988 | Chen et al. | | |
| 4,765,882 A | 8/1988 | Aldridge et al. | | |
| 4,770,764 A | 9/1988 | Ohtake et al. | | |
| 4,772,378 A | 9/1988 | Miyauchi et al. | | |
| 4,808,007 A | 2/1989 | King | | 366/337 |
| 4,824,821 A | 4/1989 | Lopez et al. | | |
| 4,834,865 A | 5/1989 | Kukes et al. | | |
| 4,851,107 A | 7/1989 | Kretschmar et al. | | 208/108 |
| 4,851,109 A | 7/1989 | Chen et al. | | |
| 4,857,496 A | 8/1989 | Lopez et al. | | |
| 4,959,140 A | 9/1990 | Kukes et al. | | |
| 4,963,247 A | 10/1990 | Belinko et al. | | |
| 4,970,190 A | 11/1990 | Lopez et al. | | |
| 4,983,273 A | 1/1991 | Kennedy et al. | | |
| 4,983,558 A | 1/1991 | Born et al. | | |
| 5,013,427 A | 5/1991 | Mosby et al. | | |
| 5,017,535 A | 5/1991 | Schoonhoven et al. | | |
| 5,039,392 A | 8/1991 | Bearden, Jr. et al. | | |
| 5,055,174 A | 10/1991 | Howell et al. | | |
| 5,094,991 A | 3/1992 | Lopez et al. | | |
| 5,108,581 A | 4/1992 | Aldridge et al. | | |
| 5,134,108 A | 7/1992 | Thakur et al. | | |
| 5,162,282 A | 11/1992 | Lopez et al. | | |
| 5,164,075 A | 11/1992 | Lopez | | |
| 5,166,118 A | 11/1992 | Kretschmar et al. | | 502/185 |
| 5,178,749 A * | 1/1993 | Lopez et al. | | 208/108 |
| 5,191,131 A | 3/1993 | Takahata et al. | | |
| 5,281,328 A | 1/1994 | Degnan, Jr. et al. | | |
| 5,320,500 A | 6/1994 | Cholet | | 417/375 |
| 5,372,705 A | 12/1994 | Bhattacharya et al. | | |
| 5,409,595 A | 4/1995 | Harandi et al. | | |
| 5,435,908 A | 7/1995 | Nelson et al. | | 208/216 PP |
| 5,452,954 A | 9/1995 | Handke et al. | | 366/16 |
| 5,460,714 A | 10/1995 | Fixari et al. | | 208/112 |
| 5,578,197 A * | 11/1996 | Cyr et al. | | 208/108 |
| 5,597,236 A | 1/1997 | Fasano | | 366/181.5 |
| 5,622,616 A | 4/1997 | Porter et al. | | |
| 5,865,537 A | 2/1999 | Streiff et al. | | 366/174.1 |
| 5,866,501 A | 2/1999 | Pradhan et al. | | |
| 5,868,923 A | 2/1999 | Porter et al. | | |
| 5,913,324 A | 6/1999 | Signer | | 137/3 |
| 5,916,432 A | 6/1999 | McFarlane et al. | | |
| 5,932,090 A | 8/1999 | Marchionna et al. | | 208/212 |
| 5,935,419 A | 8/1999 | Khan et al. | | |
| 6,059,957 A | 5/2000 | Khan et al. | | |
| 6,086,749 A | 7/2000 | Kramer et al. | | |
| 6,090,858 A * | 7/2000 | El-Sayed | | 516/97 |
| 6,136,179 A | 10/2000 | Sherwood, Jr. et al. | | |
| 6,190,542 B1 | 2/2001 | Comolli et al. | | |
| 6,239,054 B1 | 5/2001 | Shukis et al. | | |
| 6,270,654 B1 | 8/2001 | Colyar et al. | | |
| 6,277,270 B1 | 8/2001 | Morel et al. | | 208/58 |
| 6,454,932 B1 | 9/2002 | Baldassari et al. | | |
| 6,660,157 B2 * | 12/2003 | Que et al. | | 208/108 |
| 6,698,917 B2 | 3/2004 | Etchells, III et al. | | 366/336 |
| 6,783,661 B1 | 8/2004 | Briot et al. | | |
| 6,797,153 B1 | 9/2004 | Fukuyama et al. | | |
| 2004/0013601 A1 | 1/2004 | Butz et al. | | |
| 2005/0241991 A1 | 11/2005 | Lott et al. | | |
| 2005/0241992 A1 | 11/2005 | Lott et al. | | |
| 2005/0241993 A1 | 11/2005 | Lott et al. | | |
| 2006/0175229 A1 | 8/2006 | Montanari et al. | | |
| 2006/0201854 A1 | 9/2006 | Lott | | |
| 2007/0029228 A1 | 2/2007 | Aoki et al. | | |
| 2007/0108100 A1 | 5/2007 | Satchell, Jr. | | |
| 2007/0131587 A1 | 6/2007 | Fukuyama et al. | | |
| 2007/0158239 A1 | 7/2007 | Satchell | | |

FOREIGN PATENT DOCUMENTS

| | | |
|---|---|---|
| CN | 1966618 | 5/2007 |
| DE | 2315114 | 10/1974 |
| EP | 0 546 686 | 11/1992 |
| EP | 1753846 | 2/2007 |
| GB | 1047698 | 8/1963 |
| JP | 47-014205 | 10/1972 |
| JP | SHO 47-014205 | 10/1972 |
| JP | 60-044587 | 3/1985 |
| JP | 01-165692 | 6/1989 |
| JP | 6287574 | 10/1994 |
| JP | 07-062355 | 3/1995 |
| JP | 08-325580 | 12/1996 |

OTHER PUBLICATIONS

"Hyvahl, Significantly Improved RFCC Performance or Low Sulfur Fuel Oils Via Residue Hydrotreatment" Axens IPF Group Technologies, pp. 1,2; (Jan. 2003).

"OCR Moving Bed Technology for the Future" pp. 1-2.

Santori, R., et al., "Eni Slurry Technology: A Technology to Convert the Bottom of the Barrel to Transportation Fuels", 3rd Bottom of the Barrel Technology Conference & Exhibition (Oct. 2004).

Aspen Hydrocracker™: A simulation system for monitoring, planning and optimizing hydrocracking and hydrotreating units, www.aspentec.com/brochures/hydrocracker.pdf (2001).

Criterion: Hydrocracking Process Description and Criterion/Ceolyst Hydrocracking Catalyst Applications, www.criterioncatalysts.com (2001).

"OCR Moving Bed Technology for the Future", pp. 1-2 (at least as early as 2004).

Plain,C. et al., "Options for Resid Conversion", Axens IFP Group Technologies, pp. 1-10 (at least as early as 2004).

Office Action dated Apr. 29, 2008 cited in related U.S. Appl. No. 11/117,202.

Office Action dated May 28, 2009 cited in U.S. Appl. No. 11/374,369 (Copy Attached). (15913.706).

* cited by examiner

◯ = Mo atom
◯ = S atom

◯ = Mo atom
◯ = S atom

HYDROPROCESSING METHOD AND SYSTEM FOR UPGRADING HEAVY OIL USING A COLLOIDAL OR MOLECULAR CATALYST

CROSS-REFERENCE TO RELATED APPLICATION

This application claims the benefit under 35 U.S.C. § 119 of U.S. provisional application Ser. No. 60/566,345, filed Apr. 28, 2004, the disclosure of which is incorporated herein in its entirety.

BACKGROUND OF THE INVENTION

The present invention is in the field of upgrading heavy oil feedstocks that include a significant quantity of asphaltenes and fraction boiling above 524° C. (975° F.) into lower boiling, higher quality materials. More particularly, the invention relates to hydroprocessing systems that employ a colloidal or molecular hydroprocessing catalyst that promotes hydrocracking and hydrotreatment of heavy oil feedstocks while also inhibiting fouling of the system by coke precursors and sediment.

2. The Relevant Technology

World demand for refined fossil fuels is ever-increasing and will inevitably outstrip the supply of high quality crude oil, whether as a result of actual shortages or due to the actions of oil cartels. In either case, as the price or shortage of crude oil increases there will be an every-increasing demand to find ways to better exploit lower quality feedstocks and extract fuel values therefrom. As more economical ways to process lower quality feedstocks become available, such feedstocks may possibly catch, or even surpass, higher quality crude oils, in the not-too-distant future, as the primary source of refined fossil fuels used to operate automobiles, trucks, farm equipment, aircraft, and other vehicles that rely on internal combustion.

Lower quality feedstocks are characterized as including relatively high quantities of hydrocarbons that have a boiling point of 524° C. (975° F.) or higher. They also contain relatively high concentrations of sulfur, nitrogen and metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy crude and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

By way of comparison, Alberta light crude contains about 9% by volume vacuum residue, while Lloydminster heavy oil contains about 41% by volume vacuum residue, Cold Lake bitumen contains about 50% by volume vacuum residue, and Athabasca bitumen contains about 51% by volume vacuum residue. Resid contains even higher concentrations of fractions that boil at or above about 343° C. (650° F.), with vacuum tower bottoms almost exclusively comprising fractions that boil at or above about 524° C. (975° F.).

Converting heavy oil into useful end products requires extensive processing, including reducing the boiling point of the heavy oil, increasing the hydrogen-to-carbon ratio, and removing impurities such as metals, sulfur, nitrogen and high carbon forming compounds. Examples of catalytic hydrocracking processes using conventional supported catalysts to upgrade atmospheric tower bottoms include fixed-bed hydroprocessing, ebullated- or expanded-bed hydroprocessing, and moving-bed hydroprocessing. Noncatalytic processes used to upgrade vacuum tower bottoms include thermal cracking, such as delayed coking and Flexicoking, and solvent extraction. Solvent extraction is quite expensive and incapable of reducing the boiling point of the heavy oil. Existing commercial catalytic hydrocracking processes involve rapid catalyst deactivation and high catalyst cost, making them currently unsuitable for hydroprocessing vacuum tower bottoms unless substantially diluted with lower boiling fractions, such as atmospheric tower bottoms. Most existing ebullated bed processes operate at less than 65 wt % conversion, while most fixed bed processes have less than about 25 wt % conversion.

A major cause of catalyst and equipment fouling is the undesired formation of coke and sediment, which often results when asphaltenes are heated to the high temperatures required to effect catalytic and thermal cracking. Supported catalysts used in commercial hydrocracking processes such as fixed-bed and ebullated-bed processes utilize solid supported catalysts that include clusters of catalytic sites located within pores or channels in the support material. Most heavy oil feedstocks contain a significant portion of asphaltene molecules, which are either too large to enter the pores of the catalyst support or else become trapped within the pores. Asphaltene molecules that become trapped in the pores deactivate the catalyst sites in the blocked pores. In this way, smaller asphaltene molecules can progressively block all catalyst sites, entirely deactivating the catalyst.

Moreover, larger asphaltene molecules form free radicals, just like other hydrocarbon molecules in the feedstock, but, unlike smaller molecules in the feedstock, are too large to enter the catalyst pores. Because of this, they are generally unable to react with hydrogen radicals located at the catalyst sites. As a result, the larger asphaltene free radicals are free to react with asphaltene and other free radicals in the feedstock, thereby forming larger molecules which continue increasing in size that can foul both the catalyst and the hydroprocessing equipment through the formation of coke precursors and sediment. The tendency of asphaltenes to form coke and sediment increases as the conversion level of the residuum increases due to the more strenuous conditions required to increase conversion. The undesirable reactions and fouling involving asphaltene greatly increase the catalyst and maintenance costs of ebullated-bed and fixed-bed hydrocracking processes. They also render existing commercial processes unsuitable for hydroprocessing vacuum tower bottoms and other very low quality feedstocks rich in asphaltenes.

Exacerbating the relatively low conversion levels using fixed bed hydroprocessing systems is the inability to proportionally convert the asphaltene fraction at the same conversion level as the heavy oil as a whole. Similarly, even though ebullated bed hydroprocessing systems are able to operate at substantially higher conversion levels than fixed bed systems, disproportional conversion of asphaltenes relative to the heavy oil as a whole is also problem with ebullated systems. The result of disproportional conversion is a progressive buildup of asphaltenes in the processed feedstock, with an attendant increase in the likelihood that coke and sediment will form in the reactor and other processing equipment.

Another problem, particularly acute in the case of ebullated-bed processes, involves continued free radical reaction in the catalyst free zones located (i) between the liquid recycle cup and the upper end of the expanded catalyst bed, (ii) between the plenum and distributor grid plate at the bottom of the catalyst bed, (iii) outside of solid catalysts within the expanded catalyst bed, and (iv) within the hot separator. The hydrocarbon free radicals generated at elevated temperatures within the ebullated bed are generally able to undergo hydrogenation reactions in the expanded catalyst zone as intended (except for larger asphaltene molecules, as discussed above). However, it is difficult for catalyzed hydrogenation reactions to occur within the catalyst free zones. Moreover, as product is withdrawn and sent to the hot separator, hydrocarbon free radicals continue to persist and may be further generated at high feedstock temperatures within the hot separator, which may only be about 2-4° C. (3.6-7.2° F.) less than the temperature of the feedstock in the ebullated bed. Because the hot separator includes no catalyst, free radicals tend to polymerize with each other rather than being capped by hydrogen through catalytic hydrogenation, thereby resulting in the formation of coke precursors and sediment with a high tendency for fouling of the hot separator, downstream heat exchangers, and even the vacuum distillation tower. The formation of coke precursors and sediment in the hot separator is exacerbated in the case where the feedstock includes a significant concentration of asphaltenes. Aside from equipment fouling, sediments often lead to instability of residual resid when it is used as a fuel oil.

To prevent fouling of the hot separator, the LC-Fining ebullated-bed hydrocracking reactor at Syncrude Canada in the Province of Alberta, Canada has been modified to reduce the temperature of the partially upgraded feedstock within the hot separator in order to reduce free radical formation and associated sediment formation and fouling that would otherwise occur in the absence of cooling. This is accomplished using an oil quench, in which cooler oil is pumped at elevated pressure to the entrance of the hot separator in order to reduce the temperature of the reactor product coming into the hot separator.

Another problem associated with conventional ebullated-bed hydrocracking processes is the need to carefully control the temperature and rapidly disperse the heat that accumulates within stagnant areas throughout the entire bed. Because many hydroconversion reactions are exothermic, and because heat can increase the rate of certain reactions, the formation of stagnant spots when the supported catalyst particles are not properly fluidized within the ebullated bed reactor can result in reactions that quickly get out of control. Stagnant spots of increased temperature can promote the formation of coke precursors and sediment, which can bind the catalyst particles together to form catalyst balls that are too heavy to be fluidized. Exothermic reactions tend to persist around the catalyst balls and stagnant zones. One ebullated-bed reactor actually blew up due to uncontrolled run-away reactions accelerated by stagnant zones caused by poor distribution of hydrogen, reportedly killing several workers in the vicinity of the reactor. Thermocouples are therefore typically placed throughout the ebullated bed in order to monitor and maintain an evenly controlled temperature throughout the reactor.

Fixed bed hydrocracking systems are even more prone to problems associated with overheating due to the closer proximity of the immobile solid catalyst particles. As a result, fixed bed systems must be operated using a shallow bed of catalyst only and while injecting cold hydrogen in between the catalyst beds to moderate the temperature before the partially converted feed and product are introduced to the next catalyst bed. Unlike an ebullated bed system, in which fresh catalyst is continually or periodically added and spent catalyst is continually or periodically withdrawn, the catalyst in a fixed-bed system can only be changed by entirely shutting down and cleaning the reactor. In addition, asphaltenes, coke and sediment plug up the catalyst bed, causing a drop in pressure. For the foregoing reasons, fixed-bed hydrocracking systems typically only operate for less than 8 months at lower conversion of about 15-25%, compared to ebullated-bed systems that typically have a conversion of about 50-60% for up to two years before shutdown, because of catalyst fouling that progressively deactivates the catalyst.

One attempt at obtaining the benefits of both ebullated bed and fixed bed systems is the so-called "moving bed" system in which fresh catalyst is periodically added to the top of a catalyst bed and spent catalyst is periodically removed from the bottom of the catalyst bed. This process has had little commercial success, however, due to the difficultly in actually adding and removing the catalyst while continuing to operate at the high pressures required to keep the hydroconversion process going.

In view of the foregoing, there is an ongoing need to develop improved hydroprocessing methods and systems that can be used at a commercial level to upgrade heavy oil feedstocks. There is also a need to develop hydroprocessing methods and systems that can be used to upgrade vacuum tower bottoms and other low grade heavy oil feedstocks that must now be processed at very low conversion levels to prevent equipment fouling.

SUMMARY OF THE INVENTION

The present invention involves methods and systems for hydroprocessing heavy oil feedstocks in a reactor to form an upgraded feedstock and then subjecting the upgraded feedstock to a hot separation process in a manner that inhibits or eliminates the formation of coke precursors and sediment. The inventive methods and systems utilize a colloidal or molecular hydroprocessing catalyst that overcomes the problems associated with the use of porous supported catalysts in upgrading heavy oil feedstocks, particularly the inability of porous supported catalysts to effectively process asphaltene molecules. The result is one or more of reduced equipment fouling, increased conversion level, enabling the reactor to process a wider range of lower quality feedstocks, and more efficient use of the supported catalyst if used in combination with the colloidal or molecular catalyst.

Instead of, or in addition to, a solid supported catalyst, colloidal-sized particles or molecules of a hydroprocessing catalyst are dispersed throughout the feedstock, with a significant portion being associated with asphaltene molecules that may be present in the feedstock. As the asphaltene molecules form free radicals during thermal cracking, the closely associated colloidal catalyst particles or molecules catalyze a reaction between the asphaltene radicals and hydrogen, thereby preferentially promoting beneficial upgrading reactions to form smaller hydrocarbon molecules that contain less sulfur instead of forming coke precursors and sediment. As a result, the asphaltene fraction found in heavy oil feedstocks can be upgraded into more usable materials along with the other hydrocarbons in the feedstock rather than simply being a coke and sediment precursor that is, at best, a waste product that must be disposed of and, at worst, a nemesis that can quickly deactivate the catalyst and/or foul the processing equipment, requiring substantially greater quantities of catalyst and/or costly shut downs and clean-up operations. Repeatedly shutting down pressurized vessels involving high temperature and high pressure cyclings can greatly increase the risk of damaging the mechanical integrity of the equipment and reduce their operating life.

The colloidal or molecular catalyst used within the method and systems according to the invention is typically formed in situ within the heavy oil feedstock prior to, or upon commencing, hydroprocessing of the feedstock. According to one embodiment, an oil soluble catalyst precursor composition comprising an organo-metallic compound or complex is blended with the heavy oil feedstock containing sulfur bearing molecules and thoroughly mixed in order to achieve a very high dispersion of the precursor within the feedstock prior to formation of the catalyst. An exemplary catalyst precursor composition is a molybdenum 2-ethylhexanoate complex containing approximately 15% by weight molybdenum.

In order to ensure thorough mixing of the precursor composition within the feedstock, the catalyst precursor composition is preferably preblended with a hydrocarbon oil diluent (e.g., vacuum gas oil, decant oil, cycled oil, or light gas oil) to create a diluted precursor mixture, which is thereafter blended with the heavy oil feedstock. The decomposition temperature of the catalyst precursor composition is selected so as to be sufficiently high so that the catalyst precursor composition resists substantial premature decomposition before intimate mixing of the catalyst precursor composition within the feedstock has been achieved. Subsequent heating of the feedstock to a temperature sufficient to cause the release of hydrogen sulfide from sulfur-bearing hydrocarbon molecules, either before or upon commencing hydroprocessing, causes the catalyst precursor composition that has been intimately mixed with the feedstock to yield individual metal sulfide catalyst molecules and/or extremely small particles that are colloidal in size (i.e., less than 100 nm, preferably less than about 10 nm, more preferably less than about 5 nm, and most preferably less than about 1 nm).

Once formed, the metal sulfide catalyst compound, being dissociated from the oil soluble portion of the catalyst precursor, is highly polar. On the other hand, oil feedstocks are very hydrophobic, making it impossible to disperse larger hydrophilic metal sulfide catalyst particles into smaller-sized particles within the feedstock, let alone so as to yield a colloidal or molecular dispersion of catalyst. This is true whether the metal catalyst compound is added directly to the oil feedstock as a solid powder or as part of an aqueous solution instead of using an oil soluble catalyst precursor composition as in the present invention to form the catalyst compound in situ within the feedstock. It is for this reason that the oil soluble precursor composition is intimately mixed with the feedstock before decomposition of the catalyst precursor composition and formation of the catalyst compound.

If the oil soluble catalyst precursor composition is well mixed throughout the heavy oil feedstock before decomposition, the metal catalyst atoms and/or metal catalyst compounds will be physically separated from each other and surrounded by the heavy oil feedstock molecules, which is believed to prevent or inhibit substantial agglomeration. It has been found that preblending the catalyst precursor composition with a hydrocarbon oil diluent prior to blending the resulting diluted precursor mixture within the feedstock greatly aids in ensuring that thorough blending of the precursor composition within the feedstock occurs before decomposition of the precursor composition to yield the catalyst, particularly in the case of large-scale industrial applications. The result of thorough mixing is that all, or a substantial portion, of the catalyst precursor composition is converted into individual metal sulfide molecules, or particles colloidal in size, instead of larger metal sulfide particles comprising a large number of metal sulfide compounds joined together. On the other hand, failure to intimately blend the oil soluble precursor composition into the feedstock before decomposition of the precursor results in the formation of larger catalyst particles (i.e., micron-sized or greater) comprising a relatively large number of metal sulfide molecules joined together rather than a molecular or colloidal dispersion of the metal sulfide catalyst.

Notwithstanding the generally hydrophobic nature of heavy oil feedstocks, because asphaltene molecules generally have a large number of oxygen, sulfur and nitrogen functional groups, as well as associated metal constituents such as nickel and vanadium, the asphaltene fraction is significantly less hydrophobic and more hydrophilic than other hydrocarbons within the feedstock. Asphaltene molecules therefore generally have a greater affinity for the polar metal sulfide catalyst, particularly when in a colloidal or molecular state, compared to more hydrophobic hydrocarbons in a heavy oil feedstock. As a result, a significant portion of the polar metal sulfide molecules or colloidal particles tend to become associated with the more hydrophilic and less hydrophobic asphaltene molecules compared to the more hydrophobic hydrocarbons in the feedstock. The close proximity of the catalyst particles or molecules to the asphaltene molecules helps promote beneficial upgrading reactions involving free radicals formed through thermal cracking of the asphaltene fraction. This phenomenon is particularly beneficial in the case of heavy oils that have a relatively high asphaltene content, which are otherwise difficult, if not impossible, to upgrade using conventional hydroprocessing techniques due to the tendency of asphaltenes to deactivate porous supported catalysts and deposit coke and sediments on or within the processing equipment.

According to one embodiment, metal catalyst atoms liberated from the organo-metallic precursor compound or complex react with sulfur liberated from the heavy oil feedstock during heating to yield metal catalyst compounds that comprise one or more types of metal sulfides. A non-limiting example of a useful metal sulfide catalyst that may be employed in the methods and systems according to the invention is molybdenum disulfide. A non-limiting example of a catalyst precursor composition used to form molybdenum disulfide is molybdenum 2-ethyl hexanoate.

The colloidal or molecular catalyst generally never becomes deactivated because it is not contained within the pores of a support material. Moreover, because of intimate contact with the heavy oil molecules, the molecular catalyst or colloidal catalyst particles can rapidly catalyze a hydrogenation reaction between hydrogen atoms and free radicals formed from the heavy oil molecules. Although the molecular or colloidal catalyst leaves the reactor with the upgraded product, it is constantly being replaced with fresh catalyst contained in the incoming feedstock. As a result, process conditions, throughput and conversion levels remain significantly more constant over time compared to processes that utilize solid supported catalysts as the sole hydroprocessing catalyst. Moreover, because the colloidal or molecular catalyst is more freely dispersed throughout the feedstock, including being intimately associated with asphaltenes, conversion levels and throughput can be significantly or substantially increased compared to conventional hydroprocessing systems.

The more uniformly dispersed colloidal or molecular catalyst is also able to more evenly distribute the catalytic reaction sites throughout the reaction chamber and feedstock. This reduces the tendency for free radicals to react with one another to form coke precursor molecules and sediment compared to ebullated bed reactors that only use a relatively large (e.g., ¼"×⅛" or ¼"×⅟₁₆") (6.35 mm×3.175 mm or 6.35 mm×1.5875 mm) supported catalyst, wherein the heavy oil molecules must diffuse into the pores of catalyst support to reach the active catalyst sites. As cited previously, an ebullated bed reactor inherently has catalyst free zones at the reactor bottom (plenum) and from above the expanded catalyst level to the recycle cup. In these catalyst free zones the heavy oil molecules continue undergoing thermal cracking reactions so as to form free radicals that may react with one another to produce coke precursor molecules and sediment. Some of the free radicals so formed will also exit the reactor as part of the upgraded feedstock in the hot separator.

At the most basic level, hydroprocessing systems according to the invention will typically include at least one hydrocracking reactor into which hydrogen gas and a heavy oil feedstock containing sulfur compounds having a colloidal or molecular catalyst dispersed therein are introduced and at least one hot separator into which the upgraded feedstock from the hydrocracking reactor is introduced. The feedstock is typically preheated prior to being introduced into the hydrocracking reactor. The feedstock and hydrogen gas are maintained at relatively high pressure in order for the hydrogen to dissolve within the feedstock and be available for catalytic reaction with the feedstock in the presence of the colloidal or molecular catalyst. According to one embodiment, the feedstock and hydrogen gas are introduced at the bottom of the hydrocracking reactor and the upgraded feedstock withdrawn from the top of the reactor. A hydrocracking reactor comprising a gas phase, consisting mainly of hydrogen, methane, ethane and other vaporized hydrocarbon products, and a heavy oil feedstock containing the colloidal or molecular catalyst as liquid phase will hereinafter be referred to as a "slurry phase reactor".

The upgraded feedstock withdrawn from the hydrocracking reactor is either fed directly into the hot separator or subjected to one or more intermediate processes and then fed into the hot separator in order to separate gases and volatile liquids from the non-volatile liquid fraction prior to further processing. Because at least a portion of the colloidal or molecular catalyst remains with the upgraded feedstock as it is withdrawn from the hydrocracking reactor (i.e., "residual" catalyst), it continues to be available as a hydroprocessing catalyst within the hot separator since the upgraded feedstock will also typically contain hydrogen dissolved therein. As a result, it is possible to maintain the upgraded feedstock at about, or just below, the temperature of the feedstock within the hydrocracking reactor while reducing or eliminating the risk of coke formation and fouling of the hot separator or other equipment downstream from the hydrocracking reactor. Maintaining the upgraded feedstock at a high temperature within the hot separator increases the efficiency of the overall process (i) by increasing the proportion of liquids that are volatile at the hot separation temperature and that can therefore be removed from the non-volatile liquid fraction through evaporation, (ii) by continuing beneficial hydroprocessing reactions, and (iii) by obviating the need to introduce quenching oil into the hot separator, which (iv) also reduces the additional load in the distillation tower.

In one embodiment, a hydroprocessing system according to the invention includes a single hydrocracking reactor in combination with a single hot separator. This basic hydroprocessing system may comprise a module within a larger, more complex refining system. Exemplary hydrocracking reactors that may be used as the single hydrocracking reactor in this embodiment include, but are not limited to, slurry phase reactors and ebullated bed reactors.

Alternatively, hydroprocessing systems according to the invention may include more than one hydroprocessing reactor, including a plurality of slurry phase reactors, or one or more slurry phase reactors in combination with one or more ebullated-bed, fixed-bed or moving-bed reactors. Hydroprocessing systems may include one or more hot separators positioned anywhere within the system. Hydroprocessing systems that include multiple hydroprocessing reactors and/or multiple hot separators may comprise a module within a larger, more complex refining system.

A hydroprocessing system according to one embodiment includes a slurry phase reactor, an ebullated bed, and a hot separator. The slurry phase reactor is used to upgrade a heavy oil feedstock that includes a colloidal or molecular catalyst prior to introducing the upgraded feedstock containing the colloidal or molecular catalyst into an ebullated bed that includes a solid supported catalyst for further hydroprocessing, including the removal of sulfur, nitrogen and trace metals from the upgraded feedstock. Compared to the molecules in the highest boiling fraction (including the asphaltene fraction) in the original feedstock, such molecules in the upgraded feedstock will be smaller and better able to diffuse into the pores of the solid supported catalyst in the ebullated bed reactor, which reduces the tendency of oversized hydrocarbon molecules to otherwise plug the pores of and deactivate the solid supported catalyst. As the colloidal or molecular catalyst from the upgraded feedstock will be freely and widely distributed throughout the ebullated bed reactor, including the zones outside of the expanded solid catalyst bed, the colloidal or molecular catalyst will provide additional hydrogen transfer to cap the free radicals outside the solid supported catalyst, thus further reducing the formation of sediment and coke precursors in the ebullated bed and protecting the solid supported catalyst from being fouled and deactivated by such sediment and coke precursors. The upgraded and further hydroprocessed feedstock is then fed into a hot separator to remove gases and volatile fractions from the liquid fraction. Unlike upgraded feedstocks from ebullated beds that only include a solid supported catalyst and no colloidal or molecular catalyst, no quenching of the upgraded and further hydroprocessed feedstock is required due to the continued presence of residual colloidal or molecular catalyst within the hot separator.

According to one variation, a first hot separator is positioned between the slurry phase reactor and the ebullated bed in order to remove the gaseous and volatile fractions from the upgraded feedstock instead of introducing them into the ebullated bed, thereby increasing the concentration of higher boiling fractions that can be upgraded in the ebullated bed. A second hot separator is thereafter used to remove gaseous and volatile fractions from an upgraded liquid fraction produced by and removed from the ebullated bed.

According to another embodiment, a slurry phase reactor is used in combination with a fixed bed reactor and a hot separator. The upgraded feedstock produced within the slurry phase reactor contains smaller molecules compared to the original feedstock. This, in turn, helps increase the rate of diffusion of feedstock through the pores of the solid supported catalyst within the fixed bed reactor, thereby increasing the conversion level and minimizing the deactivation of solid supported catalyst due to the plugging of pores by oversized hydrocarbon molecules and extending the life of the supported fixed bed catalyst. According to one embodiment, a hot separator is positioned between the slurry phase reactor and the fixed bed reactor. According to another embodiment, a second hot separator is positioned downstream from the fixed bed reactor. The system may advantageously include multiple fixed bed reactors, with the first fixed bed reactor in the sequence comprising a "guard bed" for preliminarily removing a substantial portion of the metals (including at least a portion of the colloidal or molecular catalyst) from the upgraded feedstock. The guard bed may advantageously include a supported catalyst that is especially designed to remove impurities such as sulfides of nickel, vanadium, iron, and molybdenum, while downstream fixed bed reactors may include a supported catalyst that is especially designed for hydrotreatment.

The benefits resulting from the foregoing systems include increased conversion levels and throughput, reduced pressure drop in the case of fixed-bed reactors, reduced catalyst fouling, slowing of the rate of increasing reactor temperature to compensate for catalyst deactivation that may otherwise occur, and/or reducing the frequency of shutting down the reactor to replace the solid supported catalyst. To further increase the efficiency of the hydroprocessing system, at least a portion of the liquid fraction from the one or more hot separators may be recycled back into one or more of the hydrocracking reactors in the hydroprocessing system for further upgrading. An advantage of recycling the liquid fraction is that it will still contain residual colloidal or molecular catalyst, thus permitting the residual catalyst to also be recycled, thereby reducing the overall demand for new catalyst. Another advantage is that the high boiling liquid fraction can be recycled back into the system with greatly reduced risk of fouling since the residual colloidal or molecular catalyst is continually available to inhibit or prevent the formation of coke precursors or sediment.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Figure 1:
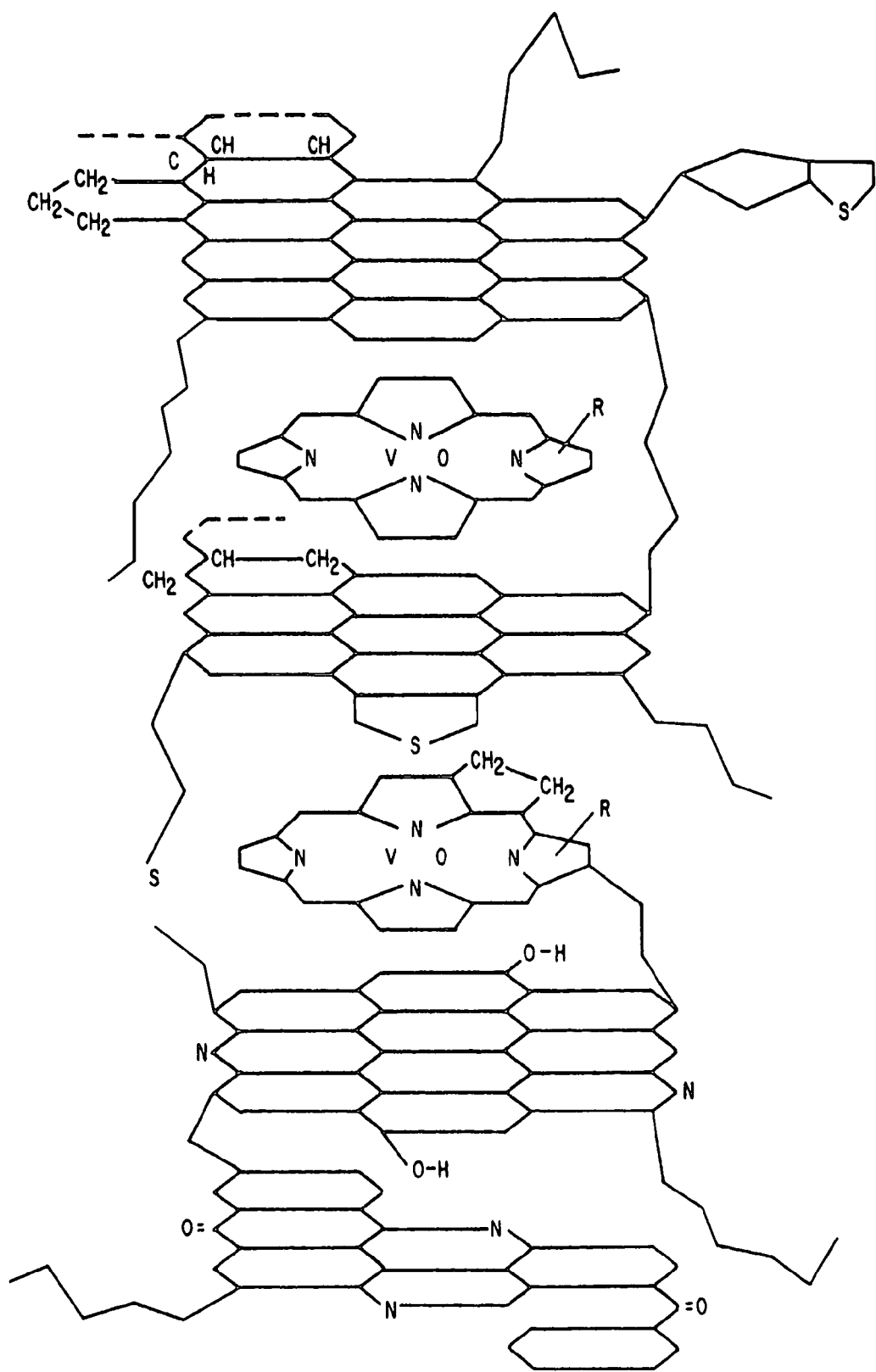
FIG. 1 depicts a hypothetical chemical structure for an asphaltene molecule.

The present invention relates to improved methods and systems that utilize a molecularly- or colloidally-dispersed catalyst compound for hydroprocessing heavy oil feedstocks to form an upgraded feedstock. The methods and systems employ at least one hydrocracking reactor and at least one hot separator. The continued presence of the colloidal or molecular catalyst in the hot separator and other areas of the hydroprocessing system containing dissolved hydrogen, which would typically be devoid of catalyst in conventional hydroprocessing systems, helps to inhibit or eliminate the formation of coke precursors and sediment. The colloidal or molecular catalyst also overcomes problems associated with porous solid supported catalysts, particularly the inability of such catalysts to effectively process asphaltene molecules. The inventive hydroprocessing methods and systems may utilize the colloidal or molecular catalyst alone or in combination with a solid supported catalyst.

The terms "colloidal catalyst" and "colloidally-dispersed catalyst" shall refer to catalyst particles having a particle size that is colloidal in size, e.g., less than about 100 nm in diameter, preferably less than about 10 nm in diameter, more preferably less than about 5 nm in diameter, and most preferably less than about 1 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essential "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The terms "residual catalyst", "residual molecular catalyst" and "residual colloidal catalyst" shall refer to catalyst molecules or colloidal particles that remain with an upgraded feedstock or material when transferred from one vessel to another (e.g., from a hydrocracking reactor to a hot separator, another hydroprocessing reactor, or distillation tower).

The term "conditioned feedstock" shall refer to a heavy oil feedstock into which an oil soluble catalyst precursor composition has been combined and mixed sufficiently so that, upon decomposition of the catalyst precursor and formation of the catalyst, the catalyst will comprise a colloidal or molecular catalyst dispersed within the feedstock.

The term "hydrocracking" shall refer to a process whose primary purpose is to reduce the boiling range of a heavy oil feedstock and in which a substantial portion of the feedstock is converted into products with boiling ranges lower than that of the original feedstock. Hydrocracking generally involves fragmentation of larger hydrocarbon molecules into smaller molecular fragments having a fewer number of carbon atoms and a higher hydrogen-to-carbon ratio. The mechanism by which hydrocracking occurs typically involves the formation of hydrocarbon free radicals during fragmentation followed by capping of the free radical ends or moieties with hydrogen. The hydrogen atoms or radicals that react with hydrocarbon free radicals during hydrocracking are generated at or by active catalyst sites.

The term "hydrotreating" shall refer to a more mild operation whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can also be used for hydrotreating, an example of which is an ebullated bed hydrotreater.

Of course, "hydrocracking" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The terms "solid supported catalyst", "porous supported catalyst" and "supported catalyst" shall refer to catalysts that are typically used in conventional ebullated bed and fixed bed hydroprocessing systems, including catalysts designed primarily for hydrocracking or hydrodemetallization and catalysts designed primarily for hydrotreating. Such catalysts typically comprise (i) a catalyst support having a large surface area and numerous interconnected channels or pores of uneven diameter and (ii) fine particles of an active catalyst such as sulfides of cobalt, nickel, tungsten, and molybdenum dispersed within the pores. For example a heavy oil hydrocracking catalyst manufactured by Criterion Catalyst, Criterion 317 trilube catalyst, has a bi-modal pore size distribution, with 80% of the pores ranging between 30 to 300 Angstroms with a peak at 100 Angstroms and 20% of the pores ranging between 1000 to 7000 Angstroms with a peak at 4000 Angstroms. The pores for the solid catalyst support are of limited size due to the need for the supported catalyst to maintain mechanical integrity to prevent excessive breakdown and formation of excessive fines in the reactor. Supported catalysts are commonly produced as cylindrical pellets or spherical solids.

The term "heavy oil feedstock" shall refer to heavy crude, oils sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, oil shale, or coal tar feedstocks to distillation, hot separation, and the like and that contain higher boiling fractions and/or asphaltenes.

The term "hydrocracking reactor" shall refer to any vessel in which hydrocracking (i.e., reducing the boiling range) of a feedstock in the presence of hydrogen and a hydrocracking catalyst is the primary purpose. Hydrocracking reactors are characterized as having an input port into which a heavy oil feedstock and hydrogen can be introduced, an output port from which an upgraded feedstock or material can be withdrawn, and sufficient thermal energy so as to form hydrocarbon free radicals in order to cause fragmentation of larger hydrocarbon molecules into smaller molecules. Examples of hydrocracking reactors include, but are not limited to, slurry phase reactors (i.e., a two phase, gas-liquid system), ebullated bed reactors (i.e., a three phase, gas-liquid-solid system), fixed bed reactors (i.e., a three-phase system that includes a liquid feed trickling downward over a fixed bed of solid supported catalyst with hydrogen typically flowing cocurrently, but possibly countercurrently in some cases).

The term "hydrocracking temperature" shall refer to a minimum temperature required to effect significant hydrocracking of a heavy oil feedstock. In general, hydrocracking temperatures will preferably fall within a range of about 410° C. (770° F.) to about 460° C. (860° F.), more preferably in a range of about 420° C. (788° F.) to about 450° C. (842° F.), and most preferably in a range of about 430° C. (806° F.) to about 445° C. (833° F.). It will be appreciated that the temperature required to effect hydrocracking may vary depending on the properties and chemical make up of the heavy oil feedstock. Severity of hydrocracking may also be imparted by varying the space velocity of the feedstock, i.e., the residence time of feedstock in the reactor, while maintaining the reactor at a fixed temperature. Milder reactor temperature and longer feedstock space velocity are typically required for heavy oil feedstock with high reactivity and/or high concentration of asphaltenes.

The term "gas-liquid slurry phase hydrocracking reactor" shall refer to a hydroprocessing reactor that includes a continuous liquid phase and a gaseous disperse phase which forms a "slurry" of gaseous bubbles within the liquid phase. The liquid phase typically comprises a hydrocarbon feedstock that may contain a low concentration of a colloidal catalyst or molecular-sized catalyst, and the gaseous phase typically comprises hydrogen gas, hydrogen sulfide, and vaporized low boiling point hydrocarbon products. The term "gas-liquid-solid, 3-phase slurry hydrocracking reactor" is used when a solid catalyst is employed along with liquid and gas. The gas may contain hydrogen, hydrogen sulfide and vaporized low boiling hydrocarbon products. The term "slurry phase reactor" shall broadly refer to both type of reactors (e.g., those with a colloidal or molecular catalyst, those with a micron-sized or larger particulate catalyst, and those that include both). In most cases, it shall refer to a reactor that at least includes a colloidal or molecular catalyst. An exemplary slurry phase reactor is disclosed in U.S. application Ser. No. 10/225,937, filed Aug. 22, 2002, and entitled "APPARATUS FOR HYDROCRACKING AND/OR HYDROGENATING FOSSIL FUELS", the disclosure of which is incorporated herein by specific reference.

The term "asphaltene" shall refer to the fraction of a heavy oil feedstock that is typically insoluble in paraffinic solvents such as propane, butane, pentane, hexane, and heptane and that includes sheets of condensed ring compounds held together by hetero atoms such as sulfur, nitrogen, oxygen and metals. Asphaltenes broadly include a wide range of complex compounds having anywhere from 80 to 160,000 carbon atoms, with predominating molecular weights, as determined by solution techniques, in the 5000 to 10,000 range. About 80-90% of the metals in the crude oil are contained in the asphaltene fraction which, together with a higher concentration of non-metallic hetero atoms, renders the asphaltene molecules more hydrophilic and less hydrophobic than other hydrocarbons in crude. A hypothetical asphaltene molecule structure developed by A. G. Bridge and co-workers at Chevron is depicted in FIG. 1.

The terms "upgrade", "upgrading" and "upgraded", when used to describe a feedstock that is being or has been subjected to hydroprocessing, or a resulting material or product, shall refer to one or more of a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

II. Exemplary Hydroprocessing Methods and Systems

Figure 2:
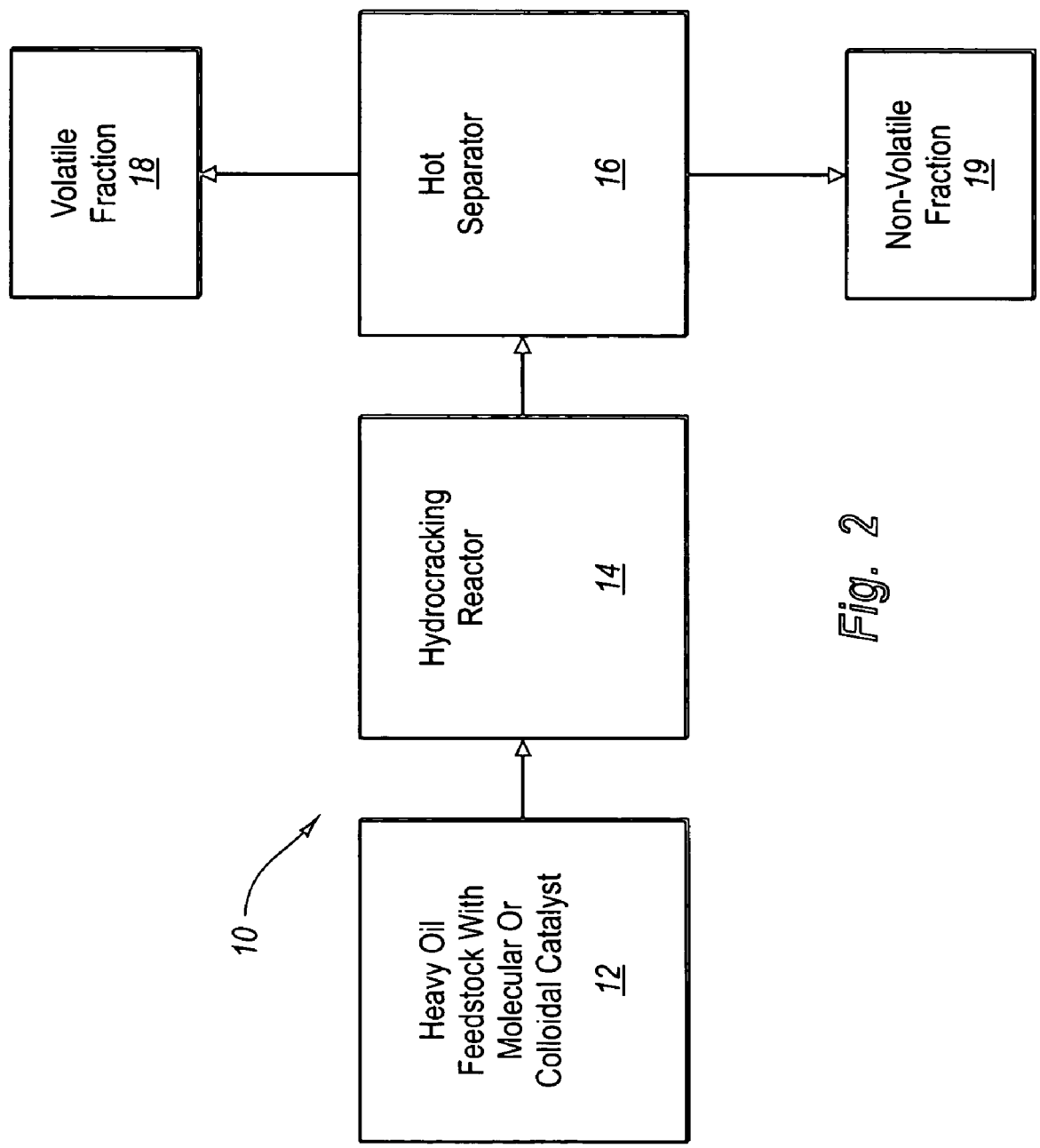
FIG. 2 is a block diagram that schematically illustrates a hydroprocessing system according to the invention for upgrading a heavy oil feedstock.

FIG. 2 depicts an exemplary hydroprocessing system 10 according to the invention comprising a heavy oil feedstock 12 having a colloidal or molecular catalyst dispersed therein, a hydrocracking reactor 14 within which an upgraded feedstock or material is produced from the heavy oil feedstock, and a hot separator 16 into which upgraded feedstock or material withdrawn from the hydrocracking reactor 14 is transferred in order to separate gaseous and volatile liquid fractions 18 from a non-volatile liquid fraction 19. The heavy oil feedstock 12 may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, and other resid fractions.

A common characteristic of heavy oil feedstocks 12 that may advantageously be upgraded using the hydroprocessing methods and systems (according to the invention) is that they include a significant fraction of high boiling point hydrocarbons (i.e., at or above 343° C. (650° F.), more particularly at or above about 524° C. (975° F.)) and/or asphaltenes. Asphaltenes are complex hydrocarbon molecules that include a relatively low ratio of hydrogen to carbon that is the result of a substantial number of condensed aromatic and naphthenic rings with paraffinic side chains (see FIG. 1). Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

The hydrocracking reactor 14 may comprise any hydrocracking reactor or system of reactors known in the art, including but not limited to, one or more gas-liquid slurry-phase reactors, ebullated bed reactors, fixed bed reactors, or moving bed reactors. Ebullated bed, fixed bed, and moving bed reactors are three phase slurry systems consisting of a solid catalyst, a liquid feedstock, and a gas containing hydrogen, hydrogen sulfide, and vaporized low boiling hydrocarbons. A significant difference between the hydrocracking reactor 14 within hydroprocessing system 10 according to the invention and conventional hydrocracking reactors is that the heavy oil feedstock 12 introduced into the hydrocracking reactor 14 includes the colloidal or molecular catalyst and/or a well-dispersed catalyst precursor composition capable of forming the colloidal or molecular catalyst in situ within the feed heaters and/or the hydrocracking reactor 14. The colloidal or molecular catalyst, the formation of which is discussed in more detail below, may be used alone or in combination with other catalysts, such as conventional solid supported catalysts (e.g., porous catalysts with active catalytic sites located within the pores).

The hot separator 16 may comprise any hot separator known in the art. The main difference between hot separator 16 within hydroprocessing system 10 according to the invention and hot separators used in conventional systems is that the upgraded feedstock or material that is introduced into the hot separator 16 includes residual colloidal or molecular catalyst dispersed therein as well as dissolved hydrogen. As a result, any hydrocarbon free radicals, including asphaltene free radicals, that are generated within the hot separator 16 and/or which persist within the upgraded feedstock as withdrawn from the hydrocracking reactor 14 can be further hydroprocessed in the hot separator 16.

More particularly, the colloidal or molecular catalyst within the upgraded feedstock or material transferred from the hydrocracking reactor 14 to the hot separator 16 is able to catalyze beneficial upgrading or hydrotreating reactions between the hydrocarbon free radicals and hydrogen within the hot separator 16. The result is a more stable upgraded feedstock, decreased sediment and coke precursor formation, and decreased fouling of the hot separator 16 compared to hydroprocessing systems that do not utilize a colloidal or molecular catalyst (e.g., conventional ebullated bed systems which require quenching of the hot separator with cooler oil in order to reduce the tendency of free radicals within the upgraded material to form coke precursors and sediment in the hot separator in the absence of any catalyst).

Figure 3:
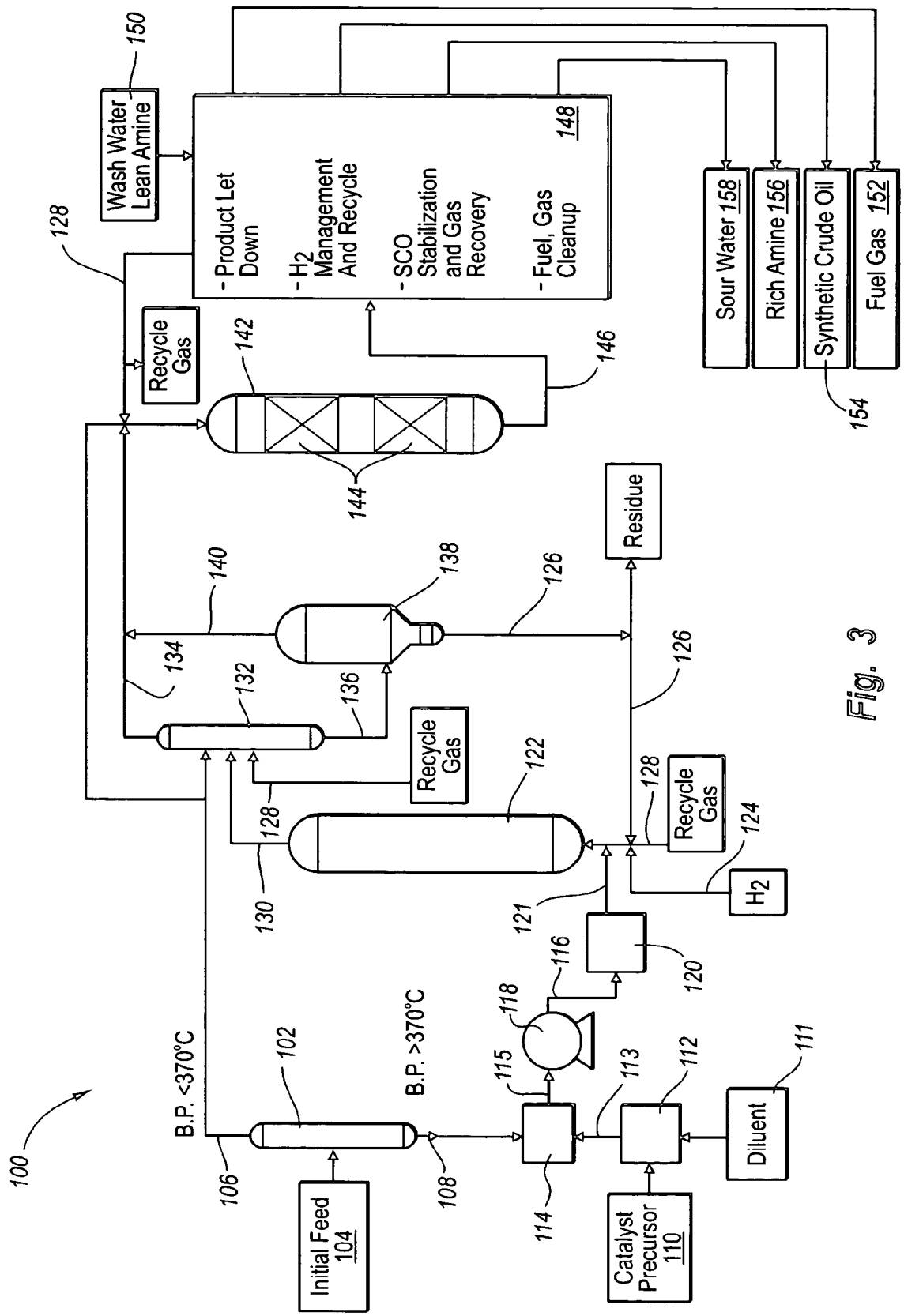
FIG. 3 schematically illustrates a refining system that includes a hydroprocessing system according to the invention as a module within the overall system.

FIG. 3 depicts an exemplary refining system 100 that incorporates a hydroprocessing system according to the invention. The refining system 100 may itself comprise a module within an even more detailed and complex oil refinery system, including a module that is added to a pre-existing refinery system as part of an upgrade. The refining system 100 more particularly includes a distillation tower 102 into which an initial feed 104 comprising a significant fraction of higher boiling hydrocarbons is introduced. By way of example and not limitation, gases and/or lower boiling hydrocarbons 106 having a boiling point less than 370° C. (698° F.) are separated from a higher boiling liquid fraction 108 comprising materials having a boiling point greater than 370° C. (698° F.). In this embodiment, the higher boiling liquid fraction 108 comprises a "heavy oil feedstock" within the meaning of this term.

An oil soluble catalyst precursor composition 110 is preblended with a hydrocarbon oil fraction or diluent 111 having a boiling range between 250-524° C. (482-975° F.), preferably having boiling point between 360-500° C. (680-932° F.), and mixed for a period of time in a pre-mixer 112 to form a diluted precursor mixture 113 in which the precursor composition 110 is well-mixed with the diluent 111. By way of example and not limitation, the pre-mixer 112 may be an in-line static mixer. The diluted precursor mixture 113 and heavy oil feedstock 108 are combined within a mixer or conditioning chamber 114 in order to thoroughly disperse the catalyst precursor composition 110 within the heavy oil feedstock 108 and form an initially conditioned feedstock 115. The conditioning chamber 114 may also serves as a surge vessel for the feedstock 108. In other words, mixing of the feedstock and catalyst precursor composition may be carried out in a surge vessel commonly used to dampen flow fluctuation ahead of downstream processing units. By way of example and not limitation, the mixing in chamber 114 may consist of a pump around loop system.

The initially conditioned feedstock 115 is pressurized using a multi-stage pump 118. The pump 118 may consist of many compression stages, with each stage providing additional mixing and blending of the catalyst precursor composition 110 within the initially conditioned feedstock 115 to form the finally conditioned feedstock 116 in which the precursor composition 110 is more thoroughly mixed throughout the feedstock 108.

The finally conditioned feedstock 116 is introduced into a pre-heater or furnace 120 so as to heat the finally conditioned feedstock 116 to a temperature that is about 100° C. (212° F.), preferably about 50° C. (122° F.) below the temperature in the slurry phase reactor 122. The oil soluble catalyst precursor composition 110 dispersed throughout the feedstock 108 decomposes and combines with sulfur released from the heavy oil feedstock 108 to yield a colloidal or molecular catalyst as the conditioned feedstock 116 travels through the pre-heater of furnace 120 and is heated to a temperature higher than the decomposition temperature of the catalyst precursor composition. This yields a prepared feedstock 121, which is introduced under pressure into a slurry phase reactor 122. Hydrogen gas 124 is also introduced into the reactor 122 under pressure in order to effect hydrocracking of the prepared feedstock 121 within the slurry phase reactor 122. Heavy oil resid bottoms 126 and/or recycle gas 128 produced downstream from the slurry phase reactor 122 may optionally be recycled back into the reactor 122. The resid bottoms 126 may advantageously include residual colloidal or molecular catalyst dispersed therein. The recycle gas 128 advantageously includes hydrogen. The slurry phase reactor 122 may contain a recycle channel, recycling pump, and distributor grid plate as in a conventional ebullated bed reactor to promote more even dispersion of reactants, catalyst, and heat (e.g., in a manner similar to conventional ebullated bed reactors).

The prepared feedstock 121 within the slurry phase reactor 122 is heated or maintained at a hydrocracking temperature, which causes or allows the prepared feedstock 121, in combination with catalyst and hydrogen in the reactor 122, to be upgraded so as to form an upgraded feedstock 130 that is withdrawn at the top of the reactor 122. According to one embodiment, the upgraded feedstock 130 is transferred directly to a hot separator 132, optionally together with at least a portion of the lower boiling point fraction 106 from the distillation tower 102 and/or recycle gas 128 produced downstream. Alternatively, the upgraded feedstock 130 may be introduced into one or more hydroprocessing reactors (not shown) prior to being transferred to the hot separator 132.

Gases and volatile liquids 134 are removed from the top of hot separator 132 and sent downstream for further processing. A higher boiling liquid fraction 136 is withdrawn from the bottom of the hot separator 132 and further processed. According to one embodiment, it is introduced into a vacuum tower 138 in order to separate lower boiling fractions 140 that can be volatilized through vacuum distillation and a high boiling resid fraction 126 of lower quality that is withdrawn from the bottom of vacuum tower 138 and either used as a residue or recycled back into the slurry phase reactor 122, as discussed above. The residue may also be used as a feedstock to provide gaseous product in a gasification reactor.

The lower boiling fraction 140 may be combined with at least a portion of the lower boiling point fraction 106 withdrawn from the distillation tower 102 and the gases and volatile liquids 134 removed from the hot separator 132 and introduced into a mixed feed hydrotreater 142. The mixed feed hydrotreater 142 comprises one or more beds of solid supported catalyst 144 that effects hydrotreatment of the materials introduced therein. Mixed feed hydrotreater 142 is an example of a fixed bed reactor. The product stream consisting of 106, 134, and 140 may also be processed in a catalytic hydrocracking fixed bed reactor or hydrotreater 142.

The hydrotreated material 146 is withdrawn from the hydrotreater 142 and then subjected to one or more downstream separation or cleaning processes 148. Recycle gas 128 comprising hydrogen may be recycled back into the slurry phase reactor 122 and/or hot separator 132, as discussed above. Wash water and lean amine 150 may be used to wash the hydrotreated material 146 in order to yield a variety of products, including fuel gas 152, synthetic crude oil 154, rich amine 156, and sour water 158. The amine is used to remove $H_2S$. The wash water is used to dissolve ammonium salts which otherwise may form crystals that can become deposited on the equipment, thereby restricting the flow of fluid.

A. Preparation and Characteristics of Colloidal or Molecular Catalyst

Figure 4:
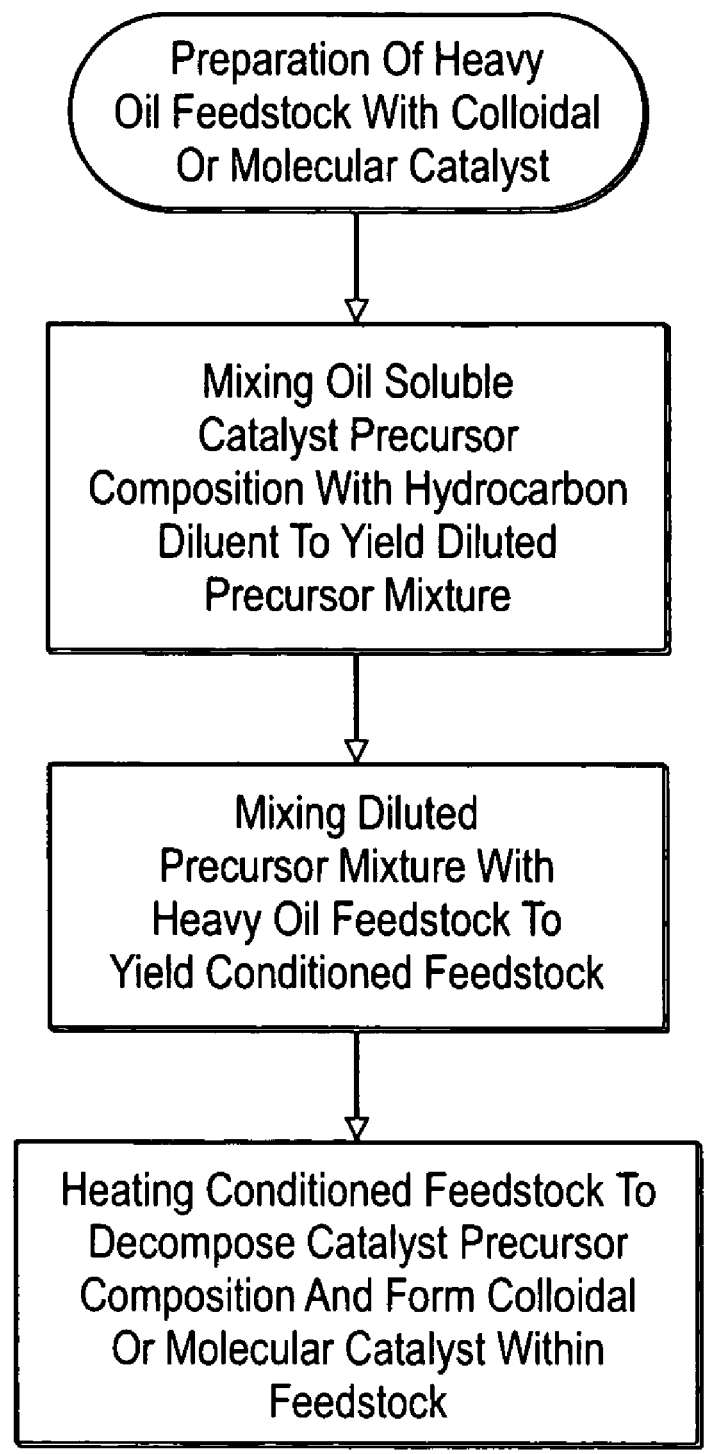
FIG. 4 is a flow diagram that schematically illustrates an exemplary process for preparing a heavy oil feedstock to include a colloidal or molecular catalyst dispersed therein.

The inventive methods according to the invention include the preliminary step of preparing a heavy oil feedstock so as to have a colloidal or molecular catalyst dispersed therein, an example of which is schematically illustrated in the flow diagram depicted in FIG. 4. According to one embodiment, an oil soluble catalyst precursor composition is pre-mixed with a diluent hydrocarbon stream to form a diluted precursor mixture.

The oil soluble catalyst precursor preferably has a decomposition temperature in a range from about 100° C. (212° F.) to about 350° C. (662° F.), more preferably in a range of about 150° C. (302° F.) to about 300° C. (572° F.), and most preferably in a range of about 175° C. (347° F.) to about 250° C. (482° F.). Examples of exemplary catalyst precursor compositions include organometallic complexes or compounds, more specifically, oil soluble compounds or complexes of transition metals and organic acids. A currently preferred catalyst precursor is molybdenum 2-ethylhexanoate (also commonly known as molybdenum octoate) containing 15% by weight molybdenum and having a decomposition temperature or range high enough to avoid substantial decomposition when mixed with a heavy oil feedstock at a temperature below about 250° C. (482° F.). Other exemplary precursor compositions include, but are not limited to, molybdenum naphthanate, vanadium naphthanate, vanadium octoate, molybdenum hexacarbonyl, vanadium hexacarbonyl, and iron pentacarbonyl. One of skill in the art can, following the present disclosure, select a mixing temperature profile that results in intimate mixing of a selected precursor composition without substantial decomposition prior to formation of the colloidal or molecular catalyst.

Examples of suitable hydrocarbon diluents include, but are not limited to, vacuum gas oil (which typically has a boiling range of 360-524° C.) (680-975° F.), decant oil or cycle oil (which typically has a boiling range of 360-550° C.) (680-1022° F.), and light gas oil (which typically has a boiling range of 200-360° C.) (392-680° F.).

The ratio of catalyst precursor composition to hydrocarbon oil diluent is preferably in a range of about 1:500 to about 1:1, more preferably in a range of about 1:150 to about 1:2, and most preferably in a range of about 1:100 to about 1:5 (e.g., 1:100, 1:50, 1:30, or 1:10).

The catalyst precursor composition is advantageously mixed with the hydrocarbon diluent at a temperature below which a significant portion of the catalyst precursor composition starts to decompose, preferably, at temperature in a range of about 25° C. (77° F.) to about 250° C. (482° F.), more preferably in range of about 50° C. (122° F.) to about 200° C. (392° F.), and most preferably in a range of about 75° C. (167° F.) to about 150° C. (302° F.), to form the diluted precursor mixture. It will be appreciated that the actual temperature at which the diluted precursor mixture is formed typically depends largely on the decomposition temperature of the particular precursor composition that is utilized. The precursor composition is preferably mixed with the hydrocarbon oil diluent for a time period in a range of about 1 second to about 20 minutes, more preferably in a range of about 5 seconds to about 10 minutes, and most preferably in a range of about 20 seconds to about 5 minutes. The actual mixing time is dependent, at least in part, on the temperature (i.e., which affects the viscosity of the fluids) and mixing intensity. Mixing intensity is dependent, at least in part, on the number of stages e.g., for in-line static mixer.

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al., the disclosure of which is incorporated by reference, describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive.

It has now been found that preblending the precursor composition with a hydrocarbon diluent prior to blending the diluted precursor mixture with the heavy oil feedstock greatly aids in thoroughly and intimately blending the precursor composition within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor composition and the heavy oil feedstock, (2) reducing or eliminating differences in rheology between the catalyst precursor composition and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor composition can cause localized agglomeration of the precursor composition, resulting in poor dispersion and formation of micron-sized or larger catalyst particles. The hydrocarbon oil diluent is preferably substantially water free (i.e., contains less than about 0.5% water) to prevent the formation of substantial quantities of micron-sized or larger catalyst particles.

The diluted precursor mixture is then combined with the heavy oil feedstock and mixed for a time sufficient and in a manner so as to disperse the catalyst precursor composition throughout the feedstock in order to yield a conditioned feedstock composition in which the precursor composition is thoroughly mixed within the heavy oil feedstock. In order to obtain sufficient mixing of the catalyst precursor composition within the heavy oil feedstock so as to yield a colloidal or molecular catalyst upon decomposition of the precursor composition, the diluted precursor mixture and heavy oil feedstock are preferably mixed for a time period in a range of about 1 second to about 20 minutes, more preferably in a range from about 5 second to about 10 minutes, and most preferably in a range of about 20 seconds to about 3 minutes. Increasing the vigorousness and/or shearing energy of the mixing process generally reduce the time required to effect thorough mixing.

Examples of mixing apparatus that can be used to effect thorough mixing of the catalyst precursor composition and heavy oil feedstock include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers; multiple static in-line mixers in combination with in-line high shear mixers follows by a pump around in the surge vessel; combinations of the above followed by one or more multi-stage centrifugal pumps; and one or more multi-stage centrifugal pumps. According to one embodiment, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor composition is mixed with the hydrocarbon oil diluent to form the catalyst precursor mixture.

Alternatively, the diluted precursor mixture can be initially mixed with 20% of the heavy oil feedstock, the resulting mixed heavy oil feedstock can be mixed in with another 40% of the heavy oil feedstock, and the resulting 60% of the mixed heavy oil feedstock can be mixed in with the remainder 40% of heavy oil in accordance with good engineering practice of progressive dilution to thoroughly dispersed the catalyst precursor in the heavy oil feedstock. Vigorous adherence to the mixing time in the appropriate mixing devices or methods described herein should still be used in the progressive dilution approach.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock composition. In general, decreasing the viscosity of the heavy oil feedstock will reduce the time required to effect thorough and intimate mixing of the oil soluble precursor composition within the feedstock. However, the feedstock should not be heated to a temperature above which significant decomposition of the catalyst precursor composition occurs until after thorough and complete mixing to form the blended feedstock composition. Prematurely decomposing the catalyst precursor composition generally results in the formation of micron-sized or larger catalyst particles rather than a colloidal or molecular catalyst. The heavy oil feedstock and diluted precursor mixture are preferably mixed and conditioned at a temperature in a range of about 25° C. (77° F.) to about 350° C. (662° F.), more preferably in a range of about 50° C. (122° F.) to about 300° C. (572° F.), and most preferably in a range of about 75° C. (167° F.) to about 250° C. (482° F.) to yield the conditioned feedstock.

After the catalyst precursor composition has been well-mixed throughout the heavy oil feedstock so as to yield the conditioned feedstock composition, this composition is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the heavy oil feedstock to a temperature sufficient to liberate the sulfur therefrom. In some cases, sulfur may be liberated at the same temperature that the precursor composition decomposes. In other cases, further heating to a higher temperature may be required.

If the oil soluble catalyst precursor composition is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor composition throughout the feedstock will yield individual catalyst molecules rather than colloidal particles. Simply blending, while failing to sufficiently mix, the catalyst precursor composition with the feedstock typically causes formation of large agglomerated metal sulfide compounds that are micron-sized or larger.

In order to form the metal sulfide catalyst, the blended feedstock composition is preferably heated to a temperature in a range of about 275° C. (527° F.) to about 450° C. (842° F.), more preferably in a range of about 350° C. (662° F.) to about 440° C. (824° F.), and most preferably in a range of about 375° C. (707° F.) to about 420° C. (788° F.). According to one embodiment, the conditioned feedstock is heated to a temperature that is about 100° C. (180° F.) less than the hydrocracking temperature within the hydrocracking reactor, preferably about 50° C. (90° F.) less than the hydrocracking temperature. According to one embodiment, the colloidal or molecular catalyst is formed during preheating before the heavy oil feedstock is introduced into the hydrocracking reactor. According to another embodiment, at least a portion of the colloidal or molecular catalyst is formed in situ within the hydrocracking reactor itself. In some cases, the colloidal or molecular catalyst can be formed as the heavy oil feedstock is heated to a hydrocracking temperature prior to or after the heavy oil feedstock is introduced into a hydrocracking reactor. The initial concentration of the catalyst metal in the colloidal or molecular catalyst is preferably in a range of about 5 parts per million (ppm) to about 500 ppm by weight of the heavy oil feedstock, more preferably in a range of about 15 ppm to about 300 ppm, and most preferably in a range of about 25 ppm to about 175 ppm. The catalyst may become more concentrated as volatile fractions are removed from a non-volatile resid fraction.

Figure 5:
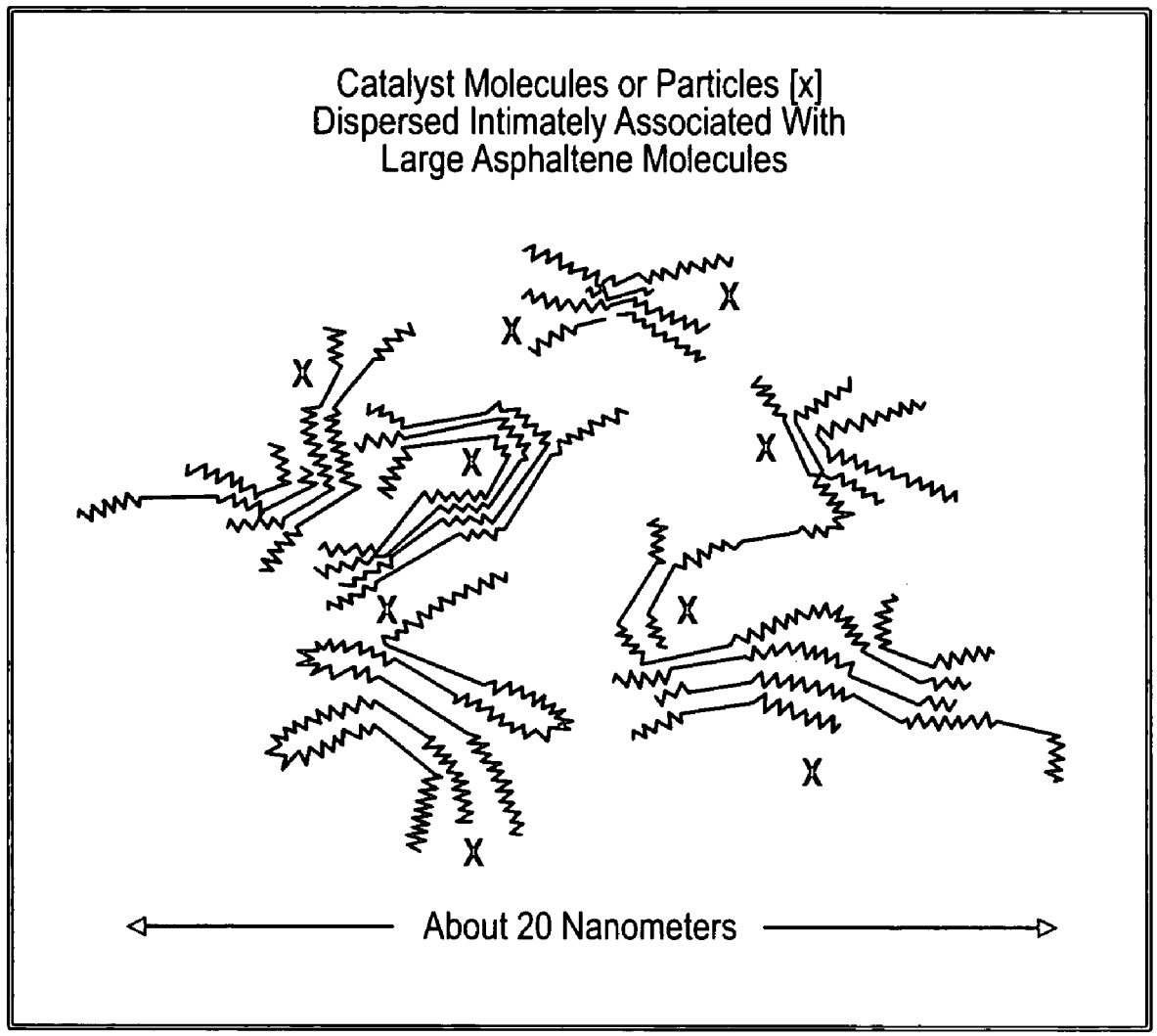
FIG. 5 schematically illustrates catalyst molecules or colloidal-sized catalyst particles associated with asphaltene molecules.

In the case where the heavy oil feedstock includes a significant quantity of asphaltene molecules, the catalyst molecules or colloidal particles will preferentially associate with, or remain in close proximity to, the asphaltene molecules. Asphaltene has a greater affinity for the colloidal or molecular catalyst since asphaltene molecules are generally more hydrophilic and less hydrophobic than other hydrocarbons contained within the heavy oil feedstock. Because the colloidal or molecular catalyst tends to be very hydrophilic, the individual particles or molecules will tend to migrate toward the more hydrophilic moieties or molecules within the heavy oil feedstock. FIG. 5 schematically depicts catalyst molecules, or colloidal particles "X" associated with, or in close proximity to, the asphaltene molecules.

While the highly polar nature of the catalyst compound causes or allows the colloidal or the molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion. Such methods inevitably yield micron-sized or larger catalyst particles.

Figure 6A:
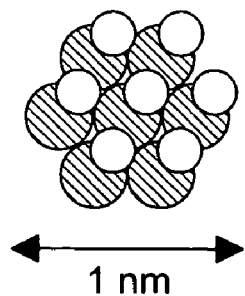
FIGS. 6A and 6B schematically depict top and side views of a molybdenum disulfide crystal approximately 1 nm in size.
Figure 6B:
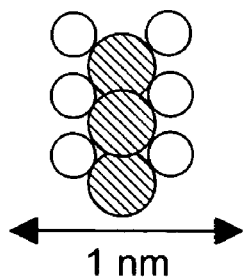

Reference is now made to FIGS. 6A and 6B, which schematically depict a nanometer-sized molybdenum disulfide crystal. FIG. 6A is a top view, and FIG. 6B is a side view of a molybdenum disulfide crystal. Molecules of molybdenum disulfide typically form flat, hexagonal crystals in which single layers of molybdenum (Mo) atoms are sandwiched between layers of sulfur (S) atoms. The only active sites for catalysis are on the crystal edges where the molybdenum atoms are exposed. Smaller crystals have a higher percentage of molybdenum atoms exposed at the edges.

The diameter of a molybdenum atom is approximately 0.3 nm, and the diameter of a sulfur atom is approximately 0.2 nm. A nanometer-sized crystal of molybdenum disulfide has 7 molybdenum atoms sandwiched in between 14 sulfur atoms. As best seen in FIG. 6A, 6 out of 7 (85.7%) of the total molybdenum atoms will be exposed at the edge and available for catalytic activity. In contrast, a micron-sized crystal of molybdenum disulfide has several million atoms, with only about 0.2% of the total molybdenum atoms being exposed at the crystal edge and available for catalytic activity. The remaining 99.8% of the molybdenum atoms in the micron-sized crystal are embedded within the crystal interior and are therefore unavailable for catalysis. This means that nanometer-sized molybdenum disulfide particles are, at least in theory, orders of magnitude more efficient than micron-sized particles in providing active catalyst sites.

In practical terms, forming smaller catalyst particles results in more catalyst particles and more evenly distributed catalyst sites throughout the feedstock. Simple mathematics dictates that forming nanometer-sized particles instead of micron-sized particles will result in approximately $1000^3$ (or 1 million) to $1000^3$ (or 1 billion) times more particles depending on the size and shape of the catalyst crystals. That means there are approximately 1 million to 1 billion times more points or locations within the feedstock where active catalyst sites reside. Moreover, nanometer-sized or smaller molybdenum disulfide particles are believed to become intimately associated with asphaltene molecules, as shown in FIG. 5. In contrast, micron-sized or larger catalyst particles are believed to be far too large to become intimately associated with or within asphaltene molecules.

B. Hydroprocessing Methods

Figure 7:
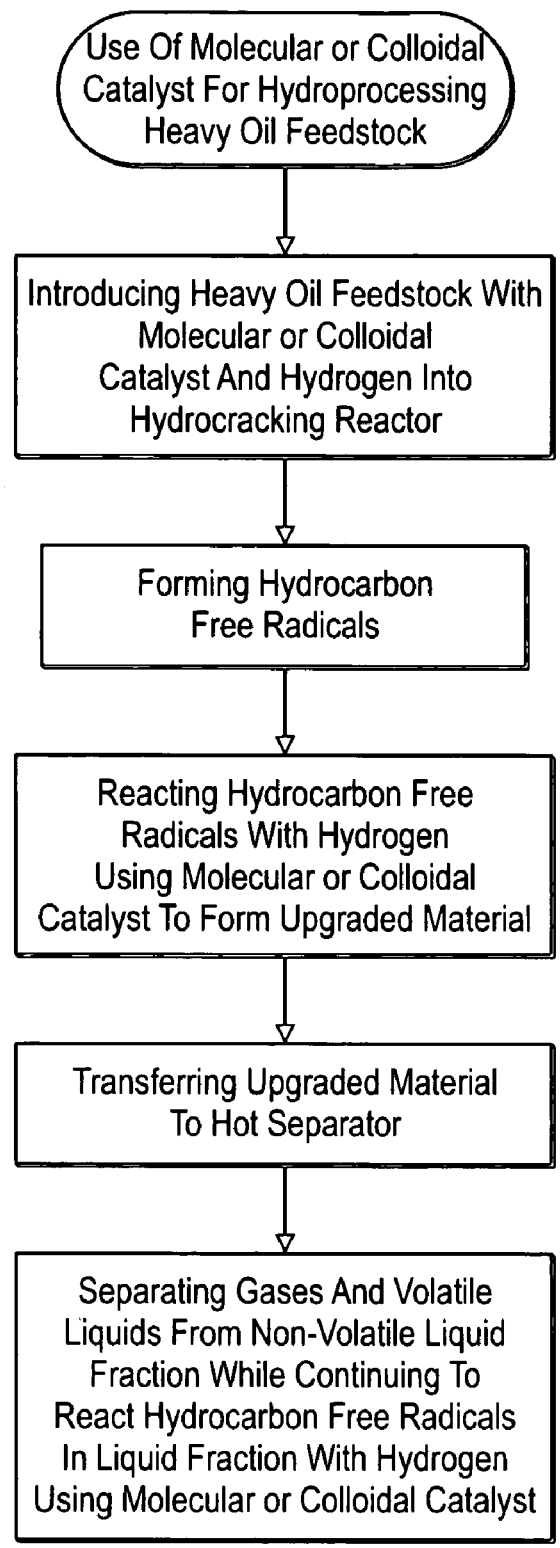
FIG. 7 is a flow diagram that schematically illustrates an exemplary hydroprocessing method according to the invention for upgrading a heavy oil feedstock.

FIG. 7 is a flow diagram that schematically illustrates a method for hydroprocessing a heavy oil feedstock according to the invention. First, a heavy oil feedstock is introduced together with hydrogen into a hydrocracking reactor. The colloidal or molecular catalyst may be formed in situ within the heavy oil feedstock prior to introducing the feedstock in the hydrocracking reactor, or at least a portion of the colloidal or molecular catalyst may be generated in situ within the hydrocracking reactor itself. Examples of suitable hydrocracking reactors that may be used in this first step or subpart of the method include gas-liquid slurry phase reactors, ebullated bed reactors, fixed bed reactors and moving bed reactors.

The heavy oil feedstock is heated to or maintained at a hydrocracking temperature so as to form hydrocarbon free radicals from hydrocarbon molecules in the heavy oil feedstock. The feedstock may be introduced into the hydrocracking reactor already heated to the hydrocracking temperature, or may be heated within the hydrocracking reactor to the hydrocracking temperature in order to yield the hydrocarbon free radicals. The colloidal or molecular catalyst within the feedstock catalyzes upgrading reactions between the hydrocarbon free radicals and the hydrogen within the hydrocracking reactor to form an upgraded feedstock or material. According to one embodiment, excess hydrogen is introduced into the hydrocracking reactor in order to ensure high conversion levels and throughput.

The upgraded material or feedstock is withdrawn from the hydrocracking reactor and transferred to a hot separator. As discussed in more detail below, the upgraded material may alternatively be introduced into one or more additional hydroprocessing reactors for further upgrading prior to introducing the further upgraded material into the hot separator.

The hot separator allows or causes separation of gases and volatile liquids from a non-volatile liquid fraction. The gaseous and volatile liquid fractions are advantageously withdrawn from the top of the hot separator and the non-volatile (or less volatile) liquid fraction is withdrawn from the bottom of the hot separator. Residual colloidal or molecular catalyst within the liquid fraction continues to catalyze hydrogenation reactions between residual or newly added hydrogen and hydrocarbon free radicals that persist and/or that are newly generated within the hot separator. Because catalytic hydrogenation reactions continue, the temperature within the hot separator can be maintained at or near the hydrocracking temperature without fouling the equipment as a result of the formation of coke precursors and sediment, which could otherwise occur within the hot separator if the asphaltene radicals were allowed to react with each other and other hydrocarbon radicals instead of being capped with hydrogen.

In general, the temperature of the upgraded feedstock or material within the hot separator is preferably maintained at a temperature within about 20° F. (about 11° C.) of the hydrocracking temperature within the hydrocracking reactor, more preferably within about 10° F. (about 5.5° C.) of the hydrocracking temperature, and most preferably within about 5° F. (about 2.75° C.) of the hydrocracking temperature. According to one embodiment, the temperature of the upgraded feedstock or material within the hot separator is maintained at a temperature in a range of about 2-4° C. (3.6-7.2° F.) of the hydrocracking temperature. Maintaining the temperature of the upgraded material within the hot separator near the hydrocracking temperature is advantageous for several reasons. One advantage is the ability to volatilize higher boiling liquids so as to separate a greater fraction of such volatile liquids from the remaining liquid fraction. Another is that maintaining a high temperature in combination with a colloidal or molecular catalyst and residual or newly added hydrogen continues to result in beneficial hydrogenation reactions between hydrocarbon free radicals that persist or that are generated within the hot separator, further upgrading the liquid fraction within the hot separator, and preventing or inhibiting formation of coke precursors and sediment. This obviates the need to cool the upgraded material prior to introducing it into the hot separator, which can be costly and wasteful. In particular, it makes quenching with cooler oil to reduce the temperature in the hot separator unnecessary.

The inventive hydroprocessing methods according to the invention that utilize a colloidal or molecular catalyst are able to achieve high conversion levels of heavy oil feedstocks that include significant quantities of asphaltenes. As compared to fixed bed hydroprocessing methods, for example, which are only capable of conversion levels of about 25%, the hydroprocessing methods of the present invention preferably achieve conversion levels of at least about 50%, more preferably at least about 65%, and most preferably at least about 80%. Use of the colloidal or molecular catalyst can achieve conversion levels up to about 95%. In addition, the inventive methods are able to achieve higher conversion levels with lower catalyst and equipment fouling compared to methods (e.g., that utilized fixed and ebullated bed systems) that utilize porous supported catalysts. Moreover, whereas conventional fixed bed systems typically have a lower conversion level for the asphaltene fraction as compared to the heavy oil feedstock as a whole, the improved hydroprocessing methods and systems preferably maintain similar conversion levels for both the asphaltene fraction and the overall heavy oil feedstock.

Unlike fixed bed and ebullated bed methods, the inventive methods are further able to achieve similar conversion levels for the asphaltene fraction as for the non-asphaltene fraction. In contrast, the conversion level for the asphaltene fraction using fixed and ebullated bed systems is typically half or less than the conversion level for the overall heavy oil material, which is why such methods can only be used to process diluted vacuum tower residuum rather than pure residuum. The inventive methods are therefore further advantageous due their ability to potentially hydroprocess pure residuum and other high asphaltene-containing feedstocks without dilution.

C. Hydroprocessing Systems

Figure 8A:
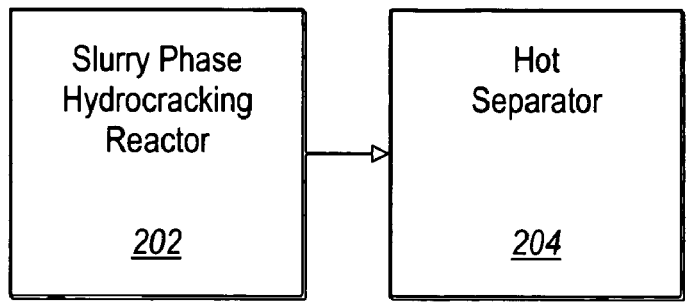
FIGS. 8A-8G are block diagrams that schematically illustrate alternative exemplary embodiments of hydroprocessing systems according to the invention for upgrading a heavy oil feedstock.

FIGS. 8A-8E schematically illustrate various hydroprocessing systems according to the invention. FIG. 8A depicts an exemplary hydroprocessing system 200 that includes at least one slurry phase hydrocracking reactor 202 and a hot separator 204, the design and operation of which are shown and described more fully below with respect to FIG. 9. According to one embodiment, the slurry phase reactor 202 includes a liquid phase comprising the heavy oil feedstock and colloidal or molecular catalyst dispersed therein and a gaseous phase comprising mainly hydrogen. At high pressure, at least a portion of the hydrogen gas is dissolved within the heavy oil feedstock. The gaseous phase may also include gases and, volatile liquids generated during the hydrocracking reaction, although-volatile liquids may remain in a liquid state depending on the pressure within the slurry phase reactor 202. A molecular catalyst is essentially "dissolved" in molecular form within the heavy oil feedstock. A colloidal catalyst is in colloidal suspension within the feedstock and does not settle out like micron-sized or larger catalyst particles can.

Figure 8B:
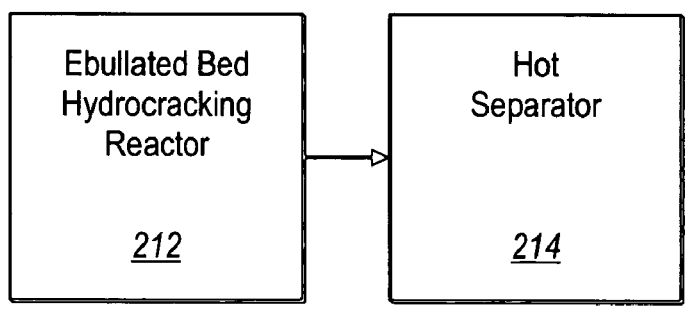

FIG. 8B alternatively depicts an exemplary hydroprocessing system 210 that includes at least one ebullated bed hydrocracking reactor 212 and a hot separator 214, the design and operation of which are shown and described more fully below with respect to FIG. 10. Ebullated bed reactor 212 includes a liquid phase comprising the heavy oil feedstock and a "dissolved" molecular catalyst and/or colloidally suspended colloidal catalyst. It also includes a gaseous phase comprising hydrogen, at least a portion of which is dissolved within the heavy oil feedstock depending on the pressure within the ebullated bed reactor 212. A solid supported catalyst is also included within the ebullated bed reactor as a distinct solid phase. The solid catalyst is in a fluidized or expanded state, rather than lying statically on a bed. A, pump circulates the heavy oil feedstock from the bottom towards the top, thereby lifting or fluidizing the solid supported catalyst throughout the ebullated bed reactor 212. The heavy oil feedstock and hydrogen are typically added through the bottom of the ebullated bed reactor 212, while the upgraded material or feedstock is withdrawn from at or near the top of the ebullated bed reactor 212. New solid supported catalyst is continuously or periodically added at or near the top of the ebullated bed reactor 212, and spent or used catalyst is continually or periodically withdrawn from at or near the bottom of the ebullated bed reactor 212.

Figure 8C:
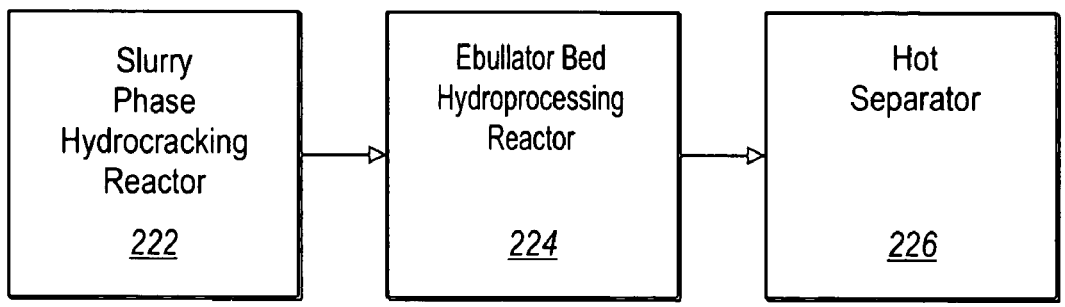

FIG. 8C depicts a hydroprocessing system 220 that is a modification of the hydroprocessing systems 200 and 210 depicted in FIGS. 8A and 8B, respectively, except that a slurry phase hydrocracking reactor 222 is positioned upstream from an ebullated bed hydroprocessing reactor 224 and hot separator 226. An advantage of this is that the heavy oil feedstock can be preliminarily upgraded by the slurry phase reactor 222 prior to being introduced into the ebullated bed reactor 224. As a result, the average molecular weight and/or boiling point of the feedstock is significantly reduced. One effect of this is that the upgraded feedstock withdrawn from the slurry phase reactor 222 has a smaller molecular size and will be better able to diffuse into the pores of the supported catalyst without mass transfer hindrance. Another benefit is that the upgraded feedstock will typically have a lower concentration of asphaltenes that could otherwise act to deactivate the solid supported catalyst within the ebullated bed reactor 224. The colloidal or molecular catalyst within the upgraded feedstock will provide additional catalytic transfer of hydrogen throughout the liquid phase in ebullated bed reactor 224 (e.g., the catalyst-free zones in typical ebullated bed reactors), reducing free radical combination reactions that can lead to the formation of coke precursors and sediment which often deposit on the supported catalyst, causing catalyst particles to form catalyst balls. In this way, the solid supported catalyst requirement can be significantly diminished, thereby reducing the cost of this aspect of the overall system. In addition, to the extent that a desired degree of upgrading has already occurred in the slurry phase reactor 222, the solid supported catalyst in the ebullated bed reactor 224 may be operated at a lower temperature (e.g., about 420° C.) (about 790° F.) and low space velocity to primarily remove impurities from the upgraded feedstock, such as sulfur, nitrogen and metals, rather than primarily catalyzing hydrocracking reactions.

Figure 8D:
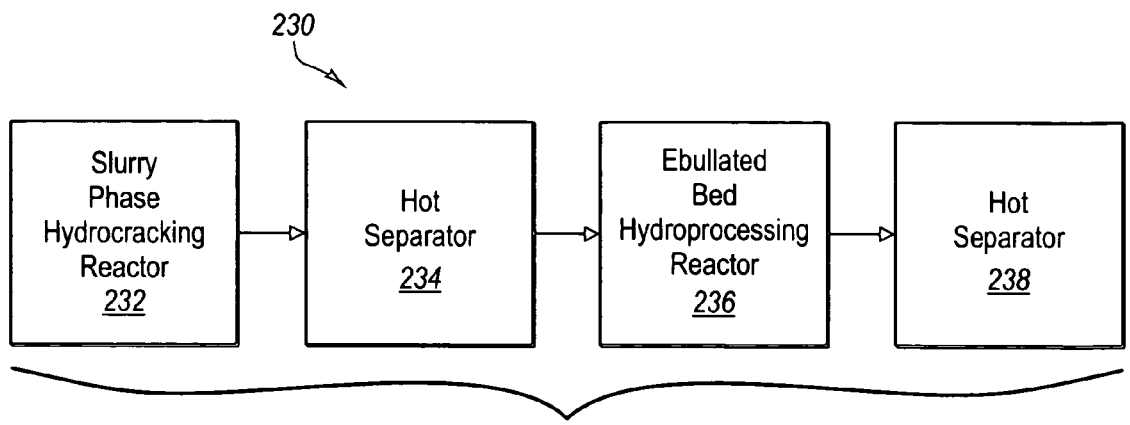

FIG. 8D depicts a hydroprocessing system 230, which is a variation of the hydroprocessing system 220 depicted in FIG. 8C, except that a first hot separator 234 is positioned between a slurry phase hydrocracking reactor 232 and an ebullated bed hydroprocessing reactor 236 connected to a second hot separator 238. In this way, the lower boiling fractions produced in the slurry phase reactor 232 can be removed from the upgraded feedstock before the higher boiling liquid resid fraction is introduced into the ebullated bed reactor 236. In this way, a more highly concentrated mixture of feedstock molecules requiring further upgrading can be acted upon by the residual colloidal or molecular catalyst within the liquid resid fraction and the solid supported catalyst within the ebullated bed reactor 236. The colloidal or molecular catalyst also becomes more concentrated as a result of removing the lower boiling fractions.

Figure 8E:
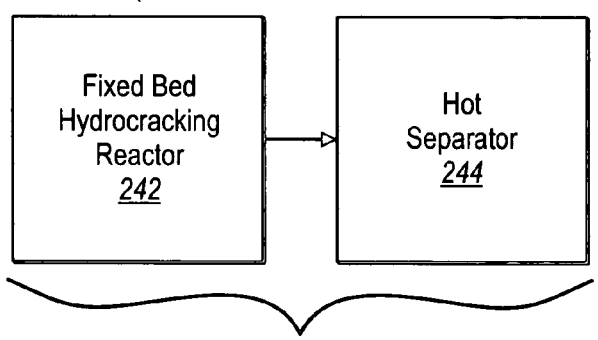

FIG. 8E depicts a hydroprocessing system 240 that includes a fixed bed hydrocracking reactor 242 and a hot separator 244 downstream from the fixed bed reactor 242, the design and operation of which are shown and described more fully below with respect to FIG. 11. In the case where multiple fixed bed reactors 242 are included, the first fixed bed reactor may comprise a "guard bed" whose primary purpose is to remove impurities. In the case where it is desired to utilize a colloidal or molecular catalyst in combination with a solid supported catalyst in a fixed bed, it will be advantageous to utilize a modified fixed bed catalyst that is not designed to remove the colloidal or molecular catalyst.

Figure 8F:
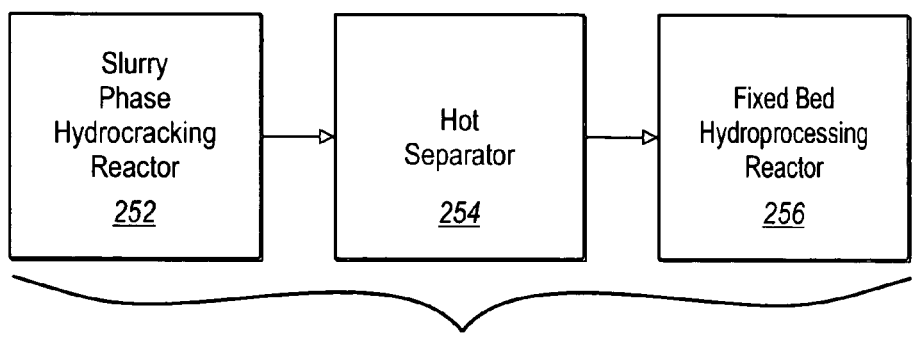

FIG. 8F depicts a hydroprocessing system 250 that includes a slurry phase hydrocracking reactor 252, a hot separator 254 downstream from the slurry phase reactor 252, and at least one fixed bed reactor 256 downstream from the hot separator 254. The slurry phase reactor 252 may perform the bulk of hydrocracking reactions, while the fixed bed reactor 256 may primarily be utilized for hydrotreating to remove impurities from the remaining non-volatile liquid fraction coming out of the hot separator 254. The upgraded liquid fraction from the fixed bed reactor 256 can be used as desired, including being recycled back into the slurry phase reactor 252 in a more purified state after having passed through the fixed bed reactor 256. In the case where multiple fixed bed reactors 256 are utilized, the first fixed bed reactor may advantageously comprise a "guard bed" whose primary purpose is to remove metal sulfides, such as nickel, vanadium, and iron, and a significant percentage of the colloidal or molecular catalyst. A specialized catalyst for removing impurities may be included in the guard bed while a catalyst for performing upgrading reactions may be included within subsequent fixed bed reactors in the sequence.

Figure 8G:
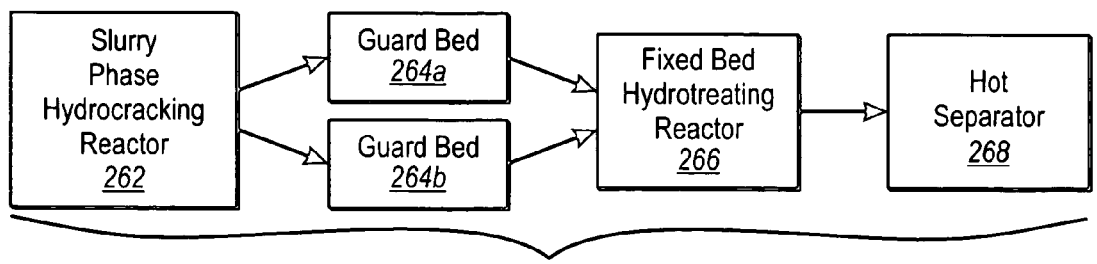

FIG. 8G depicts a hydroprocessing system 260 that includes a slurry phase reactor 262, two or more guard bed reactors 264a and 264b placed in parallel fashion for alternative use, one or more fixed bed reactors 266, and a hot separator 268. The guard bed reactors 264a and 264b are packed with large pore supported catalyst designed to remove a substantial portion of the colloidal or molecular catalyst, as well as sulfides of nickel, vanadium, and iron contained in the upgraded feedstock coming out of the slurry phase reactor 262. When there is a substantial drop in pressure in the guard bed 264a or 264b being used due to the accumulation of metals and other impurities in the catalyst, the upgraded feedstock from slurry phase reactor 262 is then directed to the other of guard bed reactors 264a or 264b so that the supported catalyst packed with captured metals and other impurities can be replaced off line and regenerated. The cycle is repeated whenever sufficient metals and other impurities have been captured in guard bed reactor 264a or 264b to require catalyst replacement. Cleaned upgraded feedstock coming out of guard bed reactor 264a or 264b is fed to one or more fixed bed reactors 266 packed with a supported catalyst designed for hydrotreating function. Finally, the upgraded material from the fixed bed reactors 266 is sent to a hot separator 268.

Figure 9:
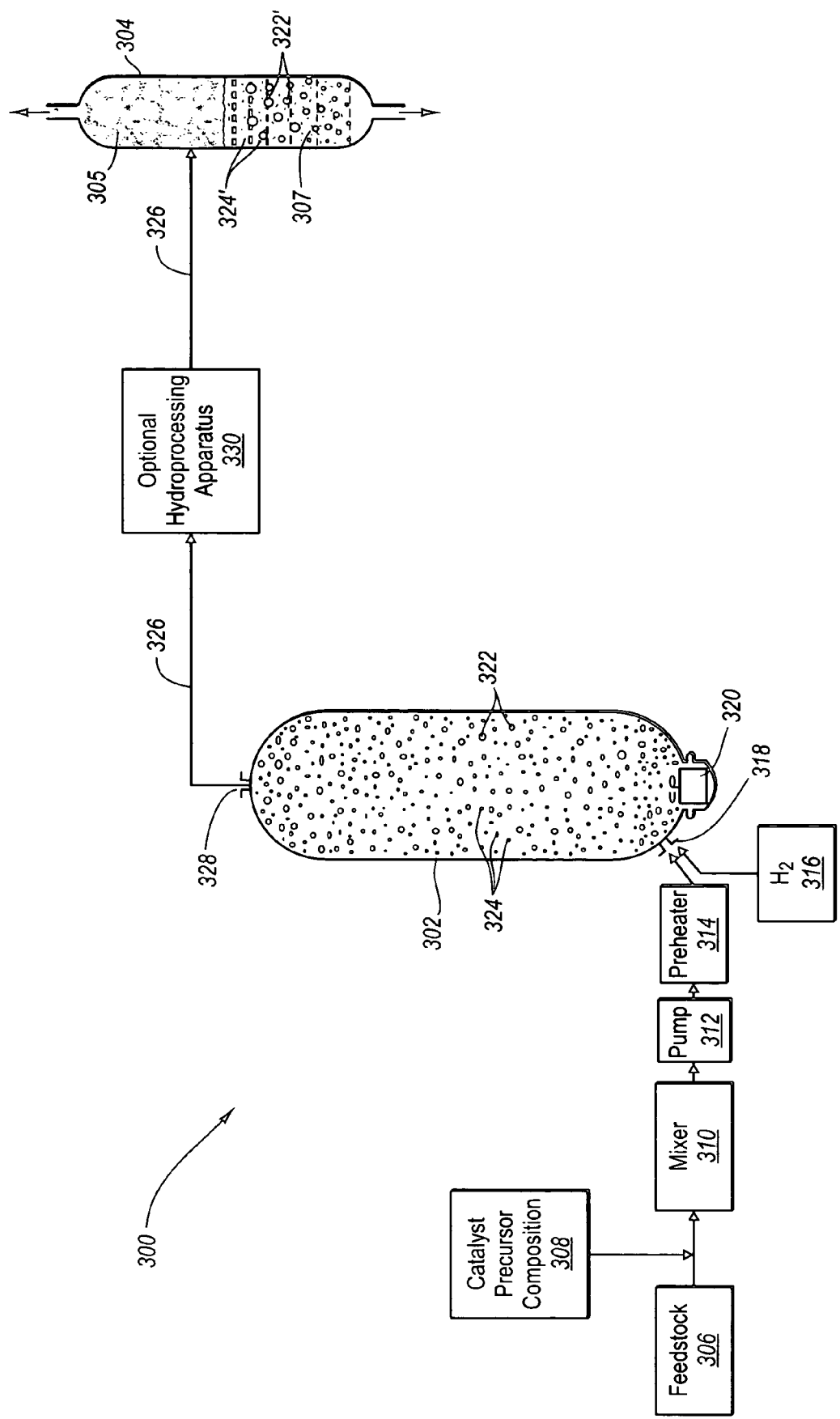
FIG. 9 is a schematic diagram of a hydroprocessing system according to the invention that includes a slurry phase reactor and a hot separator.

FIG. 9 schematically depicts a hydroprocessing system 300 that includes a slurry phase hydrocracking reactor 302 and a hot separator 304. A heavy oil feedstock 306 is blended and conditioned with a catalyst precursor composition 308 within a mixer 310, preferably after first pre-mixing the precursor composition 308 with a diluent as discussed above. The conditioned feedstock from the mixer 310 is pressurized by a pump 312, which also serves as a multi-stage mixing device to further disperse the catalyst precursor composition as discussed above, passed through a pre-heater 314, and continuously fed into the slurry phase reactor 302 together with hydrogen gas 316 through an input port 318 located at or near the bottom of the slurry phase reactor 302. A stirrer 320 at the bottom of the slurry phase reactor 302 induces mixing within the liquid phase, thus helping to more evenly disperse the heat generated by the hydrocracking reactions. Alternatively or in addition to the stirrer 320, the slurry phase reactor 302 may include a recycle channel, recycling pump, and distributor grid plate (not shown) as in conventional ebullated bed reactors (See FIG. 10) to promote more even dispersion of reactants, catalyst, and heat. Hydrogen is schematically depicted as gas bubbles 322, within the feedstock 306. The colloidal or molecular catalyst within the feedstock 306 is schematically depicted as catalyst particles 324. It will be appreciated that gas bubbles 322 and catalyst particles 324 are shown oversized so that they may be seen in the drawing. In reality, they are likely invisible to the naked eye.

The heavy oil feedstock 306 is catalytically upgraded in the presence of the hydrogen and colloidal or molecular catalyst within the slurry phase reactor 302 to form an upgraded feedstock 326, which is continuously withdrawn from the slurry phase reactor 302 through an output port 328 located at or near the top of the slurry phase reactor 302 and then fed into the hot separator 304, optionally after passing through optional hydroprocessing apparatus 330. The upgraded feedstock 326 in hot separator 304 contains residual or molecular catalyst, schematically depicted as catalyst particles 324' within the hot separator 304, and residual hydrogen, schematically depicted as bubbles 322'. The hot separator 304, which is advantageously operated at a temperature within about 20° F. (about 11° C.) of the hydrocracking temperature within the slurry phase reactor 302, separates the volatile fraction 305, which is withdrawn from the top of hot separator 304, from the non-volatile fraction 307, which is withdrawn from the bottom of hot separator 304. The non-volatile fraction 307 still contains colloidal or molecular catalyst 324' and residual hydrogen gas 322' dispersed therein. As a result, beneficial upgrading reactions between hydrocarbon free radicals that still exist and/or that are formed within the non-volatile fraction 307 and the residual hydrogen 322' can be catalyzed by the residual colloidal or molecular catalyst 324' within the hot separator 304.

Figure 10:
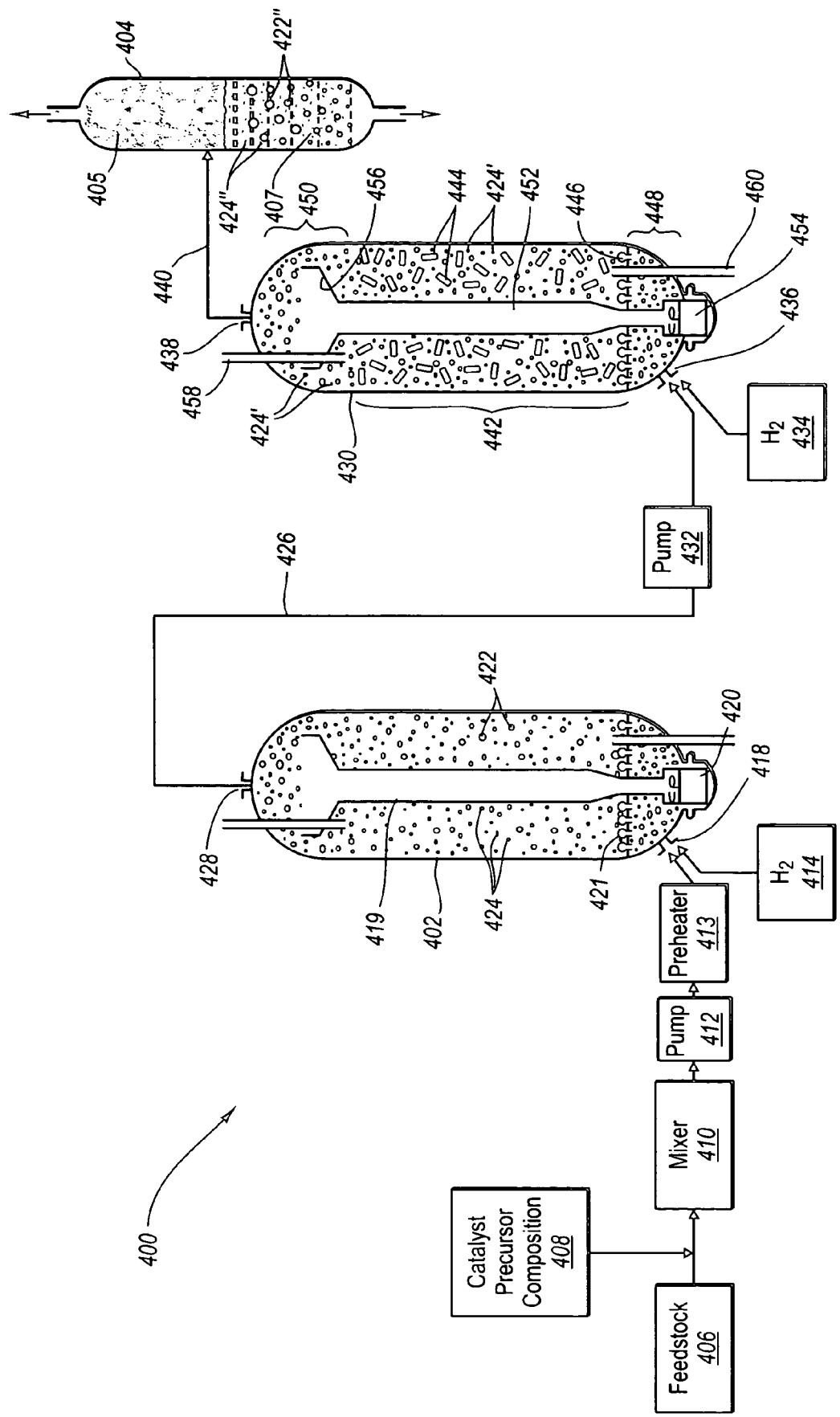
FIG. 10 is a schematic diagram of a hydroprocessing system according to the invention that includes a slurry phase reactor, an ebullated bed reactor, and a hot separator.

FIG. 10 schematically depicts a hydroprocessing system 400 that includes a slurry phase hydrocracking reactor 402, a hot separator 404, and an ebullated bed reactor 430 disposed between the slurry phase reactor 402 and hot separator 404. The slurry phase reactor 402 produces an upgraded feedstock 426 in essentially the same way as in hydroprocessing system 300, except that the upgraded feedstock 426 is fed into the ebullated bed reactor 430 instead of the hot separator 404. The upgraded feedstock 426 is optionally pressurized by pump 432 and introduced together with supplemental hydrogen 434 into the ebullated bed reactor 430 through an input port 436 located at or near the bottom of the ebullated bed reactor 430. The upgraded feedstock 426 contains residual or molecular catalyst, schematically depicted as catalyst particles 424' within the ebullated bed reactor 430. The ebullated bed reactor 430 also includes an output port 438 at or near the top of the ebullated bed reactor 430 through which a further hydroprocessed feedstock 440 is withdrawn.

The ebullated bed reactor 430 further includes an expanded catalyst zone 442 comprising a porous supported catalyst 444 that is maintained in an expanded or fluidized state against the force of gravity by upward movement of feedstock and gas through the ebullated bed reactor 430. The lower end of the expanded catalyst zone 442 is defined by a distributor grid plate 446 with bubble saps, which separates the expanded catalyst zone 442 from a lower supported catalyst free zone 448 located between the bottom of the ebullated bed reactor 430 and the distributor grid plate 446. The distributor grid plate 446 distributes the hydrogen gas and feedstock even across the reactor and prevents the supported catalyst 444 from falling by the force of gravity into the lower supported catalyst free zone 448. The upper end of the expanded catalyst zone 442 is the height at which the downward force of gravity begins to equal or exceed the uplifting force of the upwardly moving feedstock and gas through the ebullated bed reactor 430 as the supported catalyst 444 reaches a given level of expansion or separation. Above the expanded catalyst zone 442 is an upper supported catalyst free zone 450. Residual colloidal or molecular catalyst 424' is dispersed throughout the feedstock within the ebullated bed reactor 430, including both the expanded catalyst zone 422 and the supported catalyst free zones 448, 450.

Feedstock within the ebullated bed reactor 430 is continuously recirculated from the upper supported catalyst free zone 450 to the lower supported catalyst free zone 448 of the ebullated bed reactor 430 by means of a recycling channel 452 disposed in the center of the ebullated bed reactor 430 in communication with an ebullating pump 454 disposed at the bottom of the ebullated bed reactor 430. At the top of the recycling channel 452 is a funnel-shaped recycle cup 456 through which feedstock is drawn from the upper supported catalyst free zone 450. The feedstock drawn downward through the recycling channel 452 enters the lower catalyst free zone 448 and then passes up through the distributor grid plate 446 and into the expanded catalyst zone 442, where it is blended with fresh upgraded feedstock 426 and supplemental hydrogen gas 434 entering the ebullated bed reactor 430 through the input port 436. Continuously circulating blended feedstock upward through the ebullated bed reactor 430 advantageously maintains the supported catalyst 444 in an expanded or fluidized state within the expanded catalyst zone 442, minimizes channeling, controls reaction rates, and keeps heat released by the exothermic hydrogenation reactions to a safe level.

Fresh supported catalyst 444 is introduced into the ebullated bed reactor 430, more specifically the expanded catalyst zone 442, through a catalyst input tube 458 that passes through the top of the ebullated bed reactor 430 and directly into the expanded catalyst zone 442. Spent supported catalyst 444 is withdrawn from the expanded catalyst zone 442 through a catalyst withdrawal tube 460 that passes from a lower end of the expanded catalyst zone 442 through both the distributor grid plate 446 and the bottom of the ebullated bed reactor 430. It will be appreciated that the catalyst withdrawal tube 460 is unable to differentiate between fully spent catalyst, partially spent but active catalyst, and fresh catalyst such that a random distribution of supported catalyst 444 is withdrawn from the ebullated bed reactor 430 as "spent" catalyst. This has the effect of wasting a certain amount of the supported catalyst 444. On the other hand, the existence of residual colloidal or molecule catalyst, schematically shown as catalyst particles 424', within the ebullated bed reactor 430, provides additional catalytic hydrogenation activity, both within the expanded catalyst zone 442 and the lower and upper supported catalyst free zones 448, 450. Capping of free radicals minimizes formation of sediment and coke precursors, which are often responsible for deactivating the supported catalyst. This has the effect of reducing the amount of supported catalyst 444 that would otherwise be required to carry out a desired hydroprocessing reaction. It also reduces the rate at which the supported catalyst 444 must be withdraw and replenished.

Finally, the further hydroprocessed feedstock 440 withdrawn from the ebullated bed reactor 430 is introduced into the hot separator 404. The hot separator 404, which is advantageously operated at a temperature within about 20° F. (about 11° C.) of the hydroprocessing temperature within the ebullated bed reactor 430, separates the volatile fraction 405, which is withdrawn from the top of hot separator 404, from the non-volatile fraction 407, which is withdrawn from the bottom of hot separator 404. The non-volatile fraction 407 typically contains residual colloidal or molecular catalyst, schematically depicted as catalyst particles 424", and residual hydrogen gas, schematically depicted as bubbles 422", dispersed therein. As a result, beneficial upgrading reactions between hydrocarbon free radicals that still exist and/or that are formed within the non-volatile fraction 407 and the residual hydrogen 422" can be catalyzed by the residual colloidal or molecular catalyst 424" within the hot separator 404.

Figure 11:
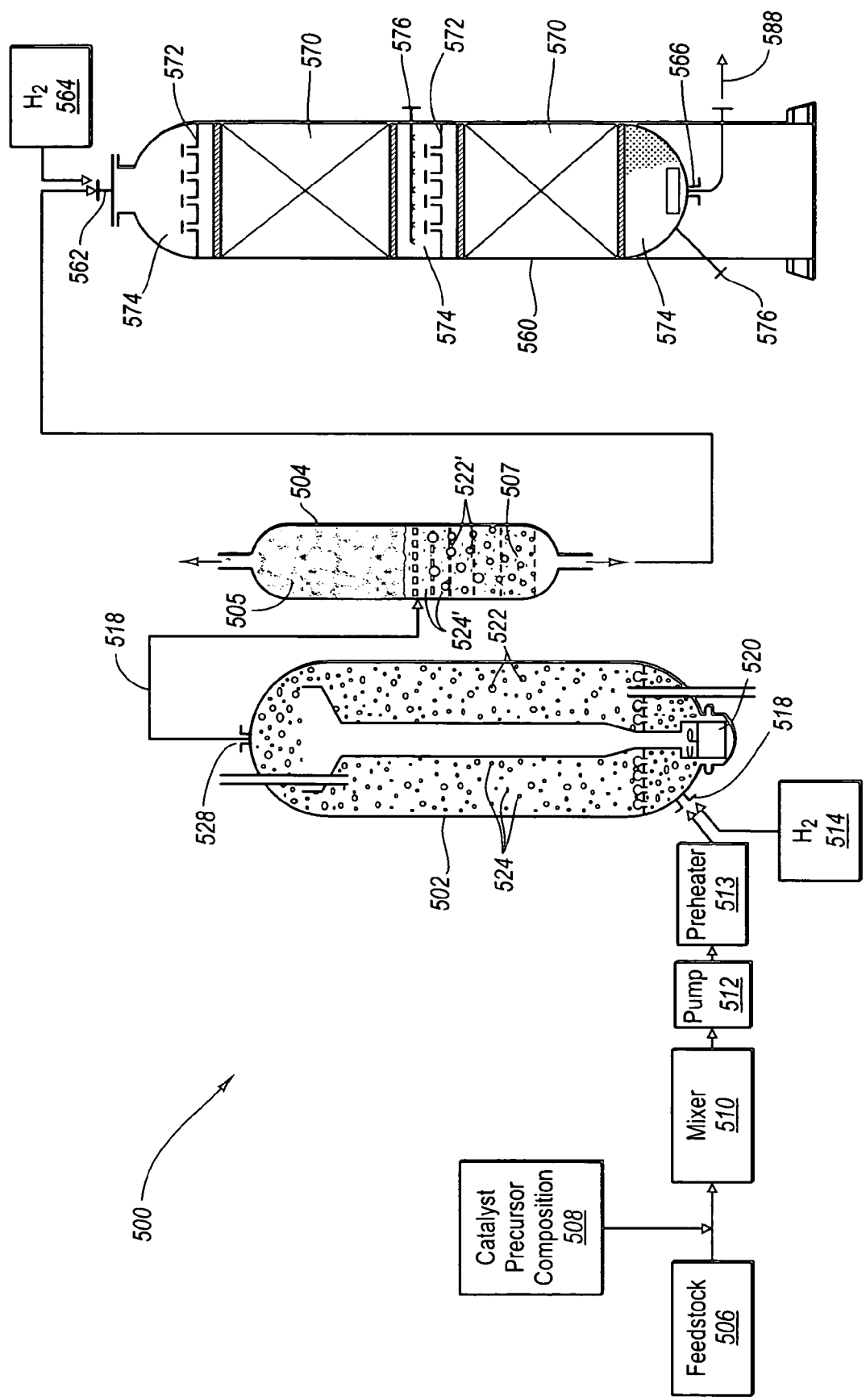
FIG. 11 is a schematic diagram of a hydroprocessing system according to the invention that includes a slurry phase reactor, a hot separator, and a fixed bed reactor.

FIG. 11 schematically depicts a hydroprocessing system 500 that includes a slurry phase reactor 502, a hot separator 504, and a fixed bed reactor 560. The slurry phase reactor 502 produces an upgraded feedstock 526 in essentially the same way as the slurry phase reactor 302 in hydroprocessing system 300, and the hot separator 504 separates a volatile fraction 505 from a non-volatile fraction 507 is essentially the same way as the hot separator 304 in hydroprocessing system 300. The upgraded feedstock 526 contains residual colloidal or molecular catalyst, schematically depicted as catalyst particles 524' within the hot separator 504. The non-volatile fraction 507 is, however, introduced into the fixed bed reactor 560 for further hydroprocessing. The fixed bed reactor 560 may be designed to perform hydrocracking and/or hydrotreating reactions depending on the operating temperature and/or the type of solid supported catalyst that is used within the fixed bed reactor 560.

Fixed bed reactor 560 more particularly includes an input port 562 at the top through which the non-volatile fraction 507 and supplemental hydrogen gas 564 are introduced, and an output port 566 at the bottom through which a further hydroprocessed feedstock 568 is withdrawn. The fixed bed reactor 560 further includes a plurality of vertically stacked and spaced apart catalyst beds 570 comprising a packed porous supported catalyst. Above each catalyst bed 570 is a distributor grid 572, which helps to more evenly distribute the flow of feedstock downward through the catalyst beds 570. Supported catalyst free zones 574 exist above and below each catalyst bed 570. To the extent the residual colloidal or molecular catalyst 524' is not preliminarily removed by a guard bed, it remains dispersed throughout the feedstock within the fixed bed reactor 560, in both the catalyst beds 570 and the supported catalyst free zones 574. Auxiliary ports 576 in the center and/or bottom of the fixed bed reactor 560 may be provided through which a cooling oil and/or hydrogen quench can be introduced to cool heat generated by the hydroprocessing reactions, control the reaction rate, and thereby help prevent formation of coke precursors and sediment and/or excessive gas within the fixed bed reactor 560.

III. Experimental Studies and Results

The following examples describe test studies which demonstrate the effects and advantages of using a colloidal or molecular catalyst instead of, or in addition to, a conventional porous supported catalyst when hydroprocessing a heavy oil feedstock that includes a significant quantity of asphaltenes.

EXAMPLE 1

The ability of a colloidal or molecular catalyst and a porous supported catalyst to convert the asphaltene fraction of a heavy oil feedstock was compared. A heavy oil feedstock comprising Cold Lake bitumen atmospheric resid and 300 ppm of a molybdenum disulfide catalyst in colloidal or molecular form was introduced into a pilot slurry phase hydroprocessing reactor system and operated at various percent resid conversion levels. The pilot reactor system used in this test was similar to that shown in FIG. 13 (discussed more fully below), except that the pilot reactor system only had a single continuous flow slurry phase reactor having a volume of 1200 ml. The pilot reactor was a hollow tube and had no internal liquid recycle system. The pilot plant experiments were carried out under 2000 psig of hydrogen pressure, with a reaction temperature over the range of 430-450° C. to control the conversion level and a hydrogen flow rate of 5000 standard cubic feet per barrel of heavy oil (SCF/bbl). The percent conversion of the asphaltenes versus the overall conversion level for the resid material when using the colloidal or molecular catalyst is plotted in the chart shown at FIG. 12.

Cold Lake bitumen atmospheric resid was also hydroprocessed using a porous supported catalyst within a 3 phase, gas-liquid-solid continuous flow stirred reactor that was operated at various percent resid conversion levels. The porous supported catalyst was contained within a spinning cage and experiments were carried out at 2000 psig hydrogen pressure at reaction temperature between 420-440° C. to control the conversion level. The percent conversion of the asphaltenes versus the overall conversion level for the resid material when using the porous supported catalyst is also plotted in the chart shown at FIG. 12.

Figure 12:
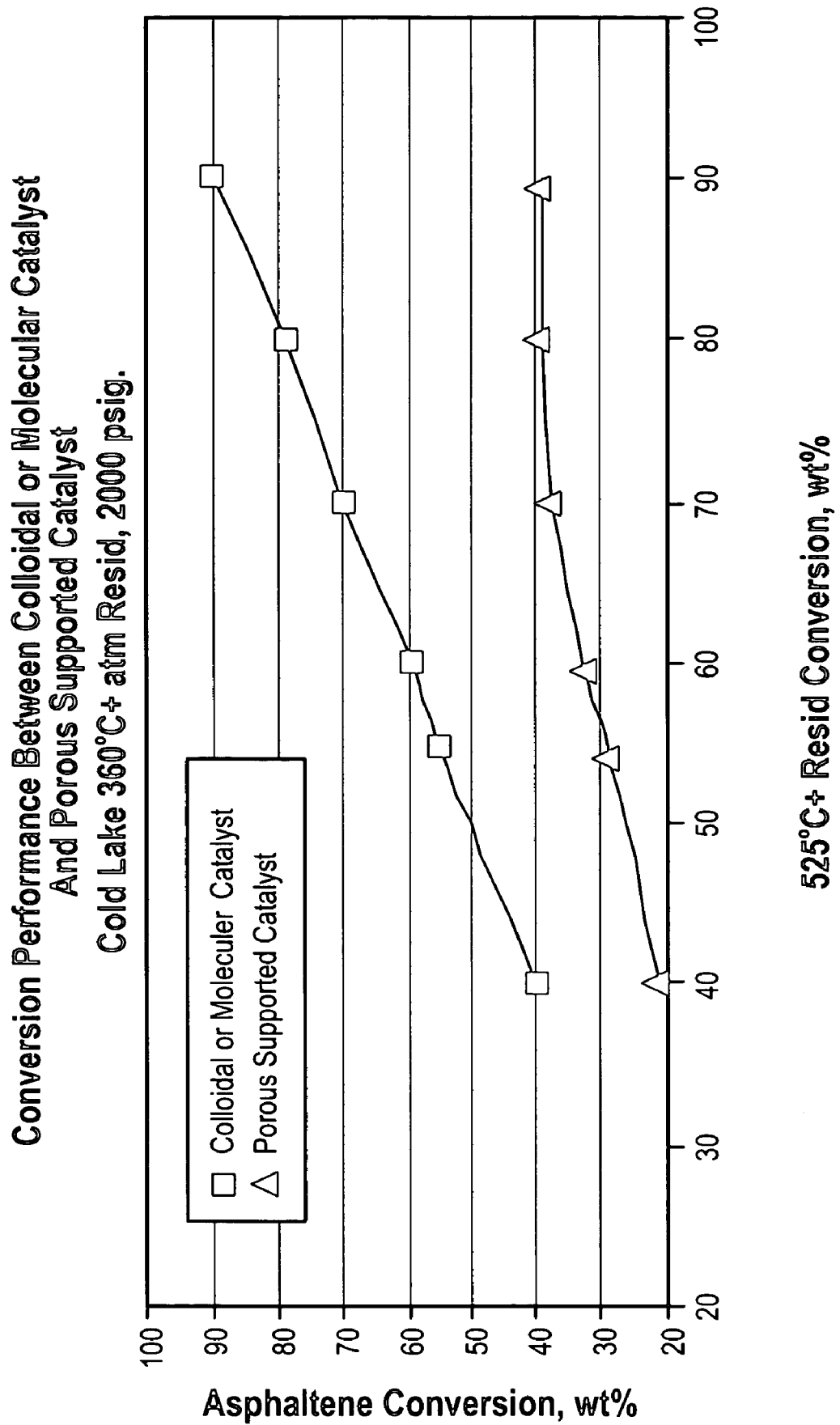
FIG. 12 is a chart comparing the asphaltene conversions using a colloidal or molecular catalyst versus using a porous supported catalyst.

According to the chart of FIG. 12, the comparative study showed that the percent conversion of asphaltenes using the colloidal or molecular catalyst was the same as the percent conversion of the resid material as a whole. That means the asphaltenes were converted into lower boiling materials at the same conversion level as the resid material as a whole, demonstrating that the colloidal or molecular catalyst was as active in converting asphaltenes as other resid hydrocarbon molecules. In practical terms, the result is no incremental buildup of asphaltenes in the feedstock.

In contrast, the percent conversion of asphaltenes using the porous supported catalyst was half or less of the percent conversion of the resid fraction as a whole. That means the porous supported catalyst was substantially less effective in converting asphaltenes than other hydrocarbons in the resid material, most likely because the larger asphaltenes are not able to diffuse into the pores of catalyst as readily as other, smaller molecules in the resid material. As a result, a much higher proportion of asphaltenes remained unconverted, and the remaining unconverted resid material contained an increased proportion of asphaltenes. Producing a resid material having an ever-increasing concentration of asphaltenes would be expected to lead to catalyst and equipment fouling, which is why only diluted vacuum tower residuum or low asphaltene feedstocks can be hydroprocessed using conventional ebullated bed and fixed bed systems and at a conversion level less than 60.

EXAMPLE 2

Figure 13:
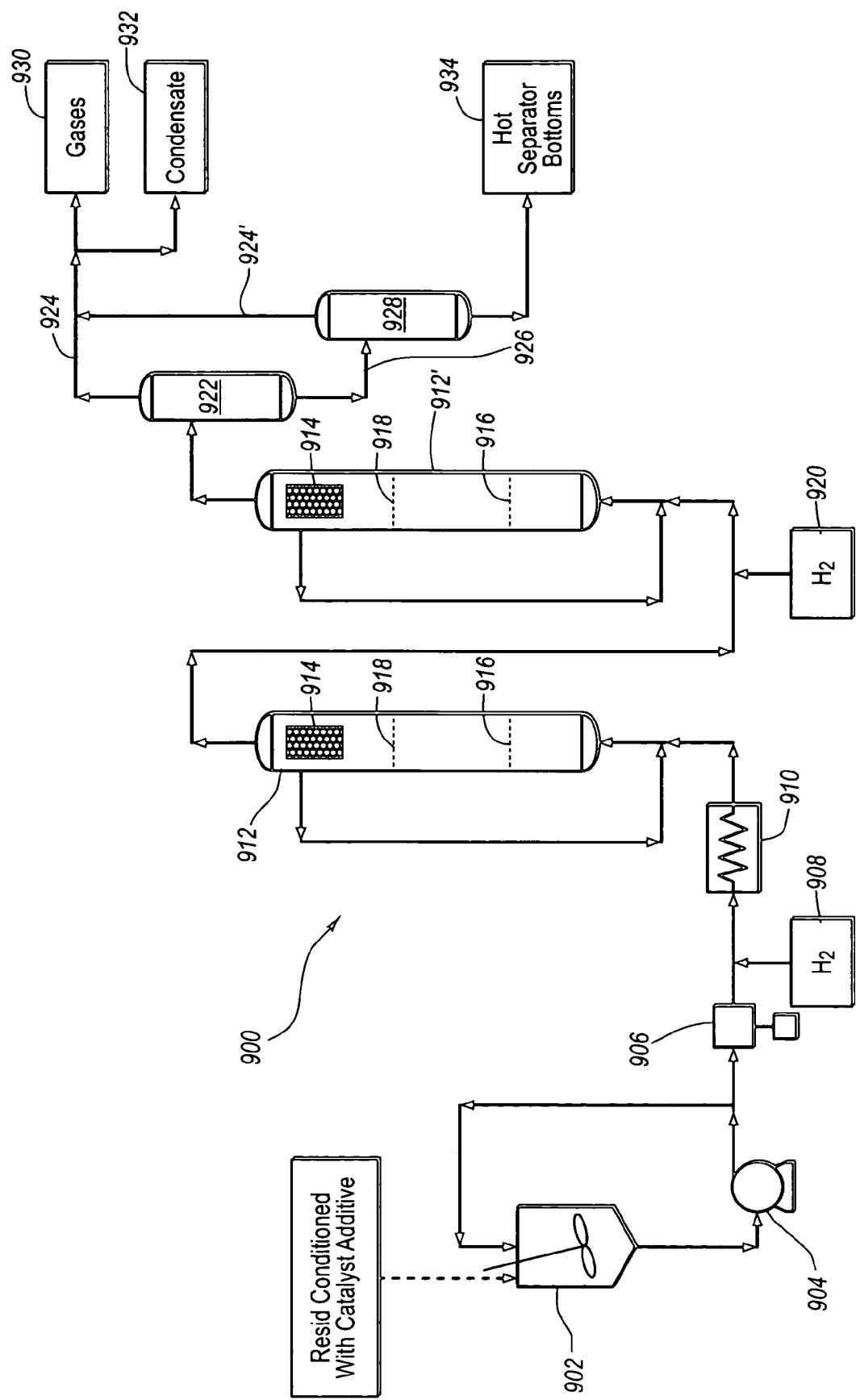
FIG. 13 is a schematic diagram of a pilot slurry phase/ebullated bed hydroprocessing system used to compare a colloidal or molecular catalyst according to the invention and a conventional ebullated bed catalyst.

A heavy oil feedstock comprising Athabasca vacuum tower bottoms (which included 21 wt. % of pentane insoluble asphaltenes) from the Syncrude Canada Ltd. plant in Alberta, Canada, with 150 ppm of a molybdenum sulfide catalyst in colloidal or molecular form was introduced into a pilot plant similar to the one shown in FIG. 13 having two gas-liquid slurry phase reactors connected in series. Each reactor had a volume of 2200 ml. The first reactor was heated to a weighted averaged temperature below 370° C. (698° F.), and the second reactor was heated to a weighted averaged temperature between 419-445° C. (786-833° F.) and liquid hourly space velocity between 0.41 and 0.7/hr. The results of this test showed that the concentration of the asphaltene in the residual resid at 75% conversion was also 21 wt. %, which was identical to that in the original feedstock, thereby further confirming the ability of the colloidal or molecular catalyst to convert the asphaltene fraction at the same rate as the resid material as a whole.

EXAMPLE 3

This example tested the ability of a colloidal or molecular catalyst utilized in a slurry phase reactor according to the invention to convert various resid materials and their asphaltene and sulfur fractions at high conversion rates. The pilot plant used in this example was the same slurry phase, tubular reactor described in Example 1. In each test, the heavy oil feedstock was thoroughly mixed with up to 250 parts per million of the catalyst precursor over a prolonged period of time before being introduced to the reactor. The reactor temperature was maintained between 430-450° C. to control the conversion level. The reactor pressure was 2000 psig and the hydrogen treat rate was 5000 standard cubic feet per barrel of heavy oil. The results of this test are set forth in Table I below:

TABLE I

| | Feedstock | | | |
|---|---|---|---|---|
| | Athabasca Bitumen | Cold Lake Bottoms | Maya/Isthmus Blend | Chinese Paraffinic Bottoms Blend |
| 975° F.+ resid conversion, wt % | 94 | 94 | 63 | 95 |
| Asphaltene (C$_5$ Ins.) conversion wt % | 95 | 93 | 67 | 96 |
| Sulfur conversion wt % | 78 | 78 | 56 | 92 |

This test confirms that a colloidal or molecular catalyst utilized in a slurry phase reactor according to the invention was able to convert the asphaltene fraction at essentially the same rate as the overall resid conversion rate, even at very high overall conversion rates. This demonstrates the superiority of the hydroprocessing methods and systems disclosed herein compared to conventional fixed bed systems, which cannot be operated at conversion levels higher than about 25% when processing reside feedstocks having a significant asphaltene fraction, and conventional ebullated bed systems, which convert asphaltenes at substantially lower conversion levels compared to overall resid conversion, particular at high resid conversion levels. This shows that the methods and systems of the invention satisfy a long-felt need in the art that has not been solved using convention hydroprocessing systems (i.e., being able to convert high asphaltene-containing feedstocks at high conversion levels while also converting the asphaltene fraction at the same conversion level). It is also a surprising and unexpected result given the fact that conventional supported catalysts in existence and used for decades cannot convert the asphaltene and overall resid fractions at the same rate, particularly at high overall conversion levels.

EXAMPLE 4

This example utilized the pilot plant shown in FIG. 13, which included two ebullated bed reactors connected in series and which was used to compare the difference between using a porous supported ebullated bed catalyst ("EB catalyst") by itself when processing a heavy oil feedstock containing asphaltenes and the EB catalyst in combination with a colloidal or molecular molybdenum disulfide catalyst. A currently-operating commercial ebullated bed unit was simulated in this pilot test. The feedstock for this test was a vacuum tower bottoms generated from a Russian crude in an operating commercial plant, and the EB catalyst was taken from inventory at the same commercial plant. The vacuum tower bottoms contained 90 wt. % of material with a boiling point of 525° C.+ (i.e., greater than or equal to 525° C.). The comparative experiments were carried out at reaction temperature between 418-435° C. to control the conversion level, a space velocity of 0.26 per hour, a hydrogen feed rate of 4500 standard cubic feet per barrel of heavy oil, and a pressure of 2100 psig.

The results of this comparative study are graphically depicted in FIGS. 14-17. The comparative study demonstrated the ability of the colloidal or molecular catalyst to convert asphaltenes to lower boiling materials while also prolonging the useful lifespan of the porous supported catalyst.

The first run (Run "A") was a base-line test simulating the current commercial unit operation with the EB catalyst, but without the colloidal or molecular catalyst. To simulate real commercial conditions, a mixture of one-third fresh EB catalyst and ⅔ equilibrium EB catalyst taken from the commercial plant was used. The test unit was operated for 5 days at approximately 50 wt % residuum (b.p.≧524° C.) conversion, and then for 4 days at 58-60 wt % conversion. At the end of the 9-day period, the test had to be shut down because of a significant increase in pressure across the second reactor schematically shown in FIG. 13. At the end of the run, the reactors were opened, the EB catalyst was unloaded, and the reactor walls and all accessories were inspected. Samples were taken and analyzed.

The second test (Run "B") was a duplication of Run "A", using an identical catalyst charge (i.e., a mixture of fresh and equilibrium EB catalyst), but with the feedstock conditioned with 25 to 100 ppm of a colloidal or molecular molybdenum sulfide catalyst (i.e., 50 ppm from 0-120 hours; 100 ppm from 120-195 hours; 100 ppm from 195-270 hours; 50 ppm from 270-340 hours, and 25 ppm beyond 340 hours). After operating for 8 days at the same conditions as Run "A", conversion was increased to 70% and was held at that level for 3 days. The residuum conversion level was then reduced back to 60% and held for 5 days to confirm the reproducibility of the test results. Run "B" was then terminated at the end of this time, with the observation that the unit was fully operable with no noticeable change in pressure drop across the second reactor shown in FIG. 13, even after 16 days on-stream. As in the first test, the reactors were opened and inspected after shutdown.

Figure 14:
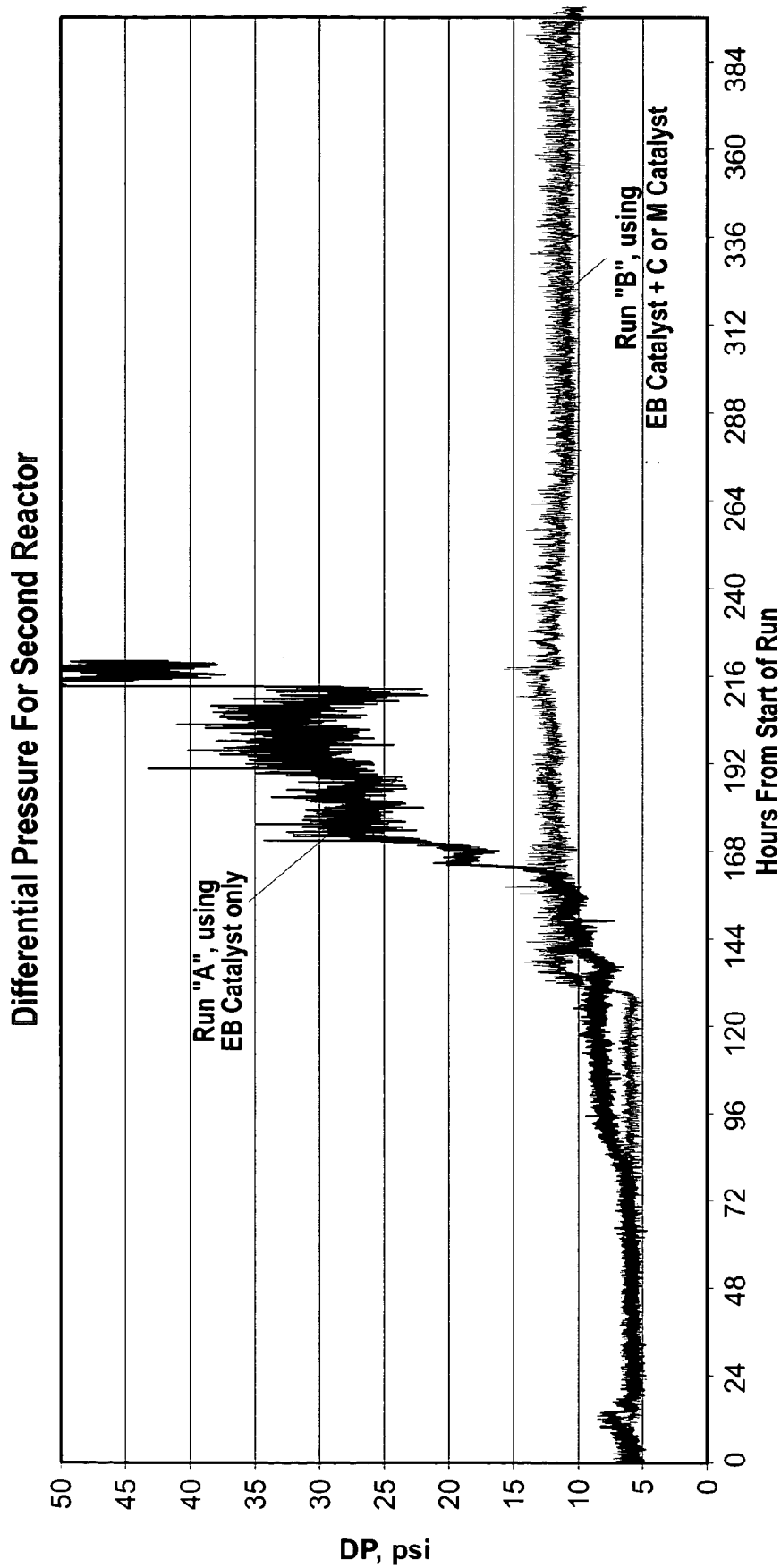
FIG. 14 is a chart comparing increases in pressure drop across the second pilot ebullated bed reactor over time for test runs using either a porous supported catalyst by itself or in combination with a colloidal or molecular catalyst.

The pressure drop across the second reactor that caused the shutdown of Run "A", but which did not occur in Run "B", is graphically depicted in the chart of FIG. 14. As shown in FIG. 14, Run "A" lasted a little over approximately 220 hours before it was halted due to a dramatic increase in pressure drop across the second reactor resulting from deposition of sediment in the reactor (i.e., equipment fouling). A post-run inspection showed significant fouling of the screen at the reactor liquid recycle cup of the second reactor, which caused the increase in pressure drop between the reactor inlet and outlet. On the other hand, Run "B" lasted about 400 hours and was only halted because all the relevant data had been obtained, not because of any equipment fouling or pressure increase across the second reactor. A post-run inspection showed minimal fouling of the screen at the reactor liquid recycle cup in the second reactor, thus preventing, or at least minimizing, the type of differential pressure increase that occurred in Run "A".

Figure 15:
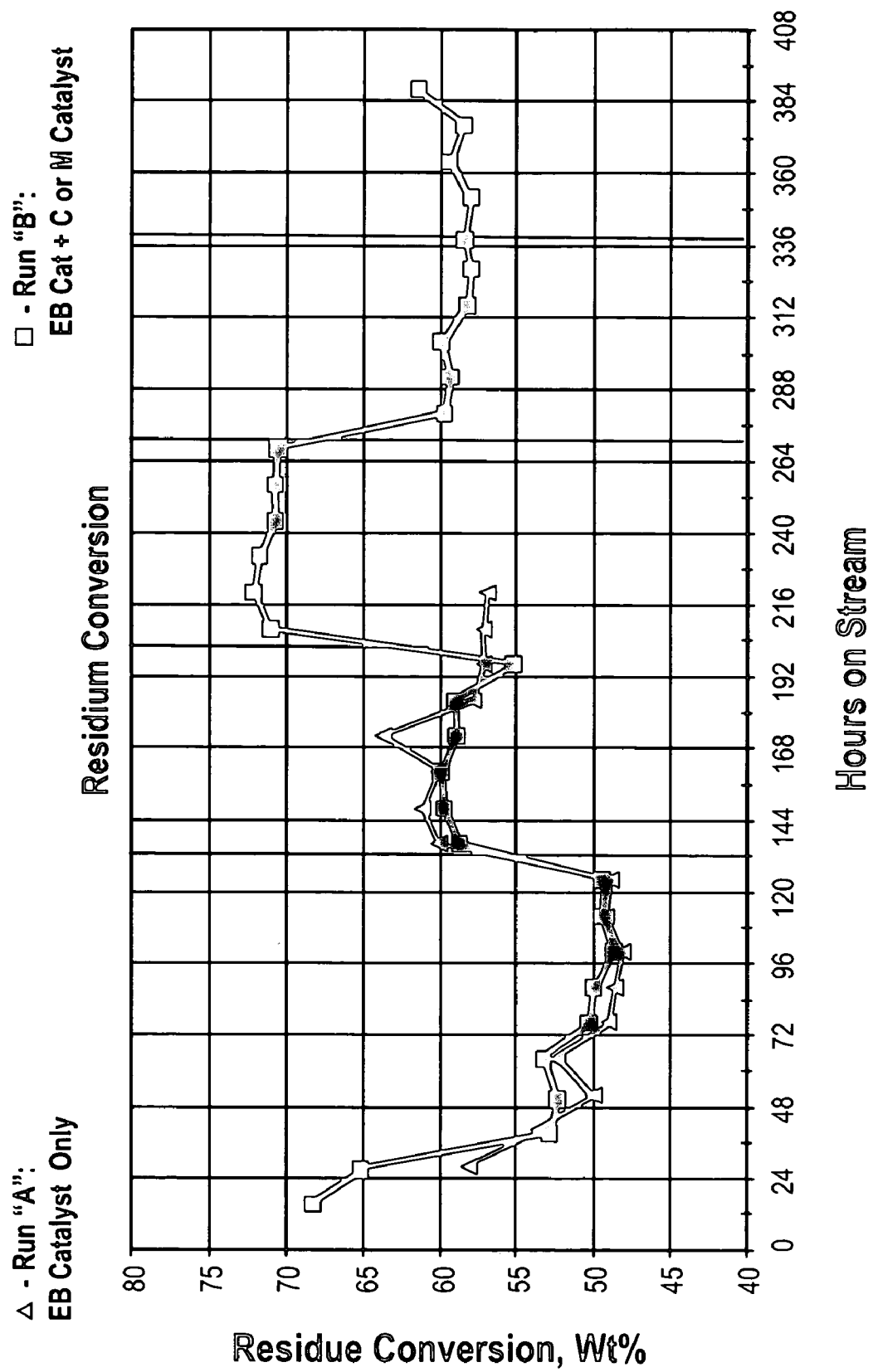
FIG. 15 is a chart depicting resid conversion at various hours on stream for test runs using either a porous supported catalyst by itself or in combination with a colloidal or molecular catalyst.

The chart shown in FIG. 15 plots resid conversion versus hours on-stream. For the first 9 days, the two test runs tracked each other very well. Only Run "B" was able to continue more than 9 days, however, as described above. As shown in FIG. 15, when the percent conversion was maintained at approximately the same level for both test runs, Run "B" had a substantially higher percent conversion of the resid fraction. This demonstrated that the colloidal or molecular catalyst assisted the EB catalyst in converting the vacuum tower residuum material to lower boiling materials.

Figure 16:
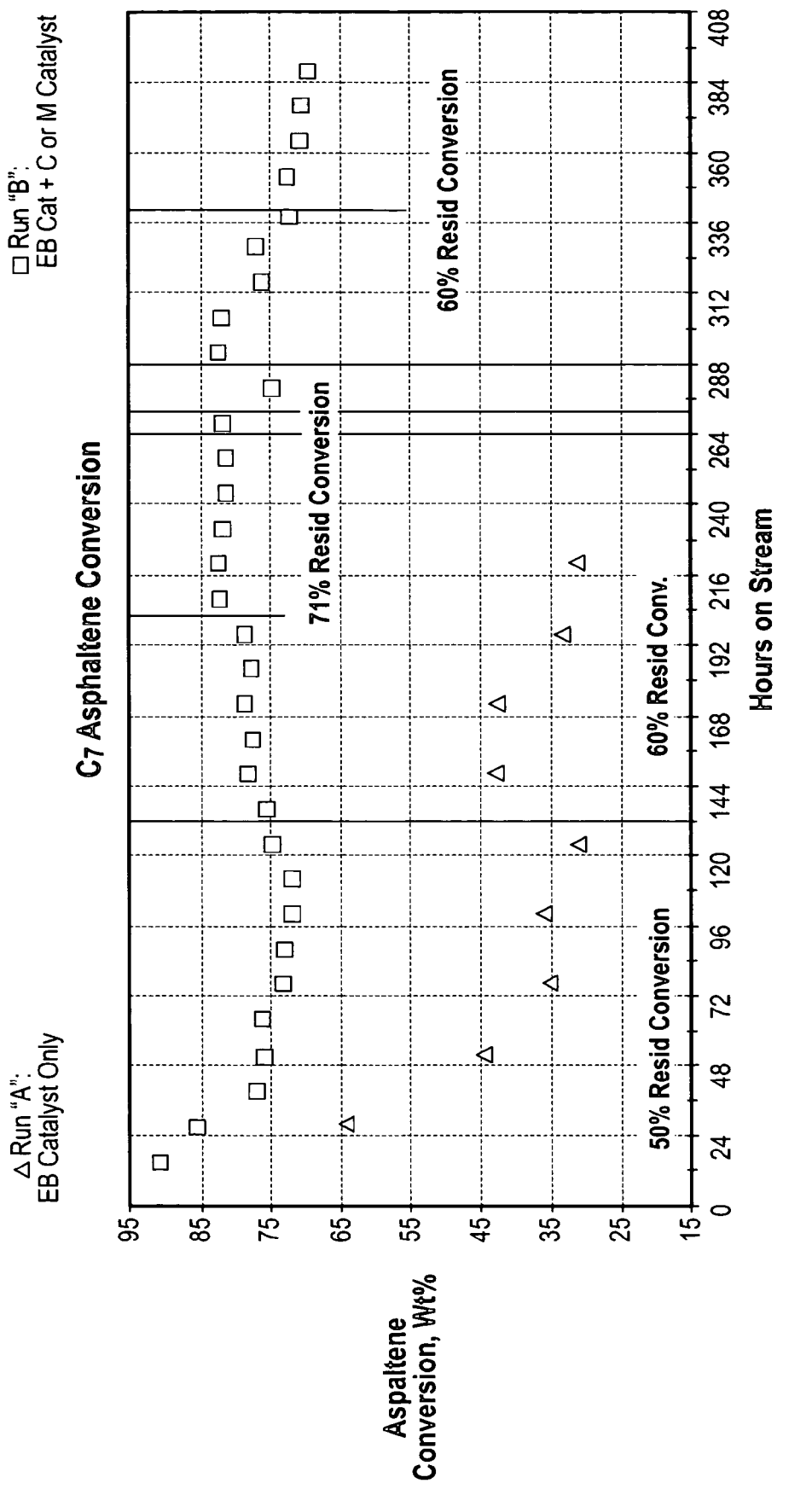
FIG. 16 is a chart comparing asphaltene conversion at various hours on stream for test runs using either a porous supporting catalyst by itself or in combination with a colloidal or molecular catalyst.

The chart depicted in FIG. 16 shows asphaltene conversion (defined in terms of heptane insolubles) versus time on-stream at various resid conversion levels. Run "B", using the colloidal or molecular catalyst and EB catalyst, achieved approximately twice the asphaltene conversion as in Run "A", using the EB catalyst alone. This significant improvement in asphaltene conversion is directly attributable to the use of the colloidal or molecular catalyst because, otherwise, the two test runs were identical. This test confirms the results of Example 1, which demonstrated that a colloidal or molecular catalyst is much better able to convert asphaltenes in a heavy oil feedstock than a porous supported catalyst.

Figure 17:
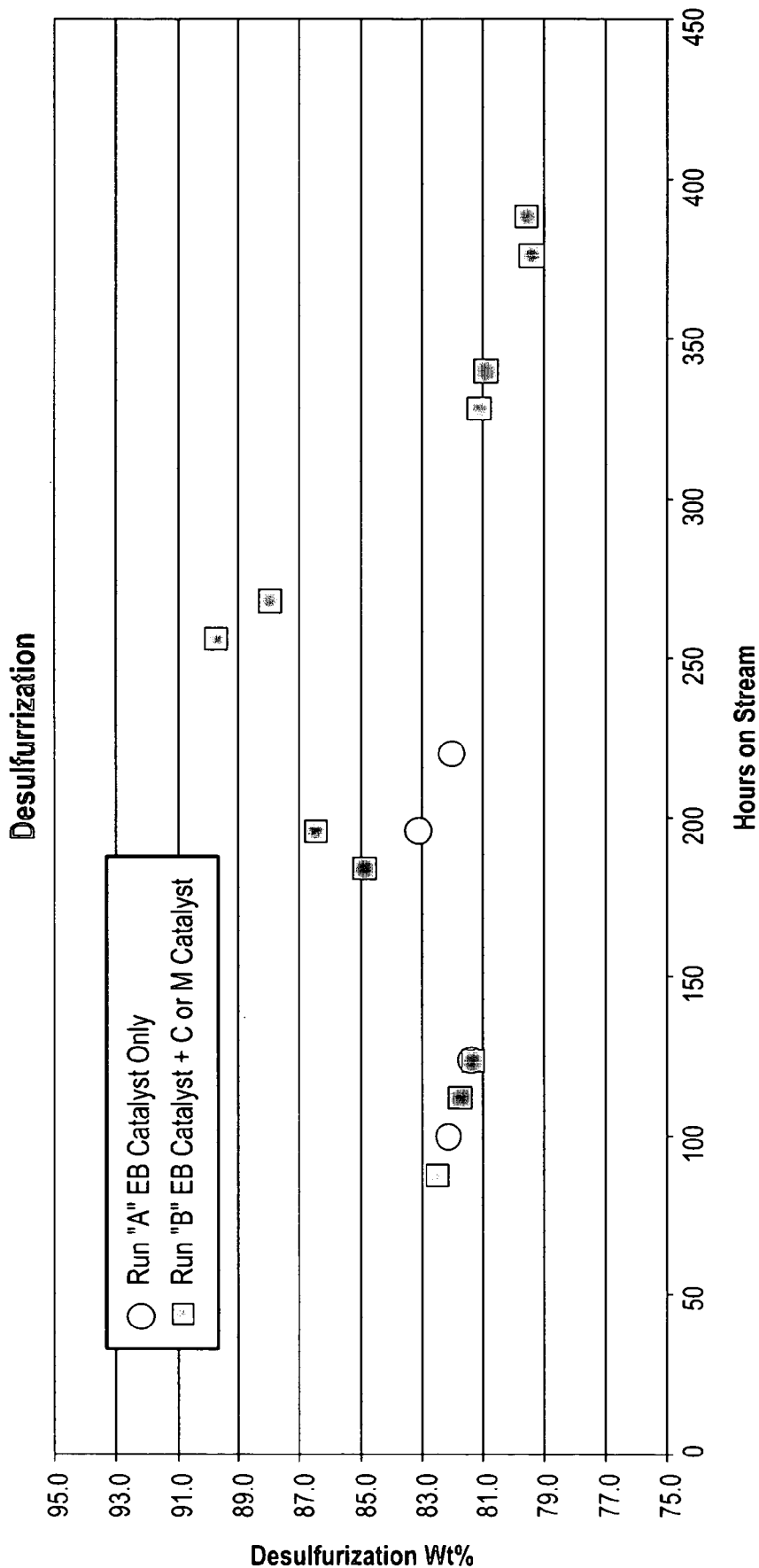
FIG. 17 is a chart comparing desulfurization at various hours on stream for test runs using either a porous supported catalyst by itself or in combination with a colloidal or molecular catalyst.

The chart depicted in FIG. 17 plots percent desulfurization of the residuum as a function of time comparing Run "A" using just the EB catalyst and Run "B" using both the EB catalyst and the colloidal or molecular catalyst.

Table II below summarizes the test data on sediment formation as determined by the IP 375 Method.

TABLE II

IMPACT OF COLLOIDAL OR MOLECULAR CATALYST ON SEDIMENT FORMATION AND FOULING

| | | | | |
|---|---|---|---|---|
| Residuum conversion wt. % | 50 | 60 | 71 | 60 |
| Time On-Stream hours | 0 to 132 | 133 to 220 | 204 to 272 | 272 to 400 |
| RUN "A": Sediment wt. % (EB catalyst only) | 0.12–0.22 | 0.59–0.86 | N/A | N/A |
| RUN "B": Sediment wt. % (EB catalyst + C or M catalyst) | 0.06–0.15 | 0.32–0.36 | 0.72–1.06 | 0.23–0.35 |

Run A operated for 220 hours but had to be stopped when the differential pressure in the second reactor increased significantly. No data was generated after 220 hours. A post-run inspection showed significantly fouling on the screen of the reactor liquid recycle cup.
Run B operated for 400 hours with very little change in reactor differential pressure. Inspection showed the screen at the reactor liquid recycle cup to be clean with minimal fouling.

The sediment formation values for Run "B" were about half of those from Run "A" during the comparative time periods and reaction conditions. For Run "B", when conversion was reduced from 71% to 60% in the last 5 days, sediment values returned to the same range as in the initial 60% conversion, despite any additional EB catalyst deactivation that may have occurred when operating the reactor at 71% conversion. Because sediment was significantly reduced when the colloidal or molecular catalyst was used, the pilot plant unit proved to be less prone to fouling and plugging than when just the conventional EB catalyst was used, as evidenced by the lower pressure drop across the reactor. It can be extrapolated that the same benefits of using the colloidal or molecular catalyst would apply in commercial-scale operations. That is, reduced sediment formation would be expected to lead to less fouling of the equipment and solid supported catalyst which, in turn, would result in longer unit operation and less maintenance when the colloidal or molecular catalyst is used in addition to, or in combination with, the EB catalyst.

In summary, the colloidal or molecular catalyst consistently increased the asphaltene conversion in parallel with the resid conversion and reduced sediment formation. These results demonstrate that the colloidal or molecular catalyst significantly increased hydrogen transfer outside the supported catalyst, capped the free radicals, and minimized combination reactions involving free radicals, as reflected in the reduction of sediment at all levels of resid conversion. Reducing sediment formation reduces rate of deactivation of the supported catalyst. The supported catalyst is therefore able to continue to perform its catalytic function of removing sulfur and transferring hydrogen, resulting in higher API gravity products.

EXAMPLE 5

A test was conducted using the pilot plant describes in FIG. 13, except that the first and second reactors were operated in a slurry phase hydroprocessing system comprising a slurry phase reactor that utilized 125 parts per million of a colloidal or molecular molybdenum disulfide catalyst. (The reactors operated as "slurry phase" reactors in this test rather than ebullated bed reactors because they utilized no porous supported ebullated bed catalyst). The pilot plant operated at 1500 psig of hydrogen pressure, with the conditioned Athabasca resid being fed at a space velocity of 0.7 per hour, a hydrogen treat rate at 4500 standard cubic feet per barrel of resid, within the first reactor being maintained at less than 370° C. and the second reactor being maintained at 441° C. The liquid product was collected and fed into a simulated guard bed reactor packed with a demetalizing catalyst.

The purpose of this test was to determine whether a slurry phase reactor employing a colloidal or molecular molybdenum disulfide catalyst could be used to preliminarily convert resid and asphaltene fractions, as well as metals contained therein to metal sulfides, followed by removing any metal sulfides, including the colloidal or molecular molybdenum disulfide catalyst by the guard bed. This would allow a fixed bed reactor to subsequently carry out desulfurization and denitrogenation of the preliminarily converted feedstock without the risk of plugging the hydrotreating catalyst by metals originally in the feedstock and/or from the added colloidal or molecular molybdenum disulfide catalyst.

In this study, a catalyst precursor composition comprising molybdenum 2-ethylhexanoate (15% molybdenum by weight) was first diluted down to about 1% by weight molybdenum metal using Number 2 fuel oil (heavy diesel). This diluted precursor composition was intimately mixed with Athabasca vacuum tower bottoms to yield a conditioned feedstock, which was heated to 400° C. (752° F.) in a feed heater to form the colloidal or molecular molybdenum disulfide catalyst and then hydrocracked at 440° C. (824° F.) in a pilot gas-liquid slurry phase back-mixed reactor.

The second reactor shown in FIG. 13 had an effective volume of 2,239 ml, a height of 4.27 meters, and an internal diameter of 2.95 cm. The pilot reactor had an external recycle pump to circulate the reactor liquid from the top of the reactor back to the reactor entrance by means of an external loop. Circulating the reactor liquid enabled rapid dissipation of heat generated by hydroprocessing reactions and maintenance of a homogeneous reactor liquid temperature profile. At the reactor entrance, fresh feedstock and hydrogen were joined with the recycled reactor liquid, which then underwent hydrocracking reactions.

Effluent taken from the reactor was introduced into a hot separator, which separated the effluent into a hot vapor and gaseous stream, which was removed from the top, and a liquid product stream, which was removed from the bottom. After cooling and pressure reduction through subsequent downstream separators, the hydrocracked products were collected as light condensates, bottom liquid, product gas, and dissolved gas. The light condensate and bottom liquid were combined as total liquid and fed to the guard bed reactor packed with a commercial demetalization catalyst supplied by WR Grace.

140 grams of demetalization catalyst were utilized within the guard bed unit. The feed rate was 124 g/hr of hydrocracked product from the slurry phase reactor. Operating conditions were 380° C. (716° F.) at 2,000 psi. The hydrogen flow rate was 300 SCF/bbl (standard cubic feet per barrel—42 gallons of liquid feed). The metal analysis of the hydrocracked product from the pilot slurry phase reactor are shown in Table III as follows:

TABLE III

| Metal | Concentration (Weight Part Per Million (WPPM)) |
|---|---|
| Nickel | 94 |
| Vanadium | 260 |
| Molybdenum | 134 |

The metal analysis after the product was demetalized using the guard bed demetalization catalyst is shown in Table IV as follows:

TABLE IV

| Metal | WPPM | Wt % Removed |
|---|---|---|
| Nickel | 4 | 95.7 |
| Vanadium | 5 | 98.1 |
| Molybdenum | 4 | 97.0 |

As plainly shown, fixed bed demetalization resulted in the removal of the vast majority of metals from the upgraded feedstock formed using the colloidal or molecular catalyst within the pilot slurry phase reactor. This shows that preliminary upgrading of a heavy oil feedstock using a colloidal or molecular catalyst can be successfully carried out in order to (i) upgrade asphaltenes and other higher boiling resid hydrocarbons and (ii) convert metals into a form that facilitates their removal by guard bed demetalization so as to prevent fouling of a downstream fixed bed hydrotreating reactor used for desulfurization and denitrogenation. The demetalization catalyst removed both the colloidal or molecular molybdenum disulfide catalyst and the nickel and vanadium fraction found in the feedstock at about the same rate, thereby demonstrating that the colloidal or molecular catalyst could be removed using the same demetalization process typically used to remove metal contaminants from a feedstock. In view of this, one of skill in the art would expect that preliminary upgrading of a heavy oil feedstock rich in asphaltenes call be carried out upstream of a fixed bed hydroprocessing reactor using a colloidal or molecular catalyst, e.g., in one or more of a slurry phase reactor or an ebullated bed reactor, followed by demetalization in a guard bed, in order to eliminate or greatly reduce fouling of a downstream hydrotreating fixed bed reactor by asphaltenes and/or metals found in the feedstock.

EXAMPLE 6

A pilot plant with two ebullated bed reactors connected in series was used to compare the difference between using a porous supported ebullated bed catalyst ("EB catalyst") by itself when processing a heavy oil feedstock containing asphaltenes and the EB catalyst in combination with a colloidal or molecular molybdenum disulfide catalyst. The pilot plant 900 for this test is schematically depicted in FIG. 13, and included a high shear mixing vessel 902 used to blend molybdenum 2-ethylhexanoate (15% molybdenum by weight of the catalyst precursor composition) into the feedstock to form a conditioned feedstock. The feedstock for this test was 95% Athabasca resid and (5% decant oil from an operating commercial plant, and the EB catalyst was taken from inventory at the same commercial plant. The conditioned feedstock was circulated out and back into the mixing vessel 902 by a pump 904. A high precision metering piston pump 906 drew the conditioned feedstock from the loop and pressurized it to the reactor pressure. Thereafter, hydrogen 908 was fed into the pressurized feedstock and the resulting mixture passed through a pre-heater 910 prior to being introduced into the first of two pilot slurry phase/ebullated bed reactors 912, 912'.

Each of reactors 912, 912' had an interior volume of 2200 ml and included a porous supported catalyst and a mesh wire guard 914 to keep the supported catalyst within the reactor. The settled height of catalyst in each reactor is indicated by a lower dotted line 916, and the expanded catalyst bed during use is indicated by an upper dotted line 918. The first reactor 912 was loaded with equilibrium catalyst from the second of two LC-Fining reactors in series, while the second reactor 912' was loaded with ⅓ fresh catalyst and ⅔ equilibrium catalyst from the LC-Fining reactor. The reactors 912, 912' were operated at a space velocity of 0.28 reactor volume per hour with 2100 psig back pressure. The rate of hydrogen feed was 4500 scf/barrel, with 60% being introduced into the first reactor 912 and 40% being added as supplemental hydrogen 920 to the material being transferred from the first reactor 912 to the second reactor 912'.

During use, either the feedstock only (in the case of Run "A" using an ebullated bed catalyst only) or the feedstock and colloidal or molecular catalyst (in the case of Run "B" using an ebullated bed catalyst and the colloidal or molecular catalyst) were continuous recycled from the top of each reactor to the bottom of the reactor in a manner similar to an actual commercial ebullated bed reactor as it was being upgraded. Upgraded feedstock from the first reactor 912 was transferred together with supplemental hydrogen into the second reactor 912' for further hydroprocessing. The further upgraded material from the second reactor 912' was introduced into a first hot separator 922 to separate gases and vapors 924 from a liquid fraction. The liquid 926 from the first hot separator was introduced into a second hot separator 928 to remove additional gases and vapors 924', which were blended with those from the first hot separator 922 and then separated into gases 930 and condensate 932. The hot separator bottoms 934 were removed from the second hot separator 928.

The first run (Run "A") was a base-line test simulating the current commercial unit operation with the EB catalyst, but without the colloidal or molecular catalyst. The second test (Run "B") was a duplication of Run "A", using an identical catalyst charge (i.e., a mixture of fresh and equilibrium EB catalyst), but with the feedstock conditioned with 50 parts per million of a molybdenum sulfide colloidal or molecular catalyst. For each run, the test unit was operated for 5 days at a reactor temperature of 425° C., followed by 4 days at a temperature of 432-434° C., and then 1 day at 440° C. Samples were taken from the hot separator bottoms at the end of each 24-hour period and tested.

The results of this comparative study are graphically depicted in FIGS. 18-25. The comparative study demonstrated the ability of the colloidal or molecular catalyst to convert asphaltenes to lower boiling materials while also reducing the formation of sediment in the reactors. It further confirmed the results of the examples above showing that the asphaltene fraction can be converted at the same rate as the overall resid material.

Figure 18:
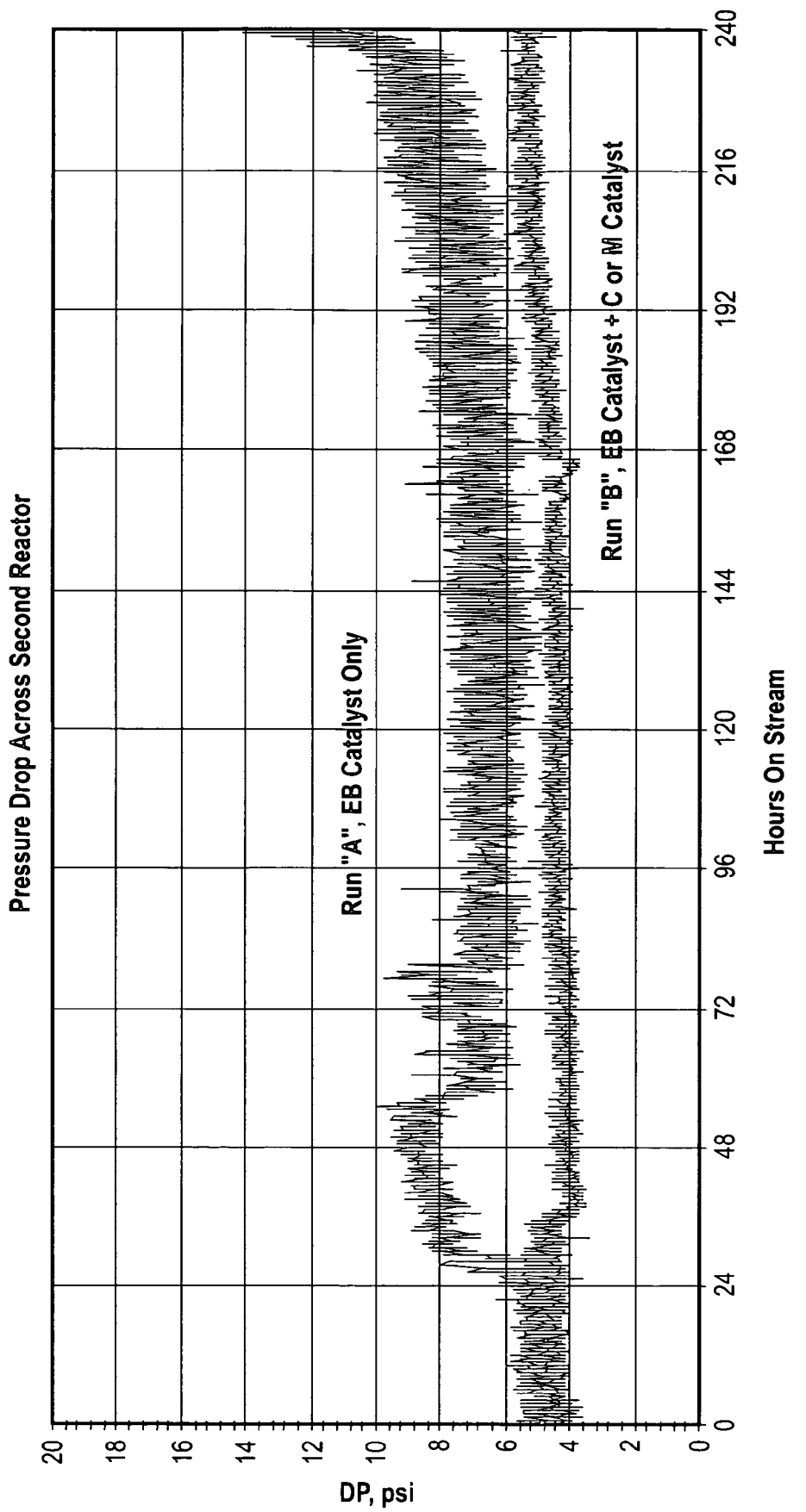
FIG. 18 is a chart comparing increases in pressure drop across the second pilot ebullated bed reactor over time for test runs using either a porous supported catalyst by itself or in combination with a colloidal or molecular catalyst.
Figure 19:
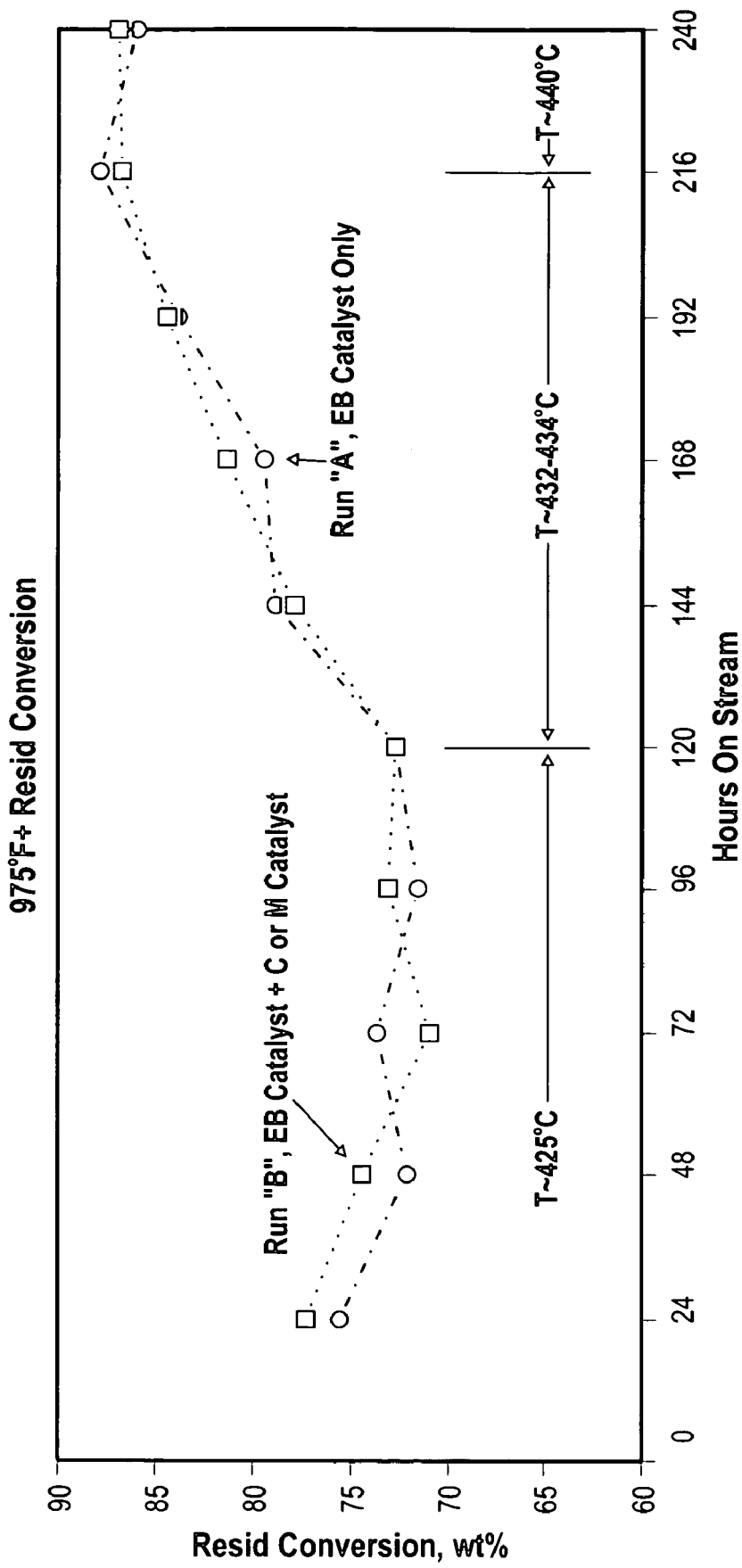
FIG. 19 is a chart comparing resid conversion at various hours on stream for test runs using either a porous supported catalyst by itself or in combination with the colloidal or molecular catalyst.

The chart shown in FIG. 18 plots the pressure drop across the second reactor for each of Runs "A" and "B" throughout the duration of the test. The chart shown in FIG. 19 plots resid conversion for Runs "A" and "B" versus hours on stream. Throughout the test, the overall conversion levels for the two types of catalysts were kept about the same. Nevertheless, the chart shown in FIG. 18 shows a greater pressure drop across the second reactor for Run "A" compared to Run "B" throughout the test after the first 24 hours. The greater pressure differential suggests a significantly larger buildup of sediment in the reactors during Run "A" than in Run "B", which is consistent with lower conversion of asphaltenes in Run "A".

Figure 20:
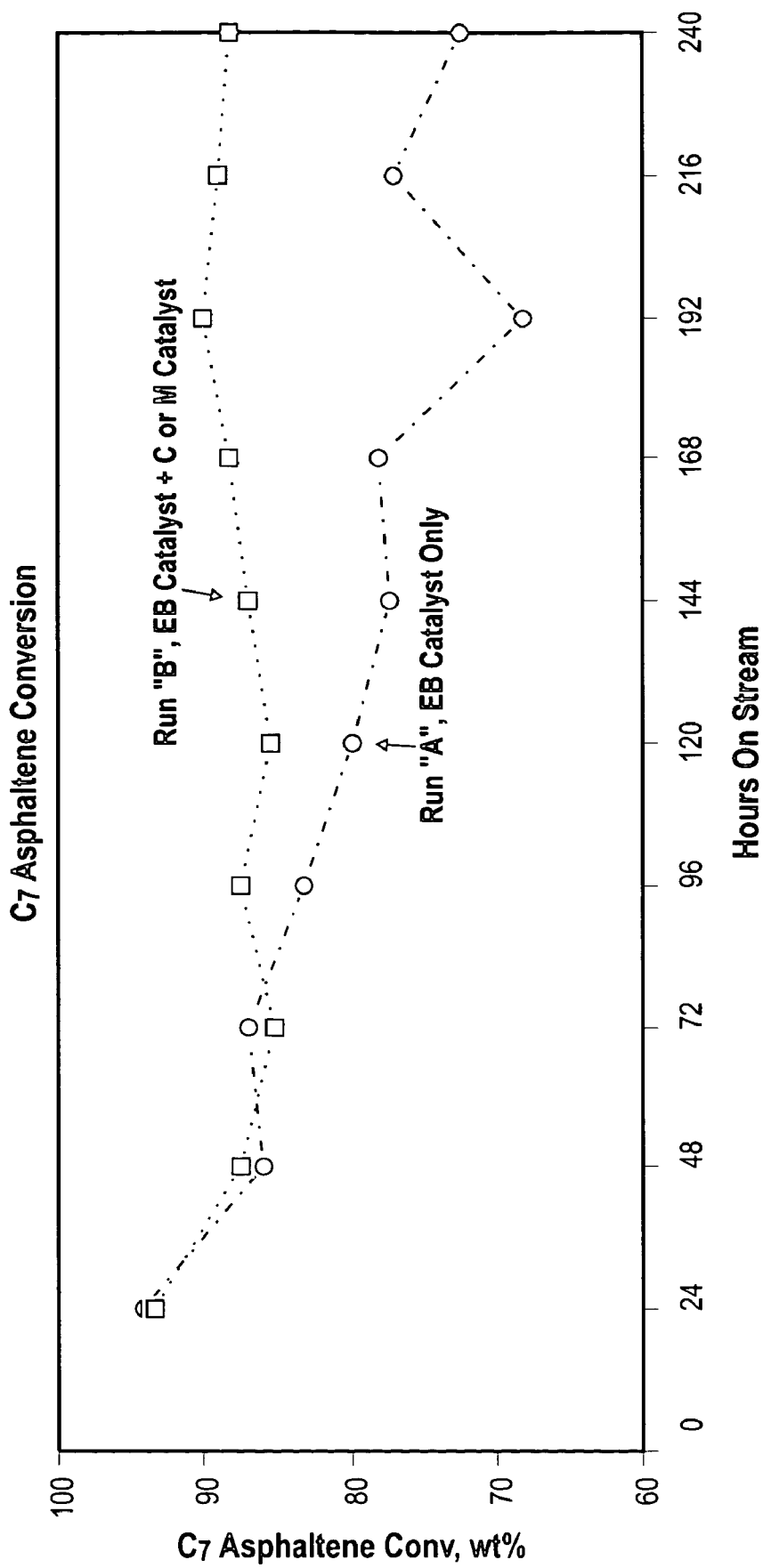
FIG. 20 is a chart comparing $C_7$ asphaltene conversion at various hours on stream for test runs using either a porous supported catalyst by itself or in combination with a colloidal or molecular catalyst.

In fact, the chart depicted in FIG. 20 shows that the asphaltene conversion (defined in terms of heptane ($C_7$) insolubles) versus time on-stream at various resid conversion levels was substantially higher in Run "B" compared to Run "A". The asphaltene conversion levels for each of Runs "A" and "B" started out relative high. Thereafter, the asphaltene conversion for Run "B" remained high (i.e., greater than about 85%, while the asphaltene conversion for Run "A" progressively dropped as the test continued. Moreover, the difference between the asphaltene conversion levels for Runs "A" and "B" progressively widened as the test progressed. This demonstrates that the colloidal or molecular catalyst greatly assisted in converting the asphaltene fraction, particularly over time, compared to using the porous supported catalyst by itself.

Figure 21:
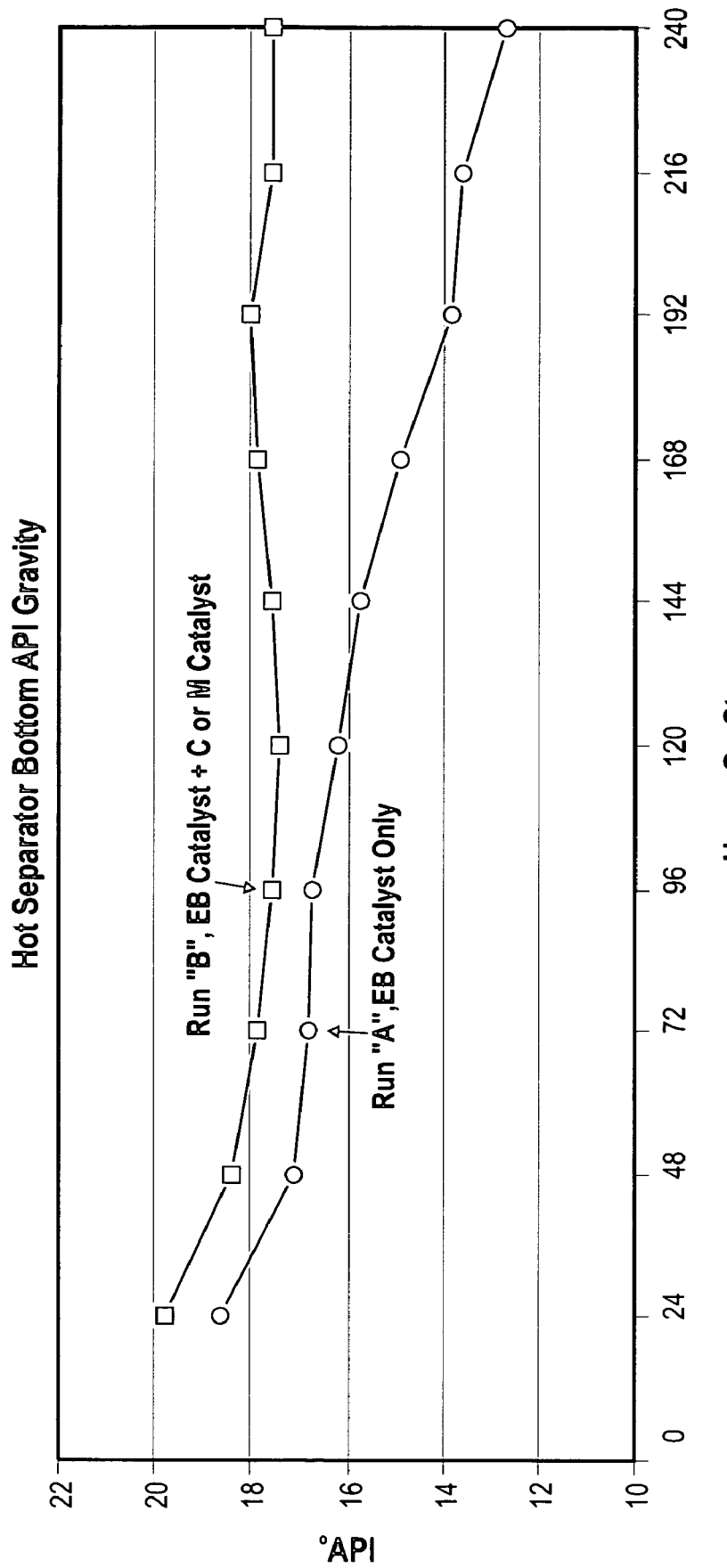
FIG. 21 is a chart comparing hot separator bottom API gravity at various hours on stream for test runs using either a porous supported catalyst by itself or in combination with a colloidal or molecular catalyst.
Figure 22:
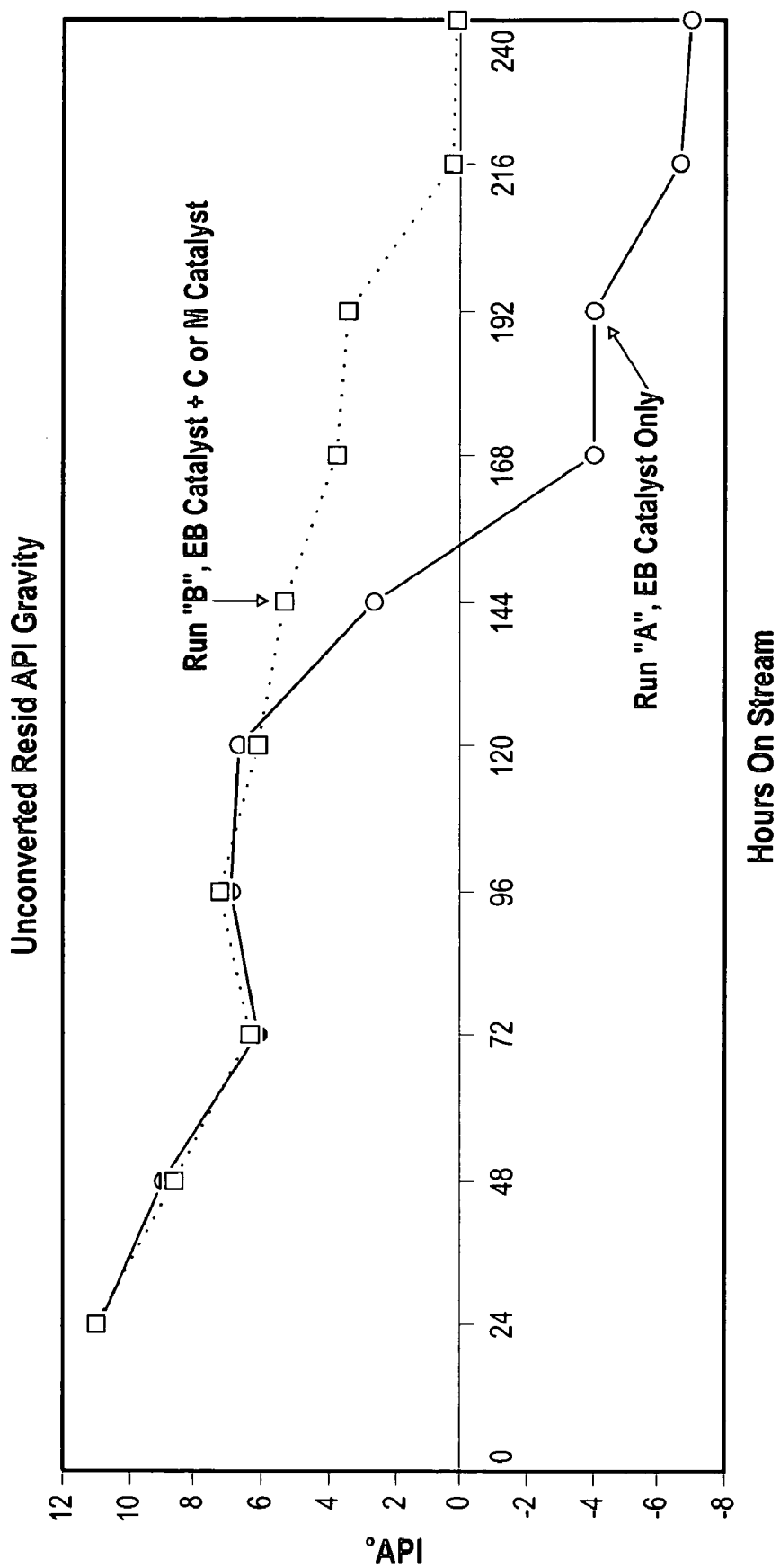
FIG. 22 is a chart comparing unconverted resid API gravity at various hours on stream for test runs using either a porous supported catalyst by itself or in combination with a colloidal or molecular catalyst.

The chart depicted in FIG. 21 plots the API gravity of the hot separator bottoms for Runs "A" and "B". The chart depicted in FIG. 22 plots the unconverted resid API gravity for Runs "A" and "B". The data in both charts are consistent with the overall increase in asphaltene conversion in Run "B" compared to Run "A" and increased hydrogen transfer to the product via the colloidal or molecular catalyst and the less deactivated porous supported catalyst. The reduction in sediment formation slows the deactivation of the supported catalyst, which is clearly demonstrated by the higher API gravity shown in FIGS. 21 and 22. Since API gravity is directly related to quality and hydrogen contents, higher API gravity means higher hydrogen contents and lower absolute specific gravity.

Figure 23:
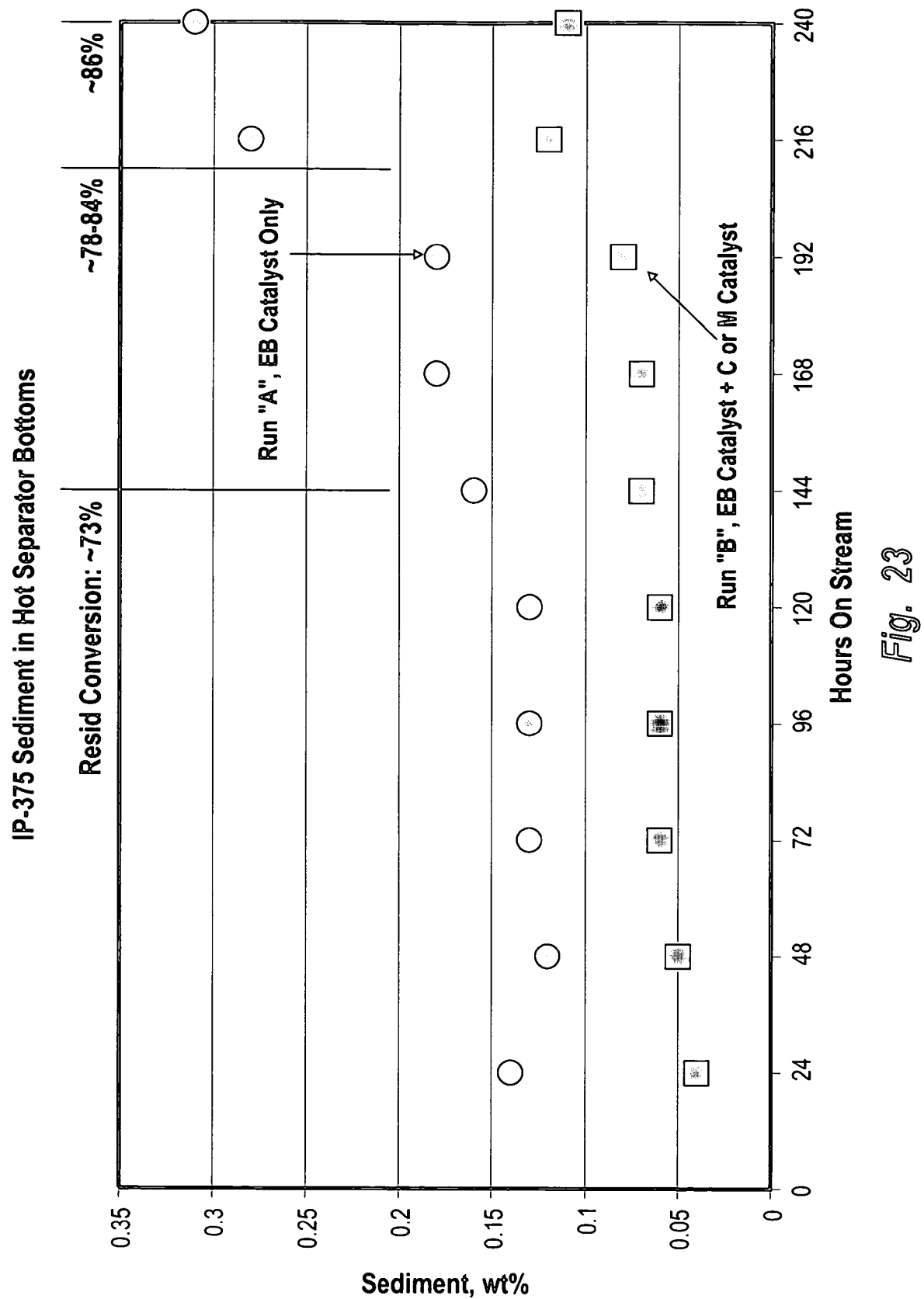
FIG. 23 is a chart comparing IP-375 sediment in hot separator bottoms at various hours on stream for test runs using either a porous supported catalyst by itself or in combination with a colloidal or molecular catalyst.
Figure 24:
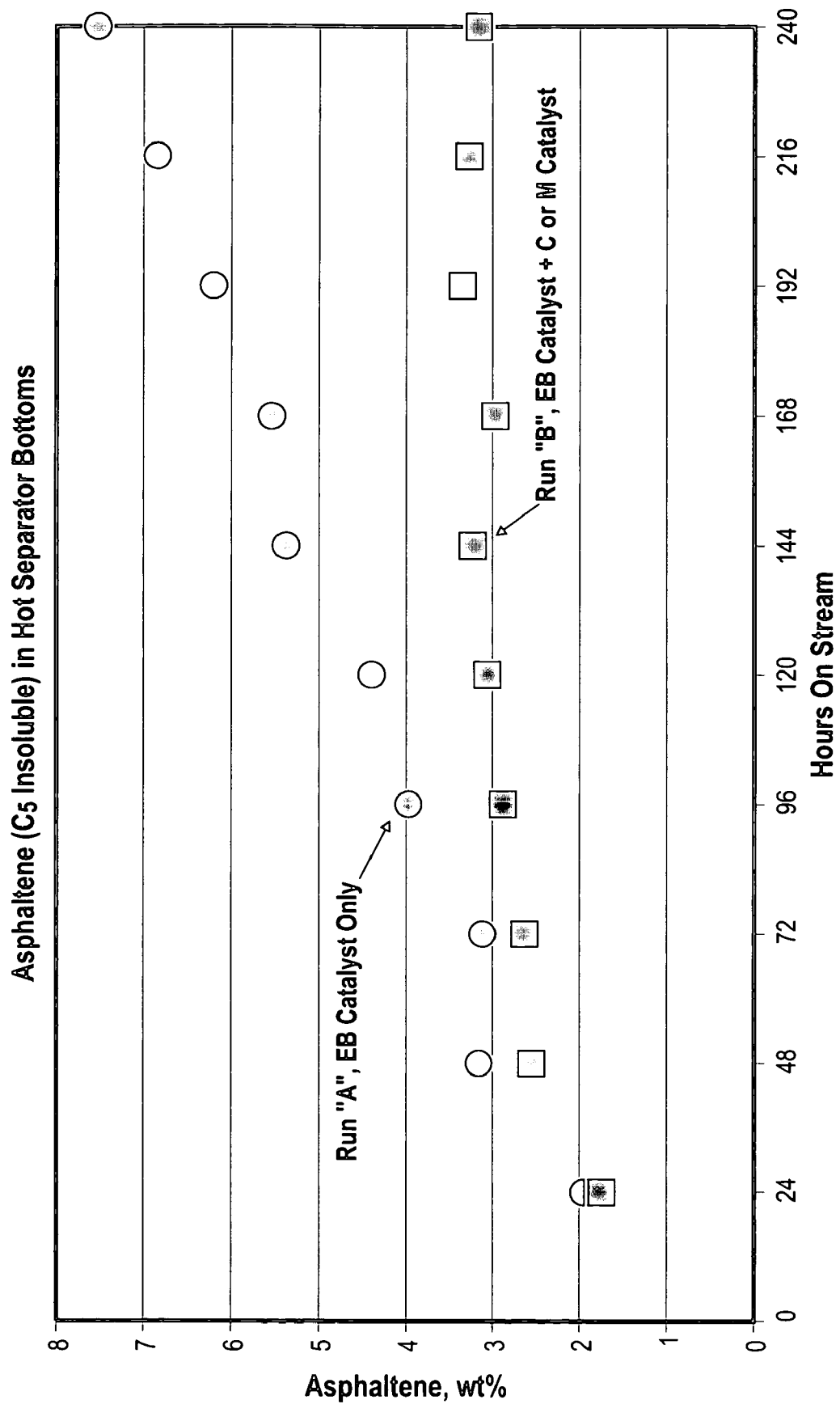
FIG. 24 is a chart comparing the asphaltene concentration in the hot separator bottoms at various hours on stream or test runs using either a porous supported catalyst by itself or in combination with a colloidal or molecular catalyst.

The chart shown in FIG. 23 plots the IP-375 sediment found in the hot separator bottoms for each of Runs "A" and "B". The chart depicted in FIG. 24 plots the percentage of asphaltenes found in the hot separator bottoms for each of Runs "A" and "B". The 2-3 fold increase in sediment found in the hot separator bottoms produced in Run "A" compared to Run "B" is consistent with the greater concentration of asphaltenes found in the hot separator bottoms from Run "A". Moreover, while the concentration of asphaltenes found in the hot separator bottoms from Run "B" remained substantially constant throughout the test, the asphaltenes found in the hot separator bottoms from Run "A" progressively increased over time. This shows that using the colloidal or molecular catalyst would be expected to greatly assist in maintaining steadier levels of asphaltenes in the processed feedstocks, with an attendant reduction in sediment formation compared to using a porous supported catalyst by itself.

Figure 25:
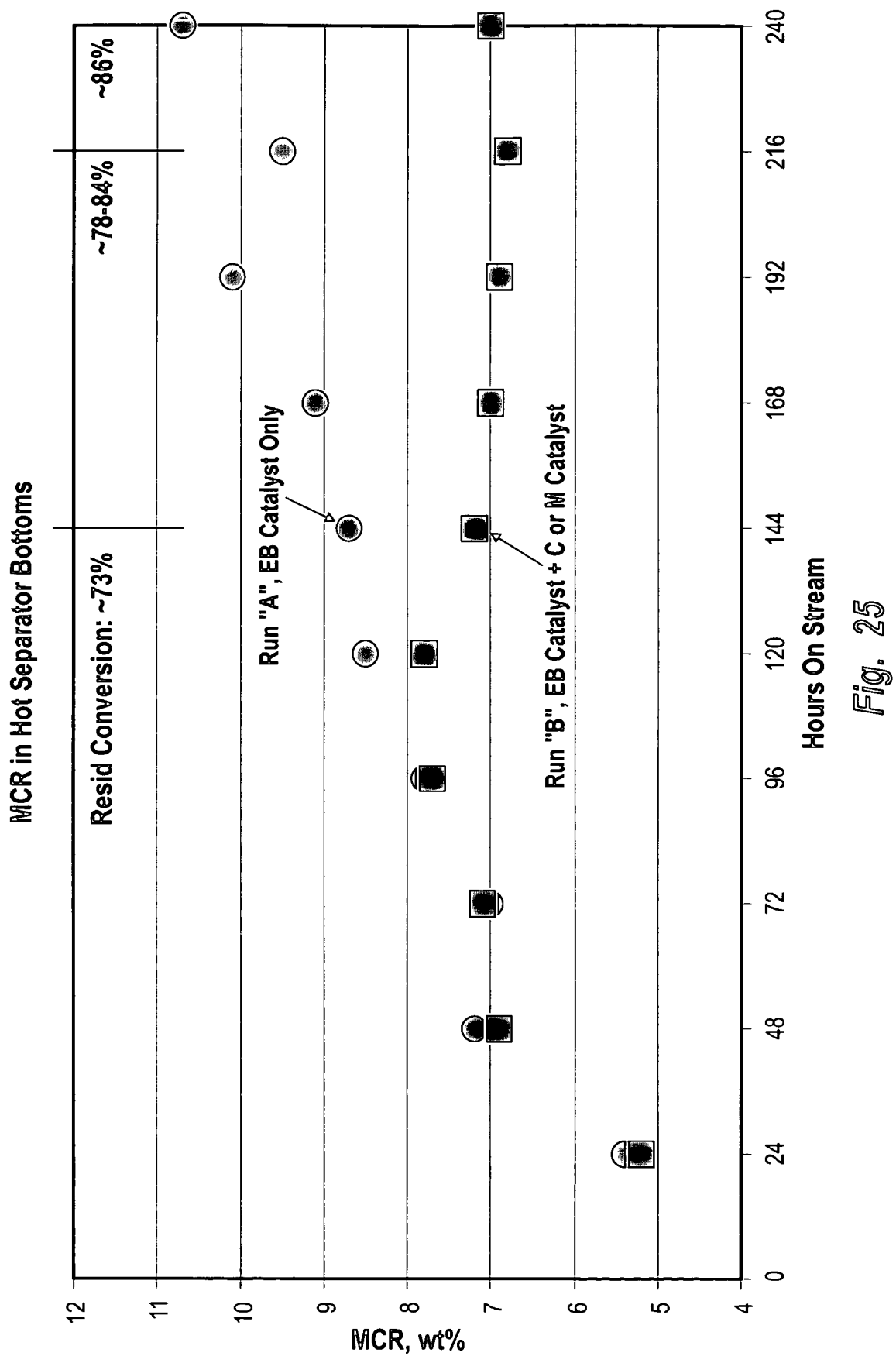
FIG. 25 is a chart comparing the MCR in hot separator bottoms at various hours on stream for test runs using either a porous supported catalyst by itself or in combination with a colloidal or molecular catalyst.

The chart in FIG. 25 plots the weight percent of micro carbon residue (MCR) found in the hot separator bottoms for each of Runs "A" and "B". Consistent with the previous data, the MCR in the hot separator bottoms for Run "B" increased throughout the test, while it initially increased then stagnated, throughout Run "A".

The benefits of adding the colloidal or molecular catalyst in addition to the porous supported ebullated bed catalyst compared to using the ebullated bed catalyst by itself can be seen by the follow additional data gleaned from the foregoing test set forth in Table V:

TABLE V

| Catalyst | EB Catalyst | EB Cat. + C or M Cat. | Change |
|---|---|---|---|
| 525° C.+ Conv. wt % | 72.8 | 81.7 | 8.9 |
| $C_1$–$C_3$, wt % feed | 3.9 | 5.3 | 1.4 |
| $C_4$–524° C. Barrel product/Barrel feed | 0.77 (34.1° API) | 0.88 (36.9° API) | 0.11 (2.8° API) |
| 525° C.+, Barrel product/Barrel feed | 0.25 (5.8° API) | 0.16 (4.3° API) | −0.09 (−1.50° API) |
| Conradson Carbon residue or MCR Conversion | 69.3 | 76.4 | 7.1 |
| $C_7$ Asph Conv wt % | 79.8 | 88.4 | 8.6 |
| Sediment after hot filtration test following the blending of 525° C.+ resid with a light crude oil | 0.03 | <0.01 | −0.02 |
| Basic Sediment and Water content | 0.2 | 0.1 | −0.1 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of hydroprocessing a heavy oil feedstock, comprising:
   preparing a heavy oil feedstock comprised of a substantial quantity of hydrocarbons having a boiling point greater than about 650° F. and a colloidal or molecular catalyst dispersed throughout the feedstock;
   heating or maintaining the heavy oil feedstock at a hydrocracking temperature within a hydrocracking reactor to form hydrocarbon free radicals from the heavy oil feedstock,
      the colloidal or molecular catalyst catalyzing reactions between hydrogen and the free radicals in the hydrocracking reactor to yield an upgraded material and reducing or eliminating formation of coke precursors and sediment in the hydrocracking reactor;
   transferring the upgraded material, together with residual colloidal or molecular catalyst and hydrogen, to a hot separator so as to separate gaseous and volatile fractions from a liquid fraction;
   withdrawing the liquid fraction from the hot separator and introducing the liquid fraction together with residual colloidal or molecular catalyst into a guard bed containing a solid supported catalyst for hydroprocessing of the liquid fraction,
      the solid supported catalyst removing at least a portion of the residual colloidal or molecular catalyst and metal contaminants from the liquid fraction to yield an upgraded liquid fraction; and
   introducing the upgraded liquid fraction into a fixed bed hydroprocessing reactor containing a solid supported catalyst in order to further upgrade the upgraded liquid fraction.

2. A method as defined in claim 1, wherein the heavy oil feedstock comprises at least one of heavy crude oil, oil sand bitumen, atmospheric tower bottoms, vacuum tower bottoms, resid, visbreaker bottoms, coal tar, heavy oil from oil shale, or liquefied coal.

3. A method as defined in claim 1, wherein the heavy oil feedstock comprises at least about 5% by weight of asphaltenes.

4. A method as defined in claim 3, at least a portion of the colloidal or molecular catalyst being associated with at least a portion of the asphaltenes.

5. A method as defined in claim 4, the colloidal or molecular catalyst promoting reactions between free radicals formed from the asphaltenes and hydrogen within the hydrocracking reactor, the reactions between the free radicals formed from the asphaltenes and hydrogen preventing or inhibiting formation of coke precursors and sediment within the hydrocracking reactor.

6. A method as defined in claim 1, wherein the upgraded material within the hot separator comprises asphaltenes and wherein at least a portion of the residual colloidal or molecular catalyst in the upgraded material is associated with at least a portion of the asphaltenes, the residual colloidal or molecular catalyst associated with the asphaltenes promoting reactions between asphaltene free radicals and hydrogen, the reactions between the asphaltene free radicals and hydrogen preventing or inhibiting formation of coke precursors and sediment within the hot separator.

7. A method as defined in claim 1, the heavy oil feedstock initially comprising at least about 30% by weight of hydrocarbons having a boiling point of at least about 975° F.

8. A method as defined in claim 1, the heavy oil feedstock initially comprising at least about 50% by weight of hydrocarbons having a boiling point of at least about 975° F.

9. A method as defined in claim 1, the heavy oil feedstock initially comprising at least about 95% by weight of hydrocarbons having a boiling point of at least about 975° F.

10. A method as defined in claim 1, the catalyst metal in the colloidal or molecular catalyst at least initially having a concentration in a range of about 5 ppm to about 500 ppm by weight of the heavy oil feedstock.

11. A method as defined in claim 1, the catalyst metal in the colloidal or molecular catalyst at least initially having a concentration in a range of about 15 ppm to about 300 ppm by weight of the heavy oil feedstock.

12. A method as defined in claim 1, the catalyst metal in the colloidal or molecular catalyst at least initially having a concentration in a range of about 25 ppm to about 175 ppm by weight of the heavy oil feedstock.

13. A method as defined in claim 1, the colloidal or molecular catalyst in the heavy oil feedstock being formed by:
   mixing a hydrocarbon oil diluent and an oil soluble catalyst precursor composition at a temperature below which a significant portion of the catalyst precursor composition staffs to decompose to form a diluted precursor mixture;
   mixing the diluted precursor mixture with a heavy oil feedstock in a manner so as to yield a conditioned feedstock that forms the colloidal or molecular catalyst upon decomposing the precursor composition and allowing metal liberated therefrom to react with sulfur liberated from the feedstock; and
   heating the conditioned feedstock so as to decompose the catalyst precursor composition and allow metal liberated from the decomposed catalyst precursor composition to react with sulfur liberated from the heavy oil feedstock so as to form the colloidal or molecular catalyst.

14. A method as defined in claim 13, the hydrocarbon oil diluent comprising at least one of vacuum gas oil, decant oil, cycle oil, or light gas oil.

15. A method as defined in claim 13, the catalyst precursor composition comprising at least one transition metal and at least one organic moiety comprising or derived from octanoic acid, 2-ethylhexanoic acid, naphthanic acid, pentacarbonyl, or hexacarbonyl.

16. A method as defined in claim 13, the catalyst precursor composition comprising at least one of molybdenum 2-ethyihexanoate, molybdenum naphthanate, molybdenum hexacarbonyl, vanadium octoate, vanadium naphthanate, or iron pentacarbonyl.

17. A method as defined in claim 13, the ratio of catalyst precursor composition to hydrocarbon oil diluent being in a range of about 1:500 to about 1:1.

18. A method as defined in claim 13, the ratio of catalyst precursor composition to hydrocarbon oil diluent being in a range of about 1:150 to about 1:2.

19. A method as defined in claim 13. the ratio of catalyst precursor composition to hydrocarbon oil diluent being in a range of about 1:100 to about 1:5.

20. A method as defined in claim 13, the hydrocarbon oil diluent and catalyst precursor composition being mixed at temperature in a range of about 25° C. to about 250° C., the diluted precursor mixture and heavy oil feedstock being mixed at a temperature in a range of about 25° C. to about 350° C., and the conditioned feedstock being heated to a temperature in a range of about 275° C. to about 450° C.

21. A method as defined in claim 13, the hydrocarbon oil diluent and catalyst precursor composition being mixed at temperature in a range of about 50° C. to about 200° C., the diluted precursor mixture and heavy oil feedstock being mixed at a temperature in a range of about 50° C. to about 300° C., and the conditioned feedstock being heated to a temperature in a range of about 350° C. to about 440° C.

22. A method as defined in claim 13, the hydrocarbon oil diluent and catalyst precursor composition being mixed at temperature in a range of about 75° C. to about 150° C., the diluted precursor mixture and heavy oil feedstock being mixed at a temperature in a range of about 75° C. to about 250° C., and the conditioned feedstock being heated to a temperature in a range of about 375° C. to about 420° C.

23. A method as defined in claim 13, the hydrocarbon oil diluent and catalyst precursor composition being mixed for a time period in a range of about 1 second to about 20 minutes, and the diluted precursor mixture and heavy oil feedstock being mixed for a time period in a range of about 1 second to about 20 minutes.

24. A method as defined in claim 13, the hydrocarbon oil diluent and catalyst precursor composition being mixed for a time period in a range of about 5 seconds to about 10 minutes, and the diluted precursor mixture and heavy oil feedstock being mixed for a time period in a range of about 5 seconds to about 10 minutes.

25. A method as defined in claim 13, the hydrocarbon oil diluent and catalyst precursor composition being mixed for a time period in a range of about 20 seconds to about 3 minutes, and the diluted precursor mixture and heavy oil feedstock being mixed for a time period in a range of about 20 seconds to about 5 minutes.

26. A method as defined in claim 13, at least a portion of the colloidal or molecular catalyst being formed prior to introducing the feedstock into the hydrocracking reactor.

27. A method as defined in claim 13, at least a portion of the colloidal or molecular catalyst being formed after introducing the feedstock into the hydrocracking reactor.

28. A method as defined in claim 1, the upgraded material within the hot separator being maintained at a temperature within about 10° F. of the hydrocracking temperature within the hydrocracking reactor.

29. A method as defined in claim 1, the upgraded material within the hot separator being maintained at a temperature within about 20° F. of the hydrocracking temperature within the hydrocracking reactor.

30. A method as defined in claim 1, the hydrocracking reactor comprising at least one of a slurry phase reactor or an ebullated bed reactor.

31. A method as defined in claim 30, prior to introducing the liquid fraction and residual colloidal or molecular catalyst from the hot separator into the guard bed, the method further comprising:
  introducing the liquid fraction and residual colloidal or molecular catalyst from the hot separator into a second hydrocracking reactor to form a preliminary upgraded liquid fraction, the second hydrocracking reactor comprising at least one of a slurry phase reactor, an ebullated bed reactor, or a fixed bed reactor; and
  introducing the preliminary upgraded liquid fraction from the second hydrocracking reactor into a second hot separator.

32. A method of hydroprocessing a heavy oil feedstock, comprising:
  preparing a heavy oil feedstock comprised of higher boiling hydrocarbons having a boiling point greater than about 650° F. and a colloidal or molecular catalyst dispersed throughout the feedstock;
  heating or maintaining the heavy oil feedstock at a hydrocracking temperature within a slurry phase hydrocracking reactor together with hydrogen in order to convert at least a portion of the higher boiling hydrocarbons to lower boiling hydrocarbons and thereby form an upgraded material, the slurry phase reactor including (i) an inlet port at a bottom of the slurry phase reactor into which the heavy oil feedstock and hydrogen are introduced and (ii) an outlet port at a top of the slurry phase reactor from which the upgraded material, colloidal or molecular catalyst, and hydrogen are withdrawn;
  transferring the upgraded material, colloidal or molecular catalyst, and hydrogen to a hot separator while maintaining the upgraded material at a hot separation temperature within about 20° F. of the hydrocracking temperature so as to separate gaseous and volatile fractions from a liquid fraction in the upgraded material and form or maintain hydrocarbon free radicals in the liquid fraction;
    the colloidal or molecular catalyst catalyzing reactions between hydrogen and hydrocarbon free radicals within the slurry phase reactor and also the hot separator,
    the colloidal or molecular catalyst reducing or eliminating formation of coke precursors and sediment within the slurry phase reactor and also the hot separator; and
  withdrawing the liquid fraction from the hot separator and introducing the liquid fraction together with residual colloidal or molecular catalyst into a guard bed containing a solid supported catalyst for hydroprocessing of the liquid fraction, the solid supported catalyst removing at least a portion of the residual colloidal or molecular catalyst and metal contaminants from the liquid fraction to yield an upgraded liquid fraction.

33. A method as defined in claim 32, the slurry phase reactor further comprising a recycle channel, a recycling pump, and a distributor grid plate.

34. A method as defined in claim 32, further comprising:
introducing a preliminary feedstock into an ebullated bed reactor for preliminary upgrading in the presence of a solid supported catalyst and the colloidal or molecular catalyst to form a preliminary upgraded product,
the solid supported catalyst removing at least a portion of sulfur, nitrogen and metals from the preliminary feedstock,
the colloidal or molecular catalyst catalyzing reactions between hydrogen and hydrocarbon free radicals within the ebullated bed reactor, thereby reducing or eliminating formation of coke precursors or sediments and extending the useful life of the solid supported catalyst compared to a solid supported catalyst within an ebullated bed reactor in the absence of the colloidal or molecular catalyst; and
withdrawing the preliminary upgraded product and colloidal or molecular catalyst from the ebullated bed reactor and introducing it as the heavy oil feedstock into the slurry phase reactor.

35. A method as defined in claim 32, further comprising introducing the upgraded material and colloidal or molecular catalyst from the slurry phase reactor into at least one ebullated bed reactor containing a solid supported catalyst for further hydroprocessing prior to transferring the upgraded material into the hot separator,
the solid supported catalyst removing at least a portion of sulfur, nitrogen and metals from the upgraded material,
the colloidal or molecular catalyst catalyzing reactions between hydrogen and hydrocarbon free radicals within the ebullated bed reactor, thereby reducing or eliminating formation of coke precursors or sediments and extending the useful life of the solid supported catalyst compared to a solid supported catalyst within an ebullated bed reactor in the absence of the colloidal or molecular catalyst.

36. A method as defined in claim 32, further comprising withdrawing the liquid fraction from the hot separator and introducing the liquid fraction together with residual colloidal or molecular catalyst and additional hydrogen into at least one ebullated bed reactor containing a solid supported catalyst for hydroprocessing of the liquid fraction,
the liquid fraction within the ebullated bed reactor being heated or maintained at a hydroprocessing temperature so as to form hydrocarbon free radicals,
the residual colloidal or molecular catalyst catalyzing reactions between hydrogen and hydrocarbon free radicals within the ebullated bed reactor,
the solid supported catalyst removing at least a portion of sulfur, nitrogen and metals from the liquid fraction.

37. A method as defined in claim 36, further comprising transferring the upgraded liquid fraction and residual colloidal or molecular catalyst from the ebullated bed reactor to a second hot separator in order to separate gaseous and volatile liquid fractions from a second liquid fraction in the upgraded liquid fraction,
the residual colloidal or molecular catalyst in the upgraded liquid fraction promoting reactions between at least a portion of hydrogen and hydrocarbon free radicals within the second hot separator, thereby reducing or eliminating formation of coke precursors and sediment within the second hot separator.

38. A method as defined in claim 32, further comprising withdrawing the liquid fraction from the hot separator and introducing the liquid fraction together with residual colloidal or molecular catalyst into a fixed bed reactor containing a solid supported catalyst for hydroprocessing of the liquid fraction,
the residual colloidal or molecular catalyst reducing or eliminating formation of coke precursors or sediments within at least a portion of the fixed bed reactor,
at least one of the solid supported catalyst or residual colloidal or molecular catalyst promoting reactions between hydrogen and hydrocarbon free radicals within the fixed bed reactor in order to yield an upgraded liquid fraction.

39. A method as defined in claim 32, further comprising introducing the upgraded liquid fraction from the guard bed into at least one hydrotreating fixed bed reactor in order to remove at least one of nitrogen, sulfur, oxygen, or halides and yield a hydrotreated material having increased hydrogen content.

40. A method as defined in claim 39, further comprising introducing the hydrotreated material into a second hot separator.

41. A method as defined in claim 32, further comprising introducing the upgraded material and residual colloidal or molecular catalyst from the slurry phase reactor into at least one fixed bed reactor containing a solid supported catalyst for further hydroprocessing prior to transferring the upgraded feedstock into the hot separator.

42. A method of hydroprocessing a heavy oil feedstock, comprising:
(a) mixing a hydrocarbon oil diluent and an oil soluble catalyst precursor composition at a temperature below which a significant portion of the catalyst precursor composition starts to decompose to form a diluted precursor mixture;
(b) mixing the diluted precursor mixture with a heavy oil feedstock comprised of a substantial quantity of hydrocarbons having a boiling point greater than about 650° F. in a manner so as to yield a conditioned feedstock;
(c) heating the conditioned feedstock so as to decompose the catalyst precursor composition, liberate sulfur from the heavy oil feedstock, and allow metal liberated from the decomposed catalyst precursor composition to react with sulfur liberated from the heavy oil feedstock so as to form a colloidal or molecular catalyst;
(d) prior to, during, or after (c), introducing the heavy oil feedstock into an ebullated bed reactor for preliminary upgrading in the presence of a solid supported catalyst and the colloidal or molecular catalyst to form a preliminary upgraded product,
the solid supported catalyst removing at least a portion of sulfur, nitrogen and metals from the preliminary feedstock,
the colloidal or molecular catalyst catalyzing reactions between hydrogen and hydrocarbon free radicals within the ebullated bed reactor, thereby reducing or eliminating formation of coke precursors or sediments and extending the useful life of the solid supported catalyst compared to a solid supported catalyst within an ebullated bed reactor in the absence of the colloidal or molecular catalyst;

(e) withdrawing the preliminary upgraded product and colloidal or molecular catalyst from the ebullated bed reactor and introducing it as the heavy oil feedstock into a slurry phase reactor;

(f) heating or maintaining the heavy oil feedstock at a hydrocracking temperature within the slurry phase reactor to form hydrocarbon free radicals from the heavy oil feedstock, the colloidal or molecular catalyst catalyzing reactions between hydrogen and the free radicals in the slurry phase reactor to yield an upgraded material and reducing or eliminating formation of coke precursors and sediment in the hydrocracking reactor; and (g) transferring the upgraded material, together with residual colloidal or molecular catalyst and hydrogen, to a hot separator so as to separate gaseous and volatile fractions from a liquid fraction in the upgraded material and form or maintain hydrocarbon free radicals in the liquid fraction, the residual colloidal or molecular catalyst catalyzing reactions between the hydrocarbon free radicals and residual hydrogen within the hot separator and reducing or eliminating formation of coke precursors and sediment within the hot separator.

43. A method as defined in claim 1, the colloidal or molecular catalyst in the hydrocracking reactor having a particle size less than about 100 nm.

44. A hydroprocessing system for hydroprocessing a heavy oil feedstock, comprising:

a heavy oil feedstock comprised of a substantial quantity of hydrocarbons having a boiling point greater than about 650° F. and a colloidal or molecular catalyst dispersed throughout the feedstock;

a hydrocracking reactor that heats or maintains the heavy oil feedstock at a hydrocracking temperature together with hydrogen during use in order to convert at least a portion of the higher boiling hydrocarbons to lower boiling hydrocarbons and thereby form an upgraded material, the hydrocracking reactor comprised of (i) an inlet port at a bottom of the reactor into which the heavy oil feedstock and hydrogen are introduced and (ii) an outlet port at a top of the reactor from which the upgraded material, colloidal or molecular catalyst, and hydrogen are withdrawn;

a hot separator that separates gaseous and volatile fractions from a liquid fraction in the upgraded material, the hot separator comprised of (i) an inlet through which the upgraded material is introduced into the hot separator, (ii) a first outlet through which the gaseous and volatile fractions are withdrawn, and (iii) a second outlet through which the liquid fraction is withdrawn;

a guard bed containing a solid supported catalyst for hydroprocessing the liquid fraction, wherein the solid supported catalyst removes at least a portion of the residual colloidal or molecular catalyst and metal contaminants from the liquid fraction to yield an upgraded liquid fraction; and a fixed bed hydroprocessing reactor containing a solid supported catalyst that further upgrades the upgraded liquid fraction.

* * * * *

UNITED STATES PATENT AND TRADEMARK OFFICE
CERTIFICATE OF CORRECTION

PATENT NO. : 7,578,928 B2
APPLICATION NO. : 11/117262
DATED : August 25, 2009
INVENTOR(S) : Lott et al.

It is certified that error appears in the above-identified patent and that said Letters Patent is hereby corrected as shown below:

Title Page,
Page 2
Other Publications, Item 1 (Hyvahl reference), change "1,2" to --1-2--

Column 1
Line 30, change "every" to --ever--

Column 2
Line 65, change "problem" to --a problem--

Column 3
Line 57, change "run-away" to --runaway--

Column 8
Line 64, change "catalyst" to --catalysts--

Column 11
Line 38, change "essential" to --essentially--

Column 15
Line 56, change "serves" to --serve--

Column 16
Line 13, change "of" to --or--

Column 17
Line 62, change "in range" to --in a range--

Column 18
Line 10, change "mixer" to --mixers--
Line 66, change "reduce" to --reduces--

Signed and Sealed this

Eighteenth Day of May, 2010

David J. Kappos
*Director of the United States Patent and Trademark Office*

Column 19
Line 9, change "follows by" to --followed by--
Line 27, change "dispersed" to --disperse--
Line 39, change "oil soluble" to --oil-soluble--

Column 20
Line 4, change "oil soluble" to --oil-soluble--

Column 23
Line 21, change "due their" to --due to their--
Line 39, change "although-volatile" to --although volatile--
Line 59, change "A, pump" to --A pump--

Column 25
Line 37, change "off line" to --off-line--
Line 40, change "Cleaned upgraded" to --Cleaned, upgraded--
Line 44, change "fixed-bed" to --one or more fixed-bed--

Column 26
Line 58, change "even" to --evenly--

Column 27
Line 53, change "withdraw" to --withdrawn--

Column 28
Line 8, change "526" to --518--
Line 11, change "is" to --in--
Line 13, change "526" to --518--
Line 26, change "568" to --588--

Column 29
Line 9, change "3 phase" to --3-phase--
Line 14, change "at reaction" to --at a reaction--

Column 30
Line 43, change "reside" to --resid--

Column 31
Line 17, change "base-line" to --baseline--

Column 32
Line 40, change "significantly" to --significant--

Column 33
Line 13, change "describes" to --described--

Column 34
Line 52, change "call" to --can--

Column 35
Line 37, change "continuous" to --continuously--
Line 51, change "base-line" to --baseline--

Column 36
Line 23, change "relative" to --relatively--

Column 37
Line 7, change "follow" to --following--

Column 39
Line 14, change "2-ethyihexanoate" to --2-ethylhexanoate--

UNITED STATES PATENT AND TRADEMARK OFFICE
CERTIFICATE OF CORRECTION

PATENT NO. : 7,578,928 B2
APPLICATION NO. : 11/117262
DATED : August 25, 2009
INVENTOR(S) : Lott et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Fourteenth Day of December, 2010

David J. Kappos
*Director of the United States Patent and Trademark Office*